(12) United States Patent
Boyle et al.

(10) Patent No.: US 7,451,103 B1
(45) Date of Patent: Nov. 11, 2008

(54) SYSTEM AND METHOD FOR CENTRALIZED AUTOMATED RECONCILIATION OF CUSTODY ACCOUNTS

(75) Inventors: Terence Boyle, Middletown, NJ (US); Alan Schneider, Maplewood, NJ (US); Nolan Gesher, Westfield, NJ (US); Jon Cassell, Bishop's Stortford (GB)

(73) Assignee: Citibank, N.A., New York, NY (US)

( * ) Notice: Subject to any disclaimer, the term of this patent is extended or adjusted under 35 U.S.C. 154(b) by 756 days.

(21) Appl. No.: 09/535,877

(22) Filed: Mar. 28, 2000

Related U.S. Application Data

(60) Provisional application No. 60/126,764, filed on Mar. 29, 1999.

(51) Int. Cl.
 *G06Q 40/00* (2006.01)
(52) U.S. Cl. .................. 705/35; 705/36 R; 705/37; 705/39; 705/40
(58) Field of Classification Search .............. 705/37, 705/35, 36, 39, 40; 364/406, 408; 382/137
See application file for complete search history.

(56) References Cited

U.S. PATENT DOCUMENTS

| | | | |
|---|---|---|---|
| 5,038,284 A | 8/1991 | Kramer | 364/408 |
| 5,134,564 A | 7/1992 | Dunn et al. | 364/406 |
| 5,372,386 A | 12/1994 | Mills | 283/67 |
| 5,517,406 A * | 5/1996 | Harris et al. | 705/30 |
| 5,689,579 A * | 11/1997 | Josephson | 382/137 |
| 5,802,528 A | 9/1998 | Oki et al. | 707/201 |
| 6,247,000 B1 * | 6/2001 | Hawkins et al. | 705/37 |

FOREIGN PATENT DOCUMENTS

WO   WO2005/111926   * 11/2005

OTHER PUBLICATIONS

Anonymous, Euromoney, v1996, p. 2-5, Mar. 1996.*
Kreminec, Kathleen E., Reconciling Accounts the Automated Way, Best's Review—Life-Health Insurance Edition, v90, n9, p. 82(3), Jan. 1990.*
Business Wire Page entitled "Boston Private Bank and Trust Automates Reconciliation With Advent's Rex;" pp. 3241363, Publication Date: Mar. 24, 1998.
Business Wire Page entitled "Advent Office Goes Online—Browser Reporting, Internet-Ready FIX Made Available," Publication Date: Sep. 22, 1998.

* cited by examiner

*Primary Examiner*—Alexander Kalinowski
*Assistant Examiner*—Siegfried E. Chencinski
(74) *Attorney, Agent, or Firm*—George T. Marcou; King & Spalding LLP

(57) ABSTRACT

A method and system for centralized automated reconciliation of investment manager and related custody accounts makes use of computer hardware and software in a service bureau environment to receive information and records electronically from fund managers and custodian banks in different formats, to reformat the files for inputting to the system, and to perform the reconciliation process in a uniform manner. The system also allows one or both of fund managers and custodians to establish matching rules, to view the results of the matching process, to track the investigation process for unmatched records, and to manually match unmatched records.

32 Claims, 86 Drawing Sheets

| User Group - List All | | |
|---|---|---|
| UserGroupID | UserGroup Name | Group |
| CustServ | Customer Service | 5 |
| FMGRP1 | Fund Manager Group 1 | 5 |
| FMGRP2 | Fund Manager Group 2 | 5 |
| SysAdmin | System Administrator — 96 | 1 |
| SystemAdmin | System Administrator | 5 |

Buttons: Add... (98), Modify... (104), Delete... (106), View... (108), Clear (102), Close (112), Print, Function... (110), Help

User Group - Details (Modify)

User Group ID: FMGRP1
Group Level: 5

User Group Name: Fund Manager Group 1
Group Is Fund Manager: ✓

CreatedOn: 01-Jan-1999 05:41:33
LastModifiedOn: 01-Jan-1999 10:09:13

Created By: SYSADMIN-USER
Last Modified By: SYSADMIN-USER

OK
Close
Help

User List-All

Search On:
- User ID
- UserGroupID

[Search] — 134

[Add...] — 138
[Modify...] — 142
[Delete...] — 144
[View...] — 146
[Clear] — 136
[Close] — 148

[Print]
[Help]

| User ID | UserGroup ID | Fund Manager ID | User N |
|---|---|---|---|
| CustServUser | CustServ | | Custom |
| FMUser1 | FMGRP1 | JAMCUKLO001 | Fund M |
| FMUser2 | FMGRP1 | TEMPUSNY001 | Fund M |
| FMUser3 | FMGRP2 | TEMPUSNY002 | Fund M |
| FMUser4 | FMGRP2 | MELYUSNY001 | Fund M |
| SYSADMIN | SysAdmin | | SYSAD |
| SystemAdmin | SystemAdmin | | Default |

130

User - Details (Modify) — 132

- User ID: FMUser1
- User Name: Fund Manager User 1
- FundManager ID: JAMCUKLO001
- Password: * ***
- UserGroupID: FMGRP1
- User Sees All Clients: ✓
- Created On: 01-Jan-1999 05:56:51
- Last Modified On: 09-Jul-1998 06:17:10
- Created By: SYSADMIN-USER
- Last Modified By: FMUser1

OK — 140
Close
Help

FIG. 14

Currency - List All

Search On
- Currency ID [____] — 172
- Currency Name [____] — 174

[Search] — 176
[Add...] — 180
[Modify...] — 184
[Delete...] — 186
[View...] — 188
[Clear] — 178
[Close] — 190
[Print]
[Help]

| Currency ID | Currency Name | Country |
|---|---|---|
| DEM | Deutsche Mark | Germany |
| GBP | Great Britain Pound | United Kin... |
| INR | Indian Rupee | India |
| JPY | Japanese Yen | Japan |
| KDR | Kuwaiti Dinar | Kuwait |
| SGD | Singapore Dollar | Singapore |
| USD | US Dollar | USA |

Currency - Details [Add]

Currency ID

Currency Name [Deutsche Mark]

Country [Germany]

CreatedOn

Created By

Last Modified On

Last Modified By

OK
Close
Help

FIG. 20

Security Type - Details [Add]

Security Type ID

Security Type Desc: Non Standard Security

Is Specific
○ Specific
◉ Non Specific

Created On          Created By
Last Modified       Last Modified

OK
Close
Help

216

Services - List All

Search On
- Service Type ID
- Service Type Description

220 — Search

224 — Add...
228 — Modify...
230 — Delete...
232 — View...
222 — Clear
Close
Print
Help

| Service ID | Service Type Description | Service Type | Service Translation ID |
|---|---|---|---|
| ACCT | Account | F | 8 |
| CLIENT | Client | F | 9 |
| HLD | Holdings | R | 6 |
| SECURITY | SecurityDetails | F | 4 |
| TRAN | Transactions | R | 7 |

Fund Manager - Details [Modify]

☐ Parent Fund Manager

Primary Identification
- Fund Mgr ID: TEMPUSNY002 ▽
- Parent ID: TEMPUSNY001
- Name: James Robert
- BIC #: TEMPUSNY002

Contact Identification
- Name: Jamie
- Address: 32342 Wall Street
- City: New York
- State: NY
- Zip: 10025
- Country: USA
- Phone: 212-789-8657
- Fax: 212-479-6987
- E-mail: robert@templeton.com

Other Info
- Base Currency: USD ▽
- Archive After: 25 days

Scheduler Preference
○ Automatic  ◉ Manual  ○ Scheduled

Last Archived On: Jan 1 1900 12:00AM
Last Archived By: Not archived.

Created On: 01-Jan-1999 06:16:41
Created By: SYSADMIN-USER

Last Modified On: 01-Dec-1999 08:18:01
Last Modified By: Customer Service User 1

[OK] [Close] [Help]

| Fund Manager-Services-List for TEMPUSNY002 | | | | |
|---|---|---|---|---|
| Service Type ID | Import/Reconcile | Service | File Extension | File For |
| ACCT | Import Only | Daily | act | Tab De |
| CLIENT | Import Only | Daily | cli | Fixed L |
| TRAN | Import/Reconcile | Daily | trn | Pipe D |

Add... 262
Modify... 268
Delete... 270
View... 272
Clear 266
Close 274
Print
Help

Fund Manager Services-Details [Modify] for TEMPUSNY002

Service Type ID: TRAN

Import Specifications

| Field | Value | | Field | Value |
|---|---|---|---|---|
| Directory | x:\IST\Import\Tran\TempletonChild | Browse... | File Name | Templeton Transactions |
| File Format | Pipe Delimited | | File Extension | trn |
| Table Name | cars_tb_FM_Transactions | | Last Received On | Jan 1 1999 9:25AM |

Match Data Option
○ New Data  ○ Unmatched Data  ◉ All Data

File Transfer Mode
○ Update Changed Fields  ◉ Replace Entire Record

Service Level
◉ Daily  ○ Weekly  ○ Monthly  ○ Others   Number Of Days [0]

Import/Reconcile
○ Import Only  ◉ Import + Reconcile

Archival Specifications

| Directory | x:\IST\Archive\Tran\TempletonChild | Browse... | File Name | tranarchive |
|---|---|---|---|---|

| Created On | 01-Jan-1999 09:25:13 | Created By | SYSADMIN-USER |
|---|---|---|---|
| Last Modified On | 01-Jan-1999 09:25:13 | Last Modified By | SYSADMIN-USER |

264 —— [ OK ]  [ Close ]  [ Help ]

FIG. 26

Fund Manager Mapping - List All TEMPUSNY002

| Service Type ID | Output Field | Import Field | Field Order | Field Is | Field |
|---|---|---|---|---|---|
| ACCT | AccountName | AccountName | 4 | Y | 0 |
| ACCT | AccountTypeID | AccountTypeID | 3 | Y | 0 |
| ACCT | BaseCurrency | BaseCurrency | 5 | Y | 0 |
| ACCT | BIC | BIC | 6 | Y | 0 |
| ACCT | ClientID | ClientID | 1 | Y | 0 |
| ACCT | ClientSafeKeept | ClientSafeKeept | 7 | Y | 0 |
| ACCT | PrimaryAccount | PrimaryAccount | 2 | Y | 0 |
| ACCT | ClientID | ClientID | 1 | Y | 0 |
| ACCT | ClientName | ClientName | 2 | Y | 9 |
| ACCT | CustodianID | CustodianID | 3 | Y | 22 |
| ACCT | BaseCurrency | BaseCurrency | 10 | Y | 0 |
| ACCT | BuySellFlag | BuySellFlag | 17 | Y | 0 |
| ACCT | ClientAccountN | ClientAccountN | 8 | Y | 0 |
| ACCT | ClientID | ClientId | 1 | Y | 0 |

Add...
Modify...
Delete...
View...
Clear
Close
Print
Help

| Custodians - List All | | | |
|---|---|---|---|
| Search On | | | Search (310) |
| Custodian ID | | | |
| Custodian Name | | | |

| | | | Add... (314) |
|---|---|---|---|
| | | | Modify... (318) |
| | | | Delete... (320) |
| Custodian ID | Custodian Name | Custodian BIC | View... (322) |
| CITIUK111 | Citibank London | CITIUK111 | Clear (312) |
| CITIUS111 | Citibank New York | CITIUS111 | Close (330) |
| CITIUS222 | Citibank Chicago | CITIUS222 | Print |
| | | | Contacts... (324) |
| | | | Services... (328) |
| | | | Map... (326) |
| | | | Help |

FIG. 29

Custodian - Details [Modify]

| | | |
|---|---|---|
| Custodian ID: CITIUK111 | Custodian Name: Citibank London | OK / Close |
| BIC: CITIUK111 | Parent Custodian: CITICORP GROUP | Help |
| Base Currency: GBP ▼ | | |
| CreatedOn: 01-Jan-1999 07:10:15 | Created By: Customer Service User 1 | |
| Last Modified On: 01-Jan-1999 07:10:15 | Last Modified By: Customer Service User 1 | |

FIG. 30

Contact - Details [Modify]

| | | | |
|---|---|---|---|
| Contact Person | Angella | Salutation | Ms. |
| First Name | Angella | Last Name | Christie |
| Address | E43rd Street | Phone Number | 212-547-9000 |
| | New York, USA | Fax Number | 212-547-9000 |
| Job Title | ACCMgr | Email ID | angella@citiny.com |
| Created On | 01-Jan-1999 09:55:20 | Created By | SYSADMIN-USER |
| Last Modified On | 01-Jan-1999 09:55:20 | Last Modified By | SYSADMIN-USER |

[OK]   [Close]   [Help]

FIG. 32

| Custodian Services - List All CITIUS111 | | | |
|---|---|---|---|
| Service Type ID | File Extension | Import File Format | Im |
| HLD | hld | Comma Delimited | ca |
| TRAN | trn | Tab Delimited | ca |

354 — Add...
360 — Modify...
362 — Delete...
364 — View...
358 — Clear
366 — Close
Print
Help

FIG. 33

Custodian Services - Details [Modify]

Service Type ID: TRAN

Import Specifications

| Field | Value | | Field | Value |
|---|---|---|---|---|
| Directory | x:\IST\Import\Tran\CITIUS111 [Browse...] | | File Name | CITIUS1 |
| File Format | Tab Delimited | | File Extension | trn |
| Table Name | cars_tb_CB_Transactions | | File Maint Mode | Replace |
| File Recd On | Jan 1 1900 12:00AM | | Rec Start Postn | 0 |

Archival Specifications

| Field | Value | | Field | Value |
|---|---|---|---|---|
| Directory | x:\IST\Archive\Tran\CITIUS111 [Browse...] | | File Name | trnarchive |
| Created On | 01-Jan-1999 09:37:00 | | Created By | SYSADMIN-USER |
| Last Modified On | 01-Jan-1999 09:37:00 | | Last Modified By | SYSADMIN-USER |

[OK]  [Close]  [Help]

FIG. 34

Custodian Mapping - Details [Modify] — 370

Service Type ID: HLD

Mapping Details
- OutputFieldName: ClientID
- ImportFieldName: Client ID
- FieldDescription: Client ID
- Permit Match-Rule Definition? ✓

Translation Details
- Translation Required? ☐
- Table Name: ▽
- Primary Field Name: ▽
- Secondary Field Name: ▽
- Default Value:
- Length:

Import Field Details
- Field Mandatory? ✓
- Permit Replace? ✓
- Order: 1
- Start Position:

Created On: 01-Jan-1999 12:14:26
Last Modified On: 10-Jul-1998 08:01:44
Created By: Customer Service User 1
Last Modified By: Fund Manager User 1

OK — 374
Close
Help

Client - Details [Modify]

Client ID: COCACOLA
Client Name: Coca Cola
Custodian ID: CITIUS111

CreatedOn: 01-Jan-1999 10:57:49
Last Modified On: 01-Jan-1999 10:57:49
Created By: Fund Manager User2
Last Modified By: Fund Manager User2

OK  Close  Help

Account Details [Modify]

Client ID: COCACOLA

Identification Information
- Primary Account ID: COKEACC1
- Account Name: COKE_ACC1

Account Information
- Account Type ID: TYPE1
- Base Currency: USD

SafeKeeping Account Details
- BIC:
- ClientSafeKeepingA/C: COKESafeAccount1

Import File Information
- Import File Name:
- Import Rec Seq No: 0
- Imported On:
- Date Last Received On:

Created On: 01-Jan-1999 11:10:16
Last Modified On: 01-Jan-1999 11:10:16
Created By: Fund Manager User2
Last Modified By: Fund Manager User2

[OK] [Close] [Help]

Account Type - Details [Modify]

Account Type ID: TYPE1
Account Type Desc: TYPE 1 Account for ST

CreatedOn: 01-Jan-1999 09:45:15
Created By: Fund Manager User 4

Last Modified On: 01-Jan-1999 09:45:15
Last Modified By: Fund Manager User 4

OK
Close
Help 524
532

Match Group - Details [Modify]

- Service Type ID: HLD
- Match Group Name: Match Group 1
- Color Code:
- Comment: Match Group 1
- Match Group ID: MG01
- Match Mode:
  - ● Automatic
  - ○ Manual
- Created By:
- Last Modified By:
- Created On:
- Last Modified On:

[OK] [Close] [Help]

FIG. 47

Match Group Element List — 570

Service Type ID HLD  Match GroupID MG01

| Field to | Field to | Match Order | Match Rule | Nominal Tol. | Percent |
|---|---|---|---|---|---|
| ClientID | ClientID | 1 | A | 0 | 0 |
| PrimarySecuri | PrimarySecuri | 2 | A | 0 | 0 |
| ValueDate | ValueDate | 3 | A | 0 | 0 |
| Quantity | Quantity | 4 | A | 0 | 0 |

Buttons: Add… (574), Modify… (580), Delete… (582), View… (584), Clear (578), Close (586), Print, Help

FIG. 48

Match Group Element - Details [Modify]

| | | | |
|---|---|---|---|
| Service Type ID | HLD | Match Group ID | MG01 |
| Field to Match(FM) | ClientID ▽ | Field to Match(CB) | ClientID ▽ |
| Aggregate Field (FM) ? | ☐ | Aggregate Field (CB) ? | ☐ |
| Start Char. for Match(FM) | 0 | Start Char. for Match(CB) | 0 |

Match Rule
- ⊙ Absolute
- ○ Mapped

Tolerance
- ⊙ Nominal
- ○ Percent

Order Of Match [ 1 ]

Special Rule Table Required ☐

Table Name for Special Match [ ▽ ]

| | | | |
|---|---|---|---|
| Created On | 01-Jan-1999 14:16:52 | Created By | Fund Manager User 2 |
| Last Modified On | 01-Jan-1999 14:16:52 | Last Modified By | Fund Manager User 2 |

OK  
Close  
Help

Match Group Level - Details [Modify]

- Service Type ID: HLD
- Custodian ID: CITIUS111
- Match Group ID: MG01
- Security Type ID: SECURITY1
- Match Group Level No.: 1
- Color Code: SECURITY1
- Match Group Level Desc.: LEVEL 1

- Created On: 01-Jan-1999 14:29:32
- Created By: Fund Manager User 2
- Last Modified On: 31-Dec-1999 06:03:24
- Last Modified By: Fund Manager User 2

OK / Close / Help

FIG. 51

Fund Manager Security Mapping - List All

Search On
- Custodian ID
- FM Primary Security ID

[Search]

| Custodian ID | FM Primary Sec ID | CB Primary Sec ID |
|---|---|---|
| CITIUS111 | KELLOGS 2002 BON | KELLOGS 2002 |
| CITIUS111 | KELLOGS EQ US | KELLOGS 2002 |
| CITIUS111 | PEPSI EQ US | PEPSI EQ US |

Buttons: Add... (608), Modify... (614), Delete... (616), View... (618), Clear (612), Close (620), Print, Help

Fund Manager Security Mapping - Details [Modify]

Custodian ID: CITIUS111  Custodian Name: Citibank New York

FM Primary Sec ID: KELLOGS 2002 BON

CB Primary Sec ID: KELLOGS 2002 BON

CreatedOn: 01-Jan-1999 14:53:57  Created By: Fund Manager User 2

Last Modified On: 01-Jan-1999 14:53:57  Last Modified By: Fund Manager User 2

OK / Close — 610

Help

| | Client ID | Value Date | Total Records [F] | % Matched | Total Records [C] | % Matched |
|---|---|---|---|---|---|---|
| ▲ | BRITISHAIR | 31-Dec-1999 | 3 | 66.66 | 3 | 66.66 |
| | GENELECTRIC | 31-Dec-1999 | 3 | 66.66 | 3 | 66.66 |
| * | | | | | | |

Matched Summary Display Database : Current

Date Range
Period From: 01-Jul-1998
Period To: 01-Jul-2098

Fund Manager ID: JAMCUKL0001 — 638
Service Type: HLD — 640

Query

Delete | Lock | Unlock | Match | Unmatch | Approve | Unapprove | Archive | Unarchive | Print | Help | Close
642 | 644 | 646 | 648 | 650 | 652 | 654 | 656 | 658 | 660

Matched Holdings List for Fund Manager: JAMCUKLO001, Client ID: BRITISHAIR, Value Date: 31-Dec-1999

| Subscriber | MatchedReference | FundMgrID | PrimaryAccountID | SecurityTypeID | MktValLoca |
|---|---|---|---|---|---|
| F | 200101290732051 | JAMCUKLO001 | BAACC1 | | 1.500000 |
| C | 200101290732051 | JAMCUKLO001 | BASafeAccount1 | SECURITY1 | 1.500000 |
| F | 200101290732053 | JAMCUKLO001 | BAACC1 | | 25.000000 |
| C | 200101290732052 | JAMCUKLO001 | BASafeAccount1 | SECURITY1 | 25.000000 |
| * | | | | | |

Comments | Unmatch | View Details | Print | Help | Close

FIG. 56

| Subscriber | MatchedReference | StatementDate | TransactionReference | TradeDate | LocalCurr |
|---|---|---|---|---|---|
| F | 20010129073307 | Jan 1 2000 12:00AM | 1 | Dec 31 1999 12:00AM | GBP |
| C | 20010129073307 | Jan 1 2000 12:00AM | BAUK1001a | Dec 31 1999 12:00AM | GBP |
| C | 20010129073307 | Jan 1 2000 12:00AM | BAUK1001b | Dec 31 1999 12:00AM | GBP |
| F | 20010129073308 | Jan 1 2000 12:00AM | 3 | Dec 31 1999 12:00AM | USD |
| C | 20010129073308 | Jan 1 2000 12:00AM | BAUK1003a | Dec 31 1999 12:00AM | USD |
| C | 20010129073308 | Jan 1 2000 12:00AM | BAUK1003b | Dec 31 1999 12:00AM | USD |
| C | 20010129073308 | Jan 1 2000 12:00AM | BAUK1003c | Dec 31 1999 12:00AM | USD |
| C | 20010129073308 | Jan 1 2000 12:00AM | BAUK1003d | Dec 31 1999 12:00AM | USD |
| C | 20010129073308 | Jan 1 2000 12:00AM | BAUK1003e | Dec 31 1999 12:00AM | USD |
| * | | | | | |

Comments | Unmatch | View Details | Print | Help | Close

FIG. 57

Unmatched Transactions List for Fund Manager : JAMCUKLO001, Client ID : BRITISHAIR, Statement Date : 01-Jan-20...

Manager

| ClientID | PrimarySecurityID | BuySellFlag | Quantity | Price | ExchangeR |
|---|---|---|---|---|---|
| BRITISHAIR | SHELL2002BONDSUK | S | 1000.000000 | 25.000000 | 1.00000 |

Bank

| BankReferenceNo | BuySellIndicator | ClientID | FundMgrID | PrimarySecurityID | Quantity |
|---|---|---|---|---|---|
| BAUK1002 | S | BRITISHAIR | JAMCUKLO001 | SHELL2002BONDSUK | 900.000000 |

Match — 682
CB Comments — 684
FM Comments — 686
View Details — 688
Print — 690
Help — 692
Close — 694

Unmatched Holdings List for Fund Manager : JAMCUKLO001, Client ID : BRITISHAIR, Value Date : 31-Dec-1999

Manager

| ClientID | PrimarySecurityID | Quantity | Price | LocalCurrency | PrimaryA |
|---|---|---|---|---|---|
| BRITISHAIR | SHELL2002BONDSUK | 500.000000 | 10.000000 | USD | BAACC2 |

Bank

| ClientID | CustodianBIC | Depository | LongShortIndicator | OriginalSecurityID | Price |
|---|---|---|---|---|---|
| BRITISHAIR | CITIUK111 | CITIUK | S | OrginalSHELL2002 | 10.000000 |

Match  CB Comments  FM Comments  View Details  Print  Help  Close
 682      684         686          688          690    692   694

FIG. 59

| Activity Log | | | | | |
|---|---|---|---|---|---|
| Period From 01-Jul-1998 ▽ | | Period To 01-Jul-2098 ▽ | | | View |
| Fund Manager IDs | | Activity Types | | | Close |
| JAMCUKLO001 ▽ | | All ▽ | | | Print |
| | | | | | Help |
| Activity Date | Activity Type ID | User Name | Activity Start End | Activity Description | |
| 01-Jan-2000 | Approve-Manual | FMUser1 | S | Manual Approval of Position | |
| 01-Jan-2000 | Approve-Manual | Fund Manager User | E | Manual Apprve of Transac | |
| 01-Jan-2000 | Approve-Manual | FMUser1 | S | Manual Approve of Position | |
| 01-Jan-2000 | Approve-Manual | Fund Manager User | E | Manual Apprve of Transacti | |
| 01-Jan-2000 | Approve-Manual | FMUser1 | S | Manual Approve of Position | |
| 01-Jan-2000 | Approve-Manual | Fund Manager User | E | Manual Apprve of Transacti | |
| 01-Jan-2000 | Approve-Manual | FMUser1 | S | Manual Approval of Position | |
| 01-Jan-2000 | Approve-Manual | Fund Manager User | E | Manual Apprve of Transacti | |
| 31-Jan-2000 | Approve-Manual | FMUser1 | S | Manual Approval of Position | |
| 31-Jan-2000 | Approve-Manual | Fund Manager User | E | Manual Apprve of Transacti | |
| 31-Jan-2000 | Approve-Manual | FMUser1 | S | Manual Approval of Position | |
| 01-Feb-2000 | Approve-Manual | Fund Manager User | E | Manual Apprve of Transacti | |
| 01-Feb-2000 | Approve-Manual | FMUser1 | S | Manual Approve of Transacti | |
| 01-Feb-2000 | Approve-Manual | FMUser1 | S | Manual Apprve of Transacti | |

FIG. 61

| Account List By Client Report | | | | |
|---|---|---|---|---|
| Date 14/Jul/1998 03:29:11PM | | | | User Fund Manag |
| | | *Account List By Client* | | |
| ClientID All Client IDs | | | | |
| ClientID | PrimaryAccountID /744 | AccountTypeID /746 | AccountName /748 | CustodianID /750 |
| *Client1* | *Client1AS WAS IMPORTED* | | | |
| | Acct1 | TYPE1 | Acct1 | CITIUS111 |
| *Client10 Client* | Acct10 | TYPE1 | Acct10 | CITIUS111 |
| *Client11 Client* | Acct11 | TYPE1 | Acct11 | CITIUS111 |
| *Client12 Client* | Acct12 | TYPE1 | Acct12 | CITIUS111 |
| *Client13 Client* | Acct13 | TYPE1 | Acct13 | CITIUS111 |
| *Client14 Client* | Acct14 | TYPE1 | Acct14 | CITIUS111 |
| *Client15 Client* | Acct15 | TYPE1 | Acct15 | CITIUS111 |

Audit Log Report

| | | | Total 1708 100% | | |
|---|---|---|---|---|---|

Date 14/Jul/1998 02:23:05PM

*Audit Log Report*

Period From 30/Jun/1989

Period To 22/Jul/2005     Audit Types <u>All Audit Types</u>

| <u>Audit Type</u> | <u>Table Affected</u> | <u>Audit Date Time</u> | <u>Remarks</u> | <u>User</u> Customer |
|---|---|---|---|---|
| Insert | cars_tb_Account | 30/Jun/1998 12:41:19 | TYPE1 \|Acct16DEM\|\|\|<br>\|daaqpsds<br>\|<br>Fund Manager User 4 Jun 30 1998 12:41PM \|\| | |
| Insert | cars_tb_Account | 30/Jun/1998 12:43:07 | TYPE1 \|samirb INR \|\|\|<br>\|samirb<br>\|<br>Fund Manager User 4 Jun 30 1998 12:43PM \|\| | |
| Delete | cars_tb_Account | 30/Jun/1998 12:43:32 | TYPE1 \|samirb INR \|\|\|<br>\|samirb<br>\|<br>Fund Manager User 4 Jun 30 1998 12:43PM \|\| | |
| Insert | cars_tb_Account | 30/Jun/1998 12:51:33 | TYPE1 \|DELTA_ACC1GBP\|\|\| | |

FIG. 67

Error Log Report

☑ ☐  1 of 1+  ☐ ▷ ☒ ☐ ☐  Total 524  100%

Date 14/Jul/1998  3:26:36PM

Period From  14/Jul/1998

Period To  29/Jan/2001

*Error Log Report*

User Custome

Fund Manager ID  Error Date  Error Severity  UserID

*JAMCUKL0001*

| Error Date | Time | Severity | UserID |
|---|---|---|---|
| 31/Dec/1999 | 10:10:55 | Warning | |
| 31/Dec/1999 | 10:14:59 | Warning | |
| 31/Dec/1999 | 10:29:32 | Fatal | System Initiated |
| 31/Dec/1999 | 11:28:13 | Warning | |
| 01/Jan/2000 | 05:19:05 | Warning | |
| 01/Jan/2000 | 05:19:05 | Warning | |
| 01/Jan/2000 | 05:19:06 | Warning | |
| 01/Jan/2000 | 05:45:09 | Warning | |
| 01/Jan/2000 | 05:45:10 | Warning | |
| 01/Jan/2000 | 05:45:10 | Warning | |
| 01/Jan/2000 | 05:54:10 | Warning | |
| 01/Jan/2000 | 05:54:10 | Warning | |
| 01/Jan/2000 | 05:56:10 | Warning | |
| 01/Jan/2000 | 07:47:06 | Fatal | System Initiated |
| 31/Jan/2000 | 05:48:38 | Warning | |
| 31/Jan/2000 | 07:07:07 | Warning | |
| 31/Jan/2000 | 07:08:08 | Warning | |
| 01/Feb/2000 | 05:44:40 | Warning | |
| 01/Feb/2000 | 05:52:45 | Warning | |
| 01/Feb/2000 | 05:59:51 | Warning | |

Percentage Matched By Custodian and Client Report

☑  ☐◇☒☐☐  Total 1  100%  1 of 1+

Percentage Matched By Custodian & Client

Date 14/Jul/1998  03:30:41PM

Period From 14/Jul/1998

Period To 29/Jan/2001

Service Type ID  HLD Use

| Custodian ID | Client ID | FM Records | % Matched |
|---|---|---|---|
| CITIUS111 | | | |
| | COCACOLA | 3 | 100.00 |
| | Average | | 100.00 |

*End of Report*

FIG. 71

| Matched Holdings By Client Report | | | | | |
|---|---|---|---|---|---|
| ☒ 1 of 1+ ☐☒☒☐ ☐☐☐☐ Total 6 100% | | | | | |

*Matched Holdings By Client*

Date 14/Jul/1998 03:33:57PM    User    Fun

Period From 31/Dec/1999    Client ID    All Client IDs

Period To 29/Jan/2001

*Bank records in grey background*

| ClientID Value Date | Account No | Security ID | Price | Quantity |
|---|---|---|---|---|
| *COCACOLA* | | | | |
| 31/Dec/1999 | COKEACC1 | KELLOGS EQ US | 1.5000 | 500.0000 |
| 31/Dec/1999 | COKEACC1 | PEPSI EQ US | 25.0000 | 1,000.0000 |
| 31/Dec/1999 | COKEACC2 | KELLOGS 2002 BON | 10.0000 | 500.0000 |
| 31/Dec/1999 | COKESafeAccount1 | KELLOGS EQ US | 1.5000 | 500.0000 |
| 31/Dec/1999 | COKESafeAccount1 | PEPSI EQ US | 25.0000 | 1,000.0000 |
| 31/Dec/1999 | COKESafeAccount2 | KELLOGS 2002 BON | 10.0000 | 500.0000 |

*End of Report*

FIG. 73

Matched Transactions By Client Report

☑ 1 of 1+  ☐▷☒☐☐☐  Total 6  100%

Date 14/Jul/1998  03:40:23PM

Period From 14/Jul/1998
Period To 29/Jan/2002

Bank records in grey background

Matched Transactions By Client

Client ID   All Client IDs

ClientID

| Statement Date | TransactionRef | Account No | Security ID | Price | Quantity |
|---|---|---|---|---|---|
| XEROX | | | | | |
| 01/Jan/2000 | 1 | XEROXACC1 | MICROSOFT EQ US | 12.0000000 | 1,000 |
| 01/Jan/2000 | 2 | XEROXACC1 | COKE US | 7.0000000 | 2,000 |
| 01/Jan/2000 | 3 | XEROXACC2 | SUN EQ UK | 12.0000000 | 500 |
| 01/Jan/2000 | XEROX1001 | XEROXSafeAccount1 | MICROSOFT EQ US | 0.0000000 | 1,000 |
| 01/Jan/2000 | XEROX1002 | XEROXSafeAccount1 | COKE US | 0.0000000 | 2,000 |
| 01/Jan/2000 | XEROX1003 | XEROXSafeAccount2 | SUN EQ UK | 0.0000000 | 500 |

*End of Report*

FIG. 75

Unmatched Holdings By Client

Period From 14-Jul-1998 — 872  
Period To 29-Jan-2001 — 874

Client ID  
Client IDs:
- Client48 - Client
- Client49 - Client
- Client5 - Client
- Client50 - Client
- Client6 - Client
- Client7 - Client
- Client8 - Client
- Client9 - Client
- COCACOLA - Coca Cola Inc.

Unselect All — 876

Record Source
- ◉ Fund Manager
- ○ Custodian Bank
- ○ Both

Report Action — 878
- ◉ View
- ○ Print — 882
- ○ Save In File — 884

[Report] [Clear] [Close] [Help] — 880

Unmatched Holdings By Client Report 1 of 1+   ☑☐☒☐   Total 6   100%   – ☐ ✕

Date 14/Jul/1998  03:37:56PM

*Unmatched Holdings By Client*

Period From 14/Jul/1998

Period To  29/Jan/2001                     Client ID  All Client IDs                              Us Option  Both [Bank records in grey background]

| ClientID | Value Date | Account No | Security ID | Price | Quantity |
|---|---|---|---|---|---|
| COCACOLA | 31/Dec/1999 | COKEACC1 | KELLOGS EQ US | 1.5000 | 500.0000 |
| | 31/Dec/1999 | COKEACC1 | PEPSI EQ US | 25.0000 | 1,000.0000 |
| | 31/Dec/1999 | COKEACC2 | KELLOGS 2002 BON | 10.0000 | 500.0000 |
| | 31/Dec/1999 | COKESafeAccount1 | KELLOGS EQ US | 1.5000 | 500.0000 |
| | 31/Dec/1999 | COKESafeAccount1 | PEPSI EQ US | 25.0000 | 1,000.0000 |
| | 31/Dec/1999 | COKESafeAccount2 | KELLOGS 2002 BON | 10.0000 | 500.0000 |

*End of Report*

FIG. 77

Unmatched Transactions By Client

Period From [14-Jul-1998 ▽] — 900    Period To [29-Jan-2002 ▽] — 902

Clients
- Client48 - Client
- Client49 - Client
- Client5 - Client
- Client50 - Client
- Client6 - Client
- Client7 - Client
- Client8 - Client
- Client9 - Client
- XEROX - Xerox

[Unselect All] — 904

Record Source
◉ Fund Manager  ○ Custodian Bank  ○ Both

Report Action
◉ View — 908   ○ Print   ○ Save In File — 912

[Report] — 910  [Clear]  [Close]  [Help]

Unmatched Transactions By Client Report

Unmatched Transactions By Client

Date 14/Jul/1998  03:42:15PM

Period From  14/Jul/1998

Period To  29/Jan/2002

Option  Both [Bank records in grey background]

Client ID  All Client IDs

ClientID

XEROX

| Statement Date | TransactionRef | Account No | Security ID | Price |
|---|---|---|---|---|
| 01/Jan/2000 | 1 | XEROXACC1 | MICROSOFT EQ US | 12.0000 |
| 01/Jan/2000 | 2 | XEROXACC1 | COKE US | 7.0000 |
| 01/Jan/2000 | 3 | XEROXACC2 | SUN EQ UK | 12.0000 |
| 01/Jan/2000 | XEROX1001 | XEROXSafeAccount1 | MICROSOFT EQ US | 0.0000 |
| 01/Jan/2000 | XEROX1002 | XEROXSafeAccount1 | COKE US | 0.0000 |
| 01/Jan/2000 | XEROX1003 | XEROXSafeAccount2 | SUN EQ UK | 0.0000 |

*End of Report*

Position Aging Report

| ⊠ | ◁ | 1 of 1+ | △ | ▷ | □ | 50% | ▽ | Total: 33 | 100% | 33 of 33 |

Position Aging Report

From: 12-Dec-1999 To: 20-Mar-2000     Bank record(s) are in gray background

| Account Components | BK Account | Value Date | Primary Security ID | Quantity | Maturity Date | Market Value Local Currency |

Custodian ID :    CITIBANK      Number of Days in Range     51 - 55 Days

ClientID :   111AK

ClientID :   222AK

ClientID :   333AK

27-Mar-2000   3:27:23PM      User : Alan Schneider      Page 1 of 2

FIG. 82

Custodian Cash Report

| ▼ | 1 of 1+ | △ ▷ □ | 50% ▽ | Total: 15 | 100% | 15 of 15 |

Custodian Cash Report - Detail Statement

Period Settlement Date : 21-Jan-2000    Client ID : 444AK-444AK

Client
Custodian       Safekeeping Account    Primary Account
Company
   Settlement Date 444AK
CITIBANK    4440
USD
   01-Jan-2000    Opening Balance    15,311,346.52                15,311,346.52

Closing Balance    12,923,947.89        12,923,947.89

27-Mar-2000  3:27:23PM              User :  Alan Schneider              Page 1    of    2

FIG. 83

SYSTEM AND METHOD FOR CENTRALIZED AUTOMATED RECONCILIATION OF CUSTODY ACCOUNTS

CROSS REFERENCE TO RELATED APPLICATIONS

This application claims priority to applicant's application having U.S. Ser. No. 60/126,764 filed Mar. 29, 1999.

FIELD OF THE INVENTION

The present invention relates to automated reconciliation of investment manager and related custody accounts, and in particular to a system and method for centralized automated reconciliation of those accounts.

BACKGROUND OF THE INVENTION

In today's investment environment, investment managers or fund managers who represent, for example, institutional investors have to demonstrate to those institutional investors that their records agree with the records maintained by the custodians of the institutions' investment assets, such as the institutional investors' banks. For example, a fund manager acting on behalf of an investor or client buys and sells securities, and those same securities are safe-kept with custodians, such as banks. The fund manager and the custodian each maintains its own books and records, and the securities and cash balances and transactions among those different books and records must be regularly and periodically reconciled.

Typically, the process of reconciling the different books and records is an entirely manual procedure which is performed by the fund manager. The fund manager receives paper statements from the custodian, and the fund manager generally deals with many different custodians. The fund manager pulls a report from its own internal portfolio tracking system and typically performs an "eyeball" scan, such as one hundred shares of IBM on the fund manager's record and one hundred shares of IBM on the custodian's record. The process continues in the same way, for example, for position after position, transaction after transaction, cash item after cash item, and for client after client, until completed.

Such a manual process is extremely tedious and time consuming. Fund managers typically dedicate from two persons up to as many as forty-five persons to this manual process, depending upon how many clients a particular fund manager has. The manual process is error prone and provides no value whatsoever to the business of the fund managers. Most fund managers express a preference to outsource the reconciliation process, if a reliable outsource facility existed.

SUMMARY OF THE INVENTION

It is a feature and advantage of the present invention to provide a system and method for centralized automated reconciliation of client investment accounts which utilizes sophisticated matching software that facilitates the reconciliation of securities and cash positions, transactions and settlements.

It is a further feature and advantage of the present invention to provide a centralized automated reconciliation system and method that provides on-line windows to the results with sort and select capabilities and full investigative facilities to streamline operational work flow and speed up the process to more timely client reporting.

It is another feature and advantage of the present invention to provide a centralized automated reconciliation system and method which enables reconciliation and management of investigations with limited initial investment, low recurring costs and minimum operational involvement.

It is still another feature and advantage of the present invention to provide a centralized automated reconciliation system and method which is fully outsourced to a trusted and experienced service provider which assures integrity and accuracy.

It is a still further feature and advantage of the present invention to provide a centralized automated reconciliation system and method which is seamless and continuous.

It is an additional feature and advantage of the present invention to provide a centralized automated reconciliation system and method with a single point of access for all custody data and accounting and investment activity information.

It is another feature and advantage of the present invention to provide a centralized automated reconciliation system and method that collects, reformats, enhances, and makes fit for electronic reconciliation all of the data from all of its sources.

To achieve the stated and other features, advantages, and objects of the present invention, an embodiment of the present invention makes use of computer hardware and software to provide a method and system for centralized automated reconciliation of accounts, such as fund manager accounts and related custody accounts. An embodiment of the present invention includes a graphical user interface and other system components that enables, for example, a first account record to be received in a service bureau environment from a fund manager and a second account record to be received in the service bureau environment from a custodian. The account records that are received in the service bureau environment include, for example, positions or holdings, such as securities positions or holdings and cash positions or holdings, and transactions, such as securities transactions and cash transactions.

In an embodiment of the present invention, fund manager account records are received, for example, electronically from an internal portfolio tracking system of the fund manager. Custodian account records are received, for example, electronically via an interface to a custody network of the custodian over a network, such as a proprietary financial network. The account records are received electronically in the service bureau environment in varying message and file formats and the system software for an embodiment of the present invention parses, validates and reformats the records to a standard format for uploading to the service bureau database, for example, according to a predefined schedule.

In an embodiment of the present invention, the uploaded account records are automatically compared according to predefined matching rules to identify whether the first account record, for example, from the fund manager, matches the second account record, for example, from the custodian. The system allows either or both of the fund manager and the custodian to predefine the matching rules in any number of ways. For example, the available match groups for the fund manager and the custodian can be predefined. Likewise, the matching rules for one or both of the account records for positions or transactions can be predefined, and the matching rule can be predefined either substantially similar for each or different from one another.

In an embodiment of the present invention, predefining the matching rules also includes, for example, predefining matching criteria in terms of tolerance in one or both of percentage terms and nominal terms. Further, the matching rules can be predefined with respect to any number of items of account record data, such as account number, security identification, units, unit cost, total cost, unit price, and total market value. In addition, the matching rules can be predefined in terms of levels of match success.

The system for an embodiment of the present invention displays one or more reports of the results of the comparison process for viewing by a user and allows the user to download the report in a file. If the account records are identified in the comparison process as unmatched, the system displays a report of the results of the process for the user, for example, with the unmatched first and second account records displayed simultaneously on a consolidated screen. The system allows the user, for example, to manipulate the results, to view a historical report, and to enter data to manually match, date and user ID stamp for auditing the unmatched account records. The system stores a record of the manual match including, for example, a reason for the manual match, date and user Id stamp for auditing, which can be retrieved and viewed from time to time as needed.

The system for an embodiment of the present invention automatically creates mappings of security identifiers across the world's various schemes for identifying securities. The system also makes such capabilities and services available through the worldwide web.

These and other objects, advantages and novel features of the invention will be set forth in part in the description which follows, and in part will become more apparent to those skilled in the art upon examination of the following or may be learned by practice of the invention.

BRIEF DESCRIPTION OF THE DRAWINGS

FIGS. 10-12 are sample User Group screens for an embodiment of the present invention;

FIGS. 13 and 14 are sample User screens for an embodiment of the present invention;

FIGS. 17 and 18 are sample Currency screens for an embodiment of the present invention;

FIGS. 19 and 20 are sample Security screens for an embodiment of the present invention;

FIGS. 21 and 22 are sample Services screens for an embodiment of the present invention;

FIGS. 23-28 are sample Fund Manager screens for an embodiment of the present invention;

FIGS. 29-36 are sample Custodians screens for an embodiment of the present invention;

FIGS. 37 and 38 are sample Scheduler screens for an embodiment of the present invention;

FIGS. 39 and 40 are sample Client screens for an embodiment of the present invention;

FIGS. 41 and 42 are sample Account screens for an embodiment of the present invention;

FIGS. 44 and 45 are sample Account Type screens for an embodiment of the present invention;

FIGS. 46-51 are sample Match Group screens for an embodiment of the present invention;

FIGS. 52 and 53 are sample Fund Manager Security Mapping screens for an embodiment of the present invention;

FIGS. 55-57 are sample Matched screens for an embodiment of the present invention;

FIGS. 58 and 59 are sample Unmatched screens for an embodiment of the present invention;

FIGS. 60 and 61 are sample Audit Log Query screens for an embodiment of the present invention;

FIGS. 62 and 63 are sample Account Report screens for an embodiment of the present invention;

FIGS. 64-67 are sample Activity Log screens for an embodiment of the present invention;

FIGS. 68 and 69 are sample Error Log screens for an embodiment of the present invention;

FIGS. 70 and 71 are sample Percentage Matched screens for an embodiment of the present invention;

FIGS. 72 and 73 are sample Matched Holdings screens for an embodiment of the present invention;

FIGS. 74 and 75 are sample Matched Transactions screens for an embodiment of the present invention;

FIGS. 76 and 77 are sample Unmatched Holdings screens for an embodiment of the present invention; and FIGS. 78 and 79 are sample Unmatched Transactions screens for an embodiment of the present invention.

FIG. 80 is a sample Profile Setup screen for an embodiment of the present invention.

FIGS. 80a, 80b and 81 are sample Aging Report screens which represent the systems manifestation of the Aging Report for an embodiment of the present invention.

FIGS. 82 and 83 are sample Custodian Cash Report screens for an embodiment of the present invention.

DETAILED DESCRIPTION

Figure 1:
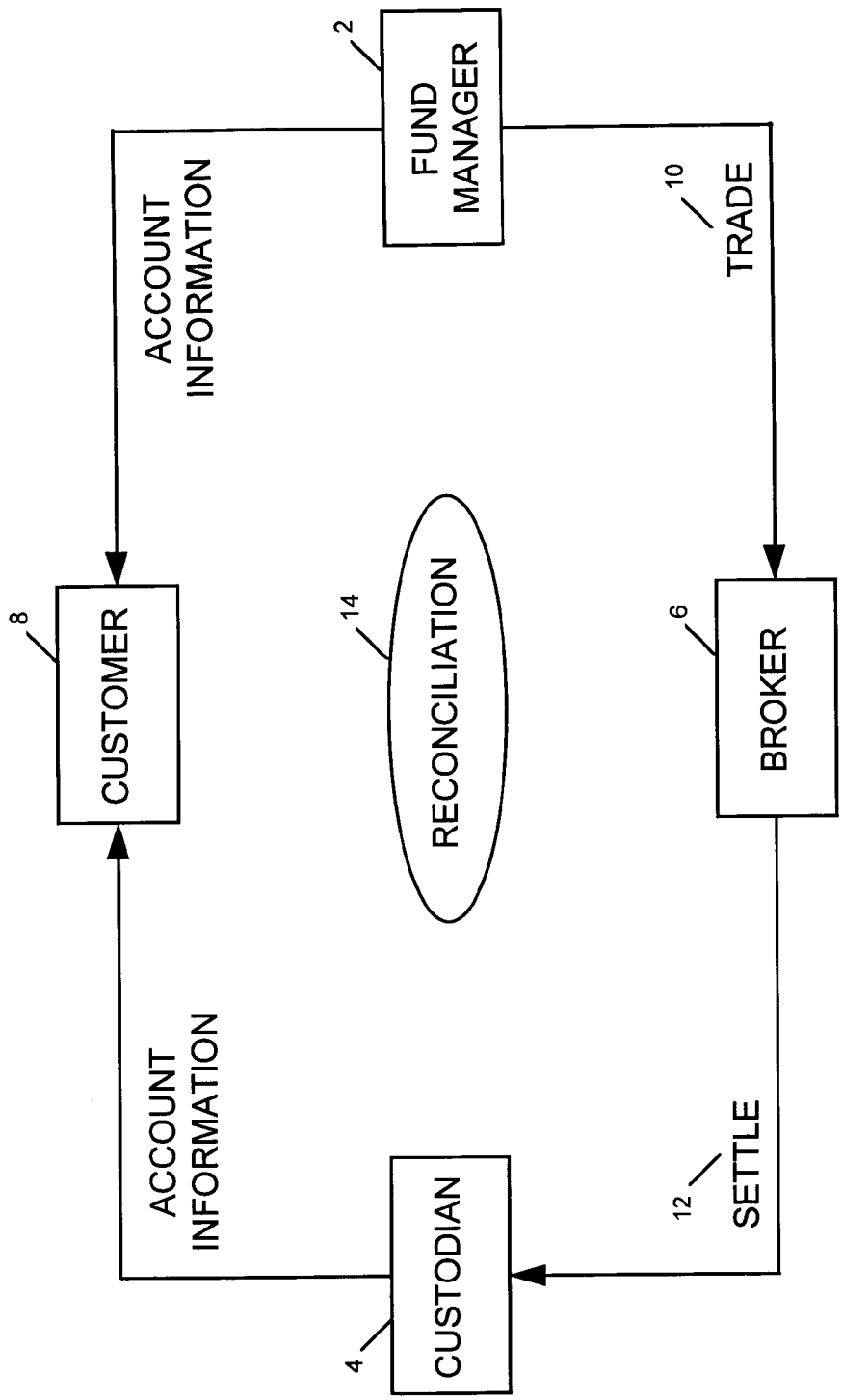
FIG. 1 is a schematic diagram which illustrates an overview of an example of key entities and the flow of information between the key entities for the process of reconciliation of custody accounts.

Referring now in detail to an embodiment of the present invention, an example of which is illustrated in the accompanying drawings, FIG. 1 illustrates an overview of an example of key entities and the flow of information between the key entities for the process of reconciliation of custody accounts. The trading, settlement, clearance, and safe-keeping of securities involves several individuals and organizations. These individuals and organizations include, for example, fund managers (or investment management firms) 2, custodians 4, brokers 6, and depositories. Fund managers 2 make investments in securities on behalf of their customers 8. These trades 10 are normally made through the services of brokers 6, who act as agents for the fund managers 2. Brokers 6, in turn, settle 12 the trade 10 with custodians 4, who hold the physical/electronic securities.

The presence of several organizations in the investment process, with each maintaining its own books and records, gives rise to the need for regular or periodic reconciliation 14 of securities and cash balances and transactions among these different books and records. Consider, for example, the fund manager 2 and the custodians 4. A fund manager may deal with one or more custodians, depending on the choices made by the customers 8 whose funds they manage. Similarly, a custodian 4 may undertake safe-keeping responsibilities for a variety of customers 8, whose funds may be managed by different fund managers 2. Each organization in this network maintains its own records for the same set of customer accounts. The process of reconciling customer accounts is a fiduciary responsibility that follows from the management of such accounts.

Differences in the records maintained by the fund manager 2 and the custodian 4 may arise due to several reasons. A difference may arise due to the usage of different systems and procedures to recognize sales, purchases, and corporate actions. Differences can also arise due to differences in the timing of such recognition. The balances of the fund manager 2 and the custodian 4 for the account of the same customer 8 may be accurate according to their own books, but these "accurate" balances may be different from one another. Whatever the causes of these differences, it is clear that there exists a need for identifying the differences between the two sets of records, and initiating steps to resolve them. This process is called reconciliation 14. The process of investment reconciliation applies to the records, such as securities positions, cash positions, securities transactions, and cash transactions.

The predominant method of reconciliation in the market today is manual verification of printouts of statements from the accounting system of the fund manager 2 against printouts of statements from the system of the custodian 4. This is normally done one to two weeks after the close of the month. Reconciliation 14 is generally viewed as a repetitive and cumbersome task. Completing a reconciliation properly provides no visible organizational benefit. However, improper reconciliation can cause financial loss to the organization, and negatively impact investment results. Investment accounting and reconciliation is a people intensive process. An investment management firm may deploy anywhere between two to thirty resources for this purpose, depending on the number of accounts and the size of the portfolio that it manages.

An initial task in the process of reconciliation of the records of the fund manager 2 with those of the custodian 4 is to make available the data of the one to the other. For example, once the custodian's data has been acquired by the fund manager 2, the fund manager's personnel compares it with information generated from its internal investment portfolio accounting systems, to identify the differences between the two. These differences are then taken up for rectification through a process of detailed investigation.

Figure 2:
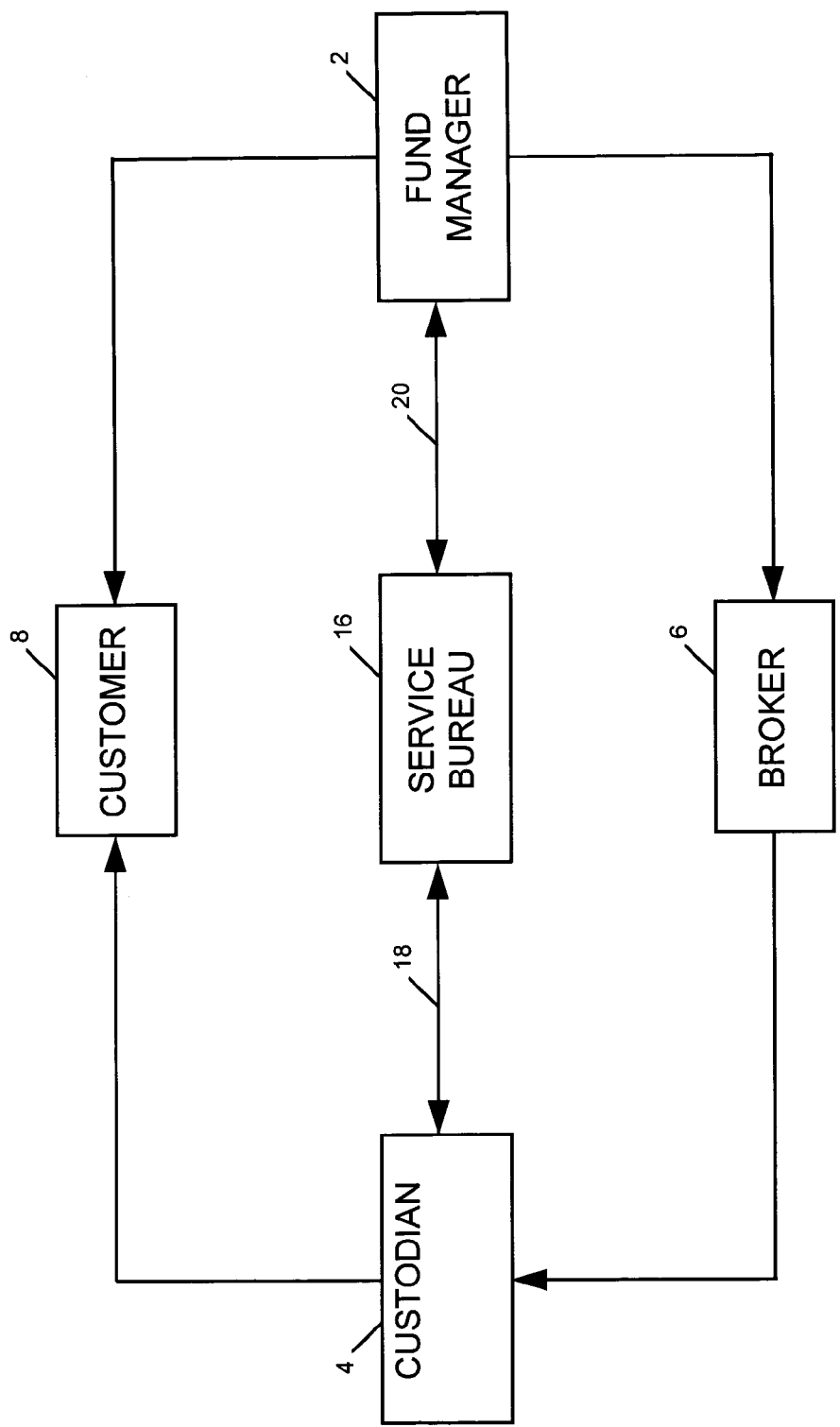
FIG. 2 is a schematic diagram which shows an overview of an example of key components and the flow of information between the key components in the service bureau approach to the reconciliation process for an embodiment of the present invention.

An embodiment of the present invention utilizes, for example, a service bureau approach. FIG. 2 is a schematic diagram which shows an overview of an example of key components and the flow of information between the key components in the service bureau approach to the reconciliation process for an embodiment of the present invention. Referring to FIG. 2, in the service bureau approach, a service bureau 16 affiliated with a financial institution, such as a bank, provides the service of getting the fund manager's data and the custodian's data into the system for an embodiment of the present invention and running a matching program which identifies the records that do not match. Thus, in an embodiment of the present invention, this component of the reconciliation function is automated. Given the distribution and usage of the application for an embodiment of the present invention by multiple legal entities, and the potential data volumes, the system for an embodiment of the present invention provides a robust, "industry-strength" application.

In the manual reconciliation process, the fund manager's personnel spend more than half of their time before they can get to a point at which they have identified all the records that do not match, and at which the actual reconciliation work begins. Usage of the system for an embodiment of the present invention results in significant savings on this count. The service bureau 16 is in a unique position in which it can obtain most of the data required for providing the reconciliation service with relative ease. The fund manager 2 provides the data because of the perceived benefits from the system. A SWIFT custodian 4 is able to send the data on the SWIFT network, and the financial institution's membership of SWIFT enables the affiliated service bureau 16 to obtain this data.

Within the service bureau approach to the reconciliation process for an embodiment of the present invention, the service bureau 16, which can be a financial institution, such as a bank, interfaces 18 with the custody network of an investment manager 4. The service bureau 16 develops feeds with the custody network to receive custody data electronically that was formerly provided in the form of paper statements. The service bureau 16 works directly with the fund manager 2 to bring in the data electronically 20 as it is represented on the particular internal portfolio tracking system of the fund manager 2.

The system and method for an embodiment of the present invention fully automates the entire reconciliation process. Based upon a sophisticated set of matching rules, which is decided by the fund manager 2, all of the data inputs are matched in the background in the service bureau environment on the hardware of the service bureau 16. On demand, the fund manager 2 accesses the service bureau 16 and is able to run reports, to determine whether and how all the securities positions matched, and to see specifically the details for securities positions which did not match.

Figure 3:
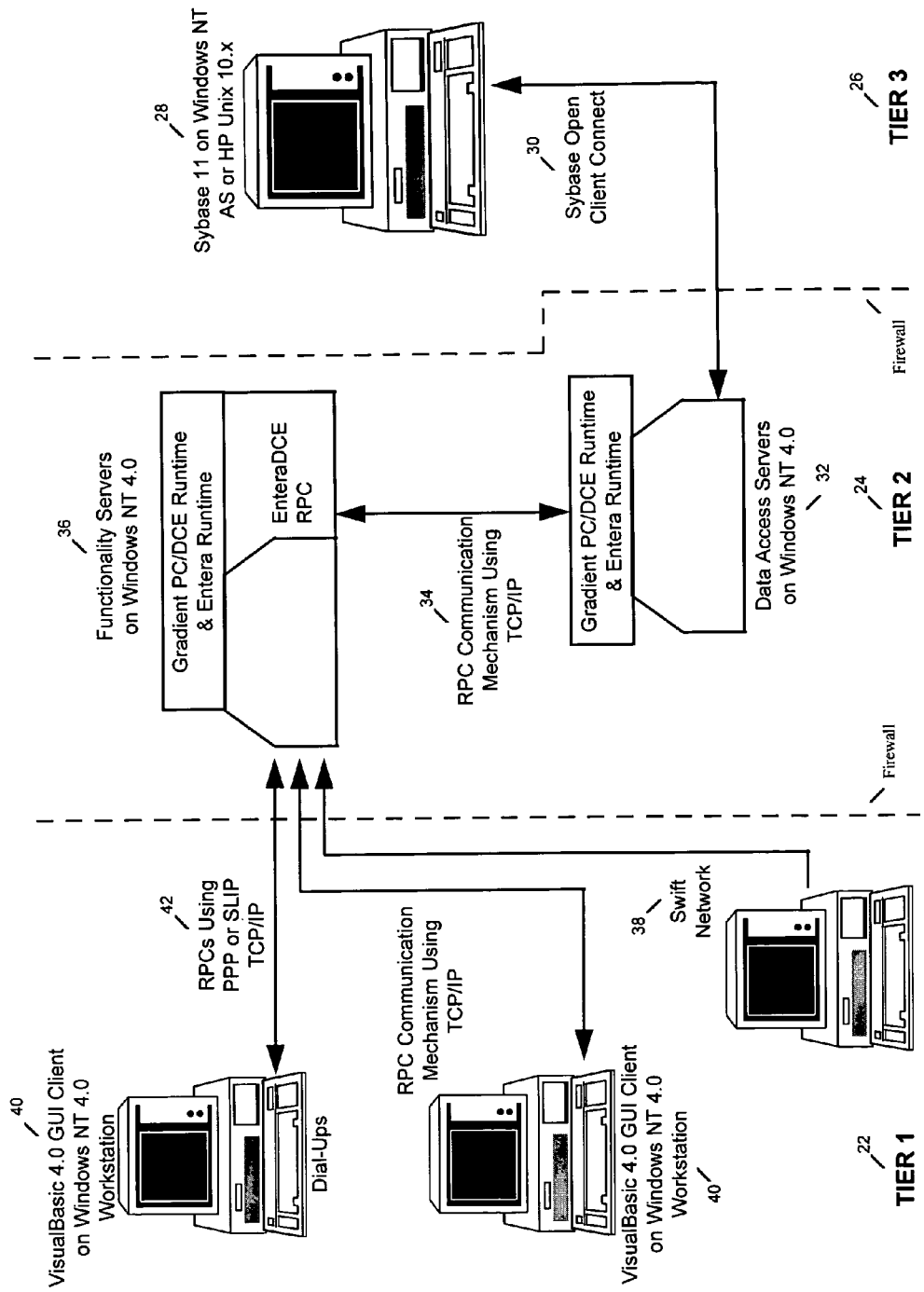
FIG. 3 is a schematic diagram which illustrates an overview of an example of key components and the flow of information between the key components for an embodiment of the present invention.

FIG. 3 illustrates an overview of an example of key components and the flow of information between the key components for an embodiment of the present invention. The architecture for the centralized automated reconciliation system application for an embodiment of the present invention is a three-tier client/server model, with a presentation layer 22, an application logic layer 24, and a database layer 26 forming the three tiers. This architecture offers significant advantages in terms of graphical user interface (GUI) isolation, database independence, and a potential for the application of object-oriented concepts for the development of the application layer logic.

The system for an embodiment of the present invention includes a GUI that works in conjunction with the system software, for example, to prompt a user to input data and to provide the user with various information and reports. Other components of the system bring all the necessary custody information into the system, for example, by reading a network that is typically run by financial institutions, such as a SWIFT network. These system components take electronic statements of the information from SWIFT networks, where available. Other system components bring custody information files into the system electronically and read the files into the system database of the present invention, for example, from financial institutions which do not have SWIFT networks. The system and method for an embodiment of the present invention is automated, and all of the feeds and all of the loading of data into the system is triggered automatically.

The system for an embodiment of the present invention utilizes a Sybase relational database and also includes various security tools. The system includes, for example, Sybase II on Windows NT AS or HP Unix 10.x 28, Sybase open client connect 30, data access servers on Windows NT 4.0 32, RPC communication mechanism using TCP/IP 34, functionality servers on Windows NT 4.0 36, Swift network 38, VisualBasic 4.0 GUI client on Windows NT 4.0 workstation 40, and RPC's using FFP or SLIP TCP/IP 42. The system makes use of computer hardware and software components for the client, the data access server and the functionality server. The client hardware includes, for example, an Intel-486 compatible processor with 16 MB of RAM, a SVGA color monitor, and 1 GB disk. The data access server hardware includes, for example, an IBM Pentium server processor with 64 MB of RAM and 4 GB disk. The functionality server hardware includes, for example, an IBM Pentium server processor with 64 MB of RAM and 4 GB disk. The client software includes, for example, MS Visual Basic 4.0 user interface, MS DOS 6.0 and above operating system, and Windows 3.1, 3.11, 95 or NT 4.0 operating environment. The data access server software includes, for example, Native Driver driver manager, Sybase database, and Windows NT 4.0 operating system. Functionality server software includes, for example, Windows NT 4.0 operating system.

The system for an embodiment of the present invention provides the capabilities in a secure network environment utilizing user access controls and authentication through secure firewalls and in the application, plus encrypted transmissions of data.

The centralized automated reconciliation system application for an embodiment of the present invention runs in a distributed computing environment. The application for an embodiment of the present invention calls the database by making remote procedure calls (RPCs) to three successive servers. The object linking and embedding (OLE) server lies on the same machine as the application. The functionality server can be accessed by the OLE server by using a distributed application profile (DAP) file which specifies, among other things, the Internet Protocol (IP) address of the server machine. The functionality server calls the data access (DA) server using another DAP file. The DA server in turn calls the database (DB) to retrieve the data. There are two servers at each level. The OLE servers are OLECARS and OLEMCARS. Similarly 'mcars' and 'cars' and 'mcarsDB' and 'carsDB' are the servers at the functionality level and data access level respectively. Since both the OLE servers use the same DAP file, the functionality servers lie on the same machine. The OLE servers use the 'Client' DAP file. The 'cars' and 'mcars' DAP files are used by CARS and mCARS functionality servers respectively.

The system for an embodiment of the present invention is Windows based and includes the graphical user interface (GUI) and other system components for a user, such as the fund or investment manager 2, to make connections to the service bureau environment of the service bureau 16. The system components include tool functionalities, such as reporting tools, investigation tools, and tracking tools for the reconciliation process. A significant aspect of the system and method of the present invention is the system software which enables the service bureau 16 to bring in varying messages or file formats, parse the data, validate the data and reformat the data in order to create a standard format. The system software enables the service bureau 16 to deal with many entities which maintain information and records in different formats in different types of databases. The system software allows the service bureau 16 to bring in the information and records in different formats, to reformat the files for inputting to the system of the present invention, and to perform the reconciliation process in a uniform and consistent manner.

In an embodiment of the present invention, the fund manager 2 identifies the client account information to be held in the system, including the fund manager's client account names and corresponding custodian client account names, and establishes the link within the system that collects the client account data for the fund manager 2. The system enables the fund manager 2 to manipulate the matching criteria for the client account data. The system allows the fund manager 2 to establish the same matching rules across-the-board or different matching rules for positions and for transactions, depending, for example, on the source of the data. The system provides the fund manager 2 the flexibility to establish matching rules to meet the fund manager's particular needs.

The GUI of the system for an embodiment of the present invention allows a user, such as the fund manager 2, to describe and proscribe the fund manager's workflow process. For example, the fund manager 2 can allocate certain functions within the system to different individuals within the fund manager's operation and to segregate the work along the same lines, so that data access is distributed across those individuals to distribute the work. The system of the present invention gives the fund manager 2 the ability to view the results of the matching process for the reconciliation procedure either in a report form displayed on the screen of a computer, such as a personal computer (PC), or the report can be printed on a printer, for example, connected to the PC. Likewise, the system gives the fund manager 2 the option to download the results of the matching process in a file.

Further, the system for an embodiment of present invention allows the fund manager 2 to display and manipulate the results, such as unmatched items, and to track the investigation process, for example, at the PC. In an embodiment of the present invention, the reconciliation process is more than simply performing the matching process and identifying matched and unmatched items. For example, at some point, it is necessary to investigate and correct unmatched or mismatched items. While the system allows the investigation and correction to be performed within the system of either the fund manager 2 or the custodial bank 4, typically the investigation and correction process is the responsibility of the fund manager 2. Thus, the system allows, for example, the fund manager 2 or the custodian 4 to track any discussions or actions that are taken in order to make the corrections. The system also allows either or both parties to see the history of the process by accessing an archive of the reconciliation work that was done in the past.

The system and method for an embodiment of the present invention is a menu driven process, for example, in which a user using the GUI defines the criteria for the process and the way in which the process is performed. The system software presents various menus which include, for example, icons and fields for the GUI on a Windows based operating system. The system software is designed to be easy and intuitive to use and prompts the user through the use of the menus and icons of the application software.

The system and method for an embodiment of the present invention provides flexibility, for example, in allowing the fund manager 2 to describe the matching criteria in any way that is suitable to the fund manager 2. The system does not restrict the elements that are used in matching and allows a selection of any elements to be tracked. The system also allows selection of different kinds of tolerances to the elements. For example, if the particular data is in numerical form, and the fund manager 2 seeks to match to the quantity of shares held, the fund manager 2 can tolerate being off by a penny or a single share. Therefore, the system allows a certain amount of flexibility in enabling, for example, the fund manager 2 to complete the fund manager's work in its particular operation.

Figure 4:
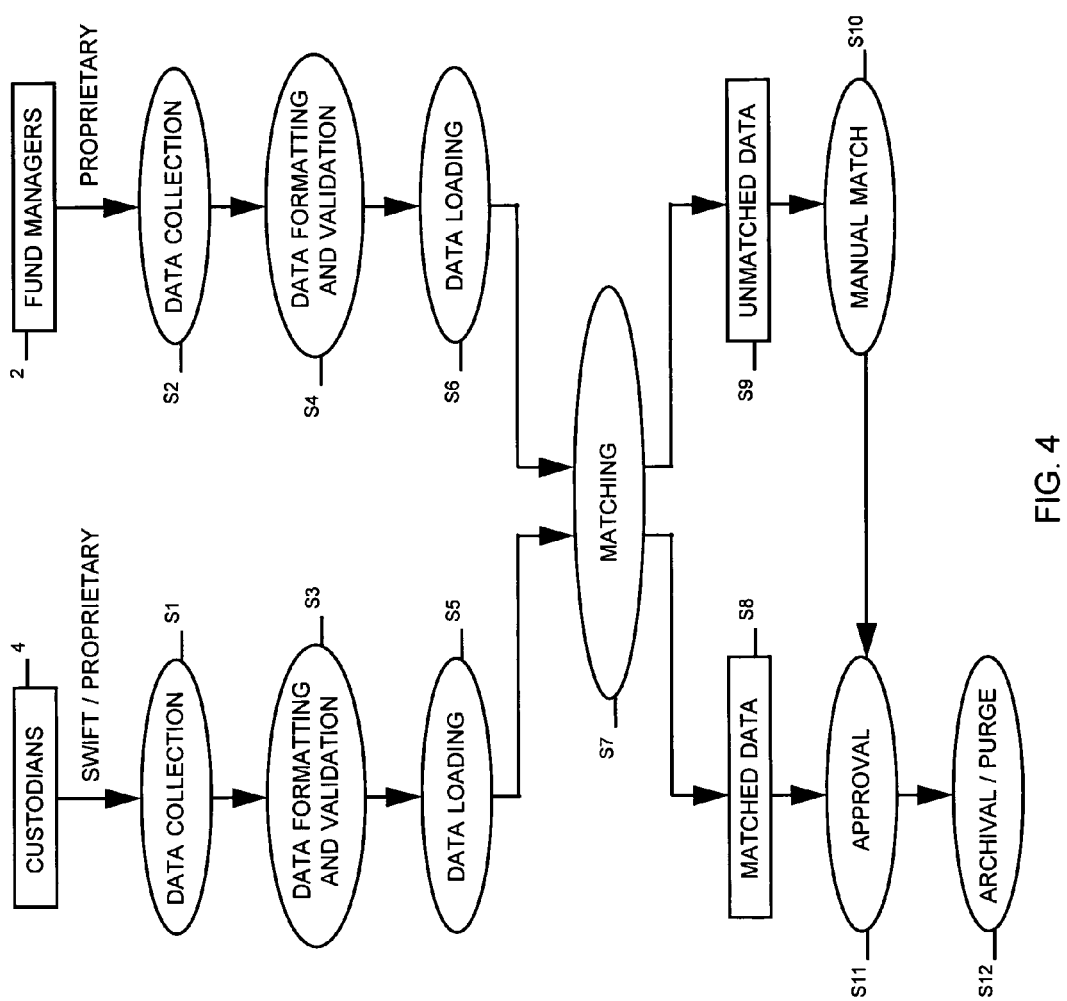
FIG. 4 is a schematic flow chart which illustrates an example of the process of position reconciliation for an embodiment of the present invention.

In an embodiment of the present invention, the reconciliation process applies to records, such as securities positions, cash positions, securities transactions, and cash transactions. The system of the present invention automatically performs the reconciliation process in a number of steps. FIG. 4 is a schematic flow chart which illustrates an example of the process of position reconciliation for an embodiment of the present invention. Examples of those steps include receiving the records by the system from the custodian 4 and S1 and from the fund manager 2 at S2; formatting the records from the custodian 4 at S3 and from the fund manager 2 at S4; uploading the records to the system database for the custodian 4 at S5 and for the fund manager 2 at S6; defining matching rules for the records for the fund manager 2 and custodian 4 respectively and matching the records according to the matching rules at S7; generating a report of matched and unmatched records at S8 and S9, respectively; and reconciling and correcting unmatched records at S10.

In an embodiment of the present invention, position reconciliation refers to the verification by the fund manager 2 of all the securities and cash balances in their books, against the corresponding balances in the books of the custodian 4. This exercise results in the identification of position records that do not match, at S9, where it becomes necessary to investigate the cause of the discrepancy. The system for an embodiment is able to receive the position records from fund managers and custodians in SWIFT, ISITC and non-SWIFT proprietary formats. The data can be in the form of fixed-length, or comma-delimited, or tab-delimited records. The system allows for a sub-set of the expected data elements to be received from a particular entity. Such data is not rejected on account of incompleteness. For this purpose, the basic minimal set of data elements is identified which must be present in any data that is received for the purpose of reconciliation. A facility is provided to convert the incoming messages and files into the format required by the system at S3 and S4, respectively, and to upload the data into the system database at S5 and S6, respectively.

The system for an embodiment of the present invention allows matching rules to be defined for each combination of fund managers and custodians at S7. Apart from defining equality and other relational rules, such as Mgr_Security_Id=Cust_Security_Id, there is a provision to define flexible rules. As an example of a flexible rule:

If(Mgr_Security_Id is not=Cust_Security_Id)

If (the first three characters (upper or lower case) of each word in the Security Description field for the two records are the same)

Consider the case as a match.

At S7, the positions data received from the two sides is matched according to the rules defined for the matching, which may include tolerances in percentage or nominal terms for each rule. These rules may encompass, but are not limited to, one or more data item, such as account number, security Id, units, unit cost, total cost, unit price, and total market value. Different levels of match success may be defined, depending on how close the match is.

The system is able to present to the fund manager 2, the matched data at S8 and the unmatched data at S9 separately. For the unmatched data, the system presents both sides of the picture on a consolidated screen, so as to enable the reconciliation personnel to view all the required information at a glance. At S10, a facility is provided for the personnel of fund manager 2 to enable them to force a manual match on records that have not matched as per the automated rules. Such manual matches have a reason assigned to them, as well as a date and user Id stamp, which the system captures, stores, and retrieves, as required. Such status changes require authorization. There is a set of useful queries and reports built into the system. This includes queries and/or reports to make available for viewing the reconciled data to the fund manager 2 at a summary and detailed level. These queries and reports are defined as a part of the functional specifications for the application.

In an embodiment of the present invention, transaction reconciliation refers to the verification by the fund manager 2 of all the securities and cash transactions, such as sales, purchases, and corporate actions, in their books, against the corresponding transactions in the books of the custodians 4. This exercise results in the identification of transaction records that do not match, where it becomes necessary to investigate the cause of the discrepancy. The process of transaction reconciliation for the system application for an embodiment of the present invention is similar to that of position reconciliation, with certain significant differences. First, the data received from the custodian 4 at S1 and the fund manager 2 at S2 pertains to transactions, rather than positions. While there is typically data for each account coming in daily for positions, transaction data comes in only if there have been one or more transaction(s) for the particular account on the given date. Second, it is important to include balance-to-balance reconciliation as a part of transaction reconciliation. This entails reconciling a set of records which consists of an opening balance, a set of transactions, and a closing balance.

An important aspect of on embodiment of the present invention is the service bureau environment with the system software, which enables the handling of a multiplicity of different message and file formats, yet still creates a single file feed into the system application. The system for an embodiment of the present invention provides a service bureau environment as a flexible accounting tool for fund or investment managers, who provide the data to the system. The system links to any fund manager's system, collects the custodial information and brings it all together within a service bureau environment, and provides additional support to the fund manager 2. Another important aspect of an embodiment of the present invention is a high level of system security, which creates a trusted and secure environment. The system provides centralized automated account reconciliation in a trusted and secure environment of a financial institution, such as a bank. For example, all system data that goes through the network is encrypted, and the highest level of security measures are provided for user access to the system data.

In an embodiment of the present invention, the system data related to a particular fund manager is never mingled with the data of any other fund manager and is never accessible by another fund manager. The system utilizes firewalls to protect access to the system data and requires a clearance to get through the firewalls. The network itself has a firewall which requires a special encrypted key or password in order to get into the network. The encryption utilizes the highest level of encryption standards that are used, for example, in the United States, namely 128-bit encryption.

The centralized automated reconciliation system application for an embodiment of the present invention is used in a highly distributed environment where multiple legal entities use it to reconcile their data. In order to maintain the confidentiality of the data of each entity, and to provide access to data on a need-to-know basis, the system is characterized by robust security features and tight controls. Security aspects for the centralized automated reconciliation system application for an embodiment of the present invention include, for example, user profile definition, user groups or use levels definition, mapping users to groups, mapping functions to groups, login and logout, and changing password. In general, the system application for an embodiment of the present invention is always run under the security umbrella provided by the SMS (Security Management System) component of the application. The security shell, therefore, supersedes all other application functions. Login to the application verifies the user Id and password and provides access to the functions to which the particular user is entitled. An audit log of the logins and logouts is maintained. Users of the application for an embodiment of the present invention are classified into groups with appropriate names and their functions.

The system for an embodiment of the present invention assists the fund manager 2 and the custodian 4 in reconciling the portfolios of their customers 8. The data for the reconciliation is received either in the form of files or SWIFT/ISITC messages at S1 and S2. At S5 and S6, data received from the fund manager 2 and custodian 4 is loaded into the system database based on a pre-defined schedule. On completion of the loading, at S7, the matching process attempts to establish a match between a set of uniquely identifiable records from both the fund manager 2 and the custodian 4, based on the available match groups defined for the fund manager-custodian combination. The match process attempts to match all such unique sets of records. At the end of the match process, all sets of records that have not been matched are marked as unmatched at S9. The fund manager 2 is then able to view the match results and take appropriate action on each of the sets of records.

Features provided in the application for an embodiment of the present invention include, for example, a Search facility, a Sort facility, and a Print facility. The Search facility is provided in the list screens of most of the maintenance options. This feature can be used to look at selective records by entering one or more characters in the Search On fields. The Search facility is case-sensitive and shows all records which satisfy the search criteria. The Sort facility, which is a facility to sort a list of records, is provided in all the screens which are in the form of a grid. To sort a list of records on a particular column, the user clicks on the column header or column name. The Print facility is provided in most of the screens to print the data as seen on the screen. To print a particular screen, the user clicks the Print button.

Figure 5:
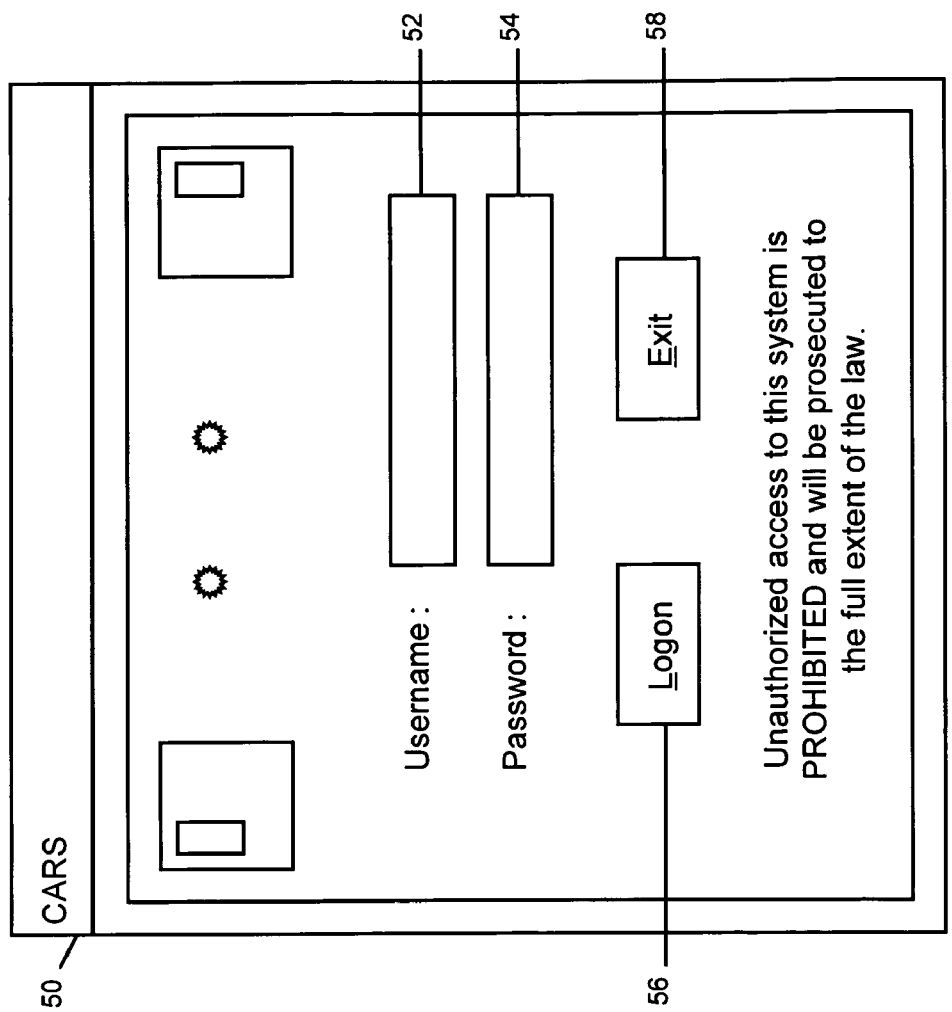
FIGS. 5-7 are sample Login screens for the system for an embodiment of the present invention.
Figure 6:
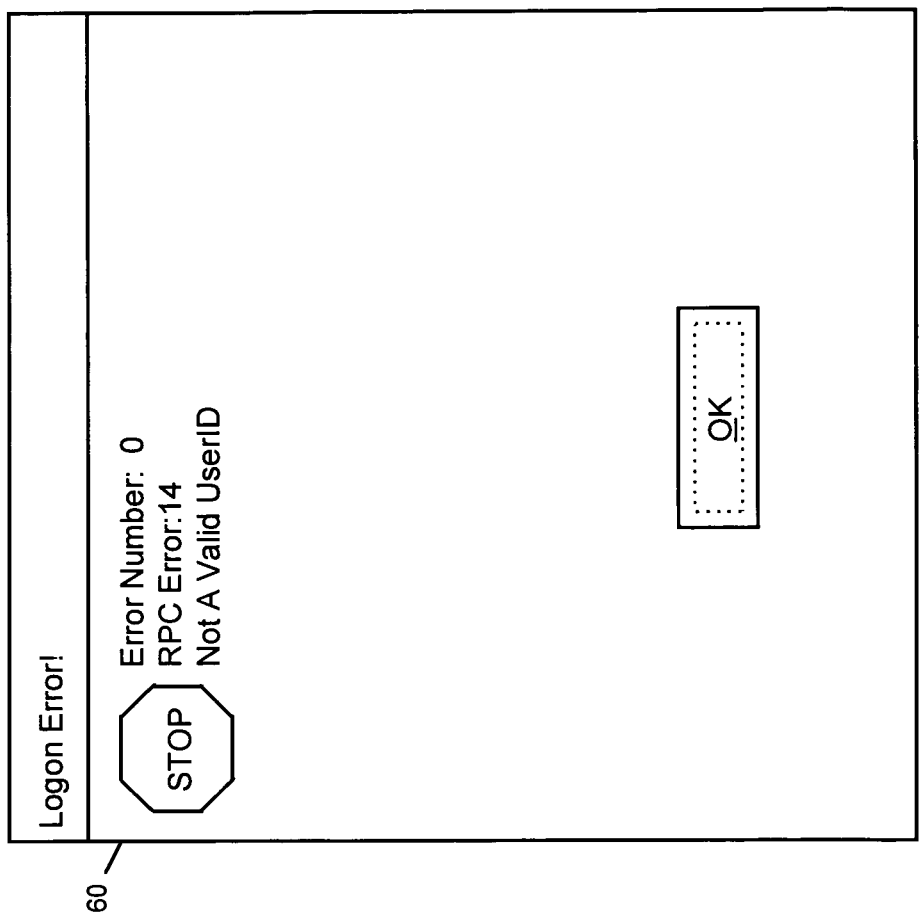
Figure 7:
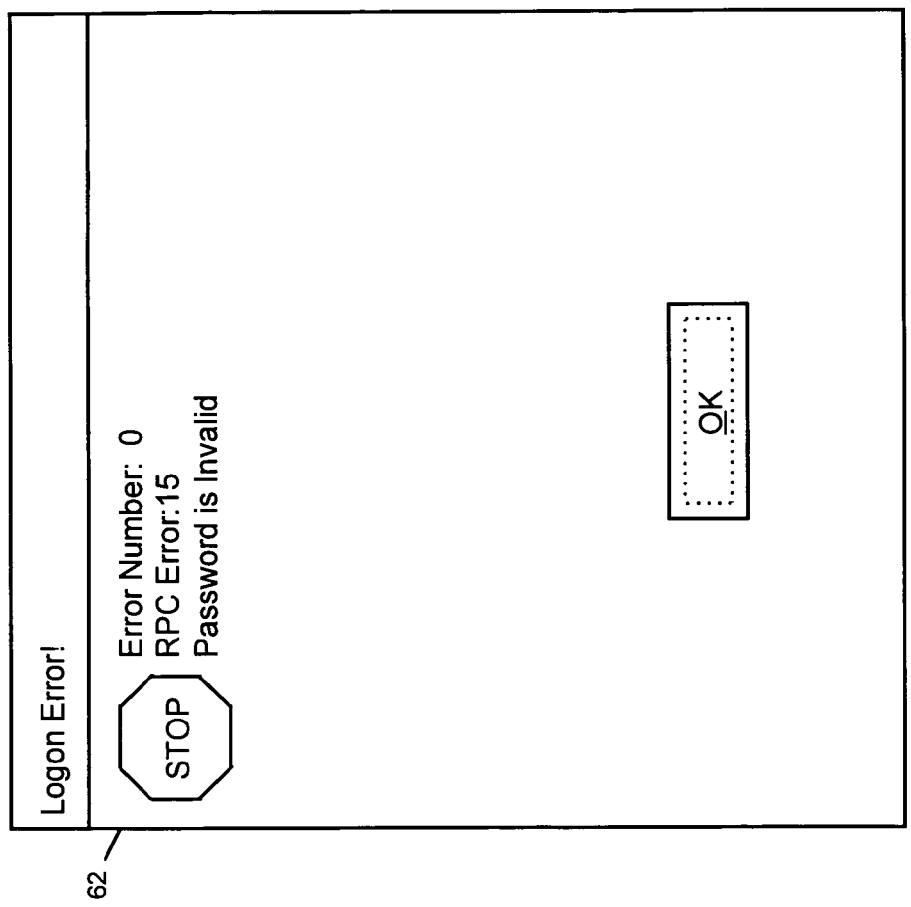

An Access aspect of the system for an embodiment of the present invention involves procedures for accessing the system including, for example, System Login and Changing Password. FIG. 5 is a sample Login screen 50 for an embodiment of the present invention. On invoking the system application for an embodiment of the present invention, the Login screen 50 is displayed for the user. The user enters a UserId 52 and Password 54 and clicks LogOn 56 to login to the application. If the user does not wish to login to the application, the user clicks Exit 58. FIG. 6 is a sample Incorrect UserId Error Message screen for an embodiment of the present invention. If the user enters an incorrect user Id, the Incorrect UserId Error Message screen 60 is displayed for the user. FIG. 7 is a sample Incorrect Password Error Message screen for an embodiment of the present invention. If the user enters an incorrect password, the Incorrect Password Error Message screen 62 is displayed for the user.

Figure 8:
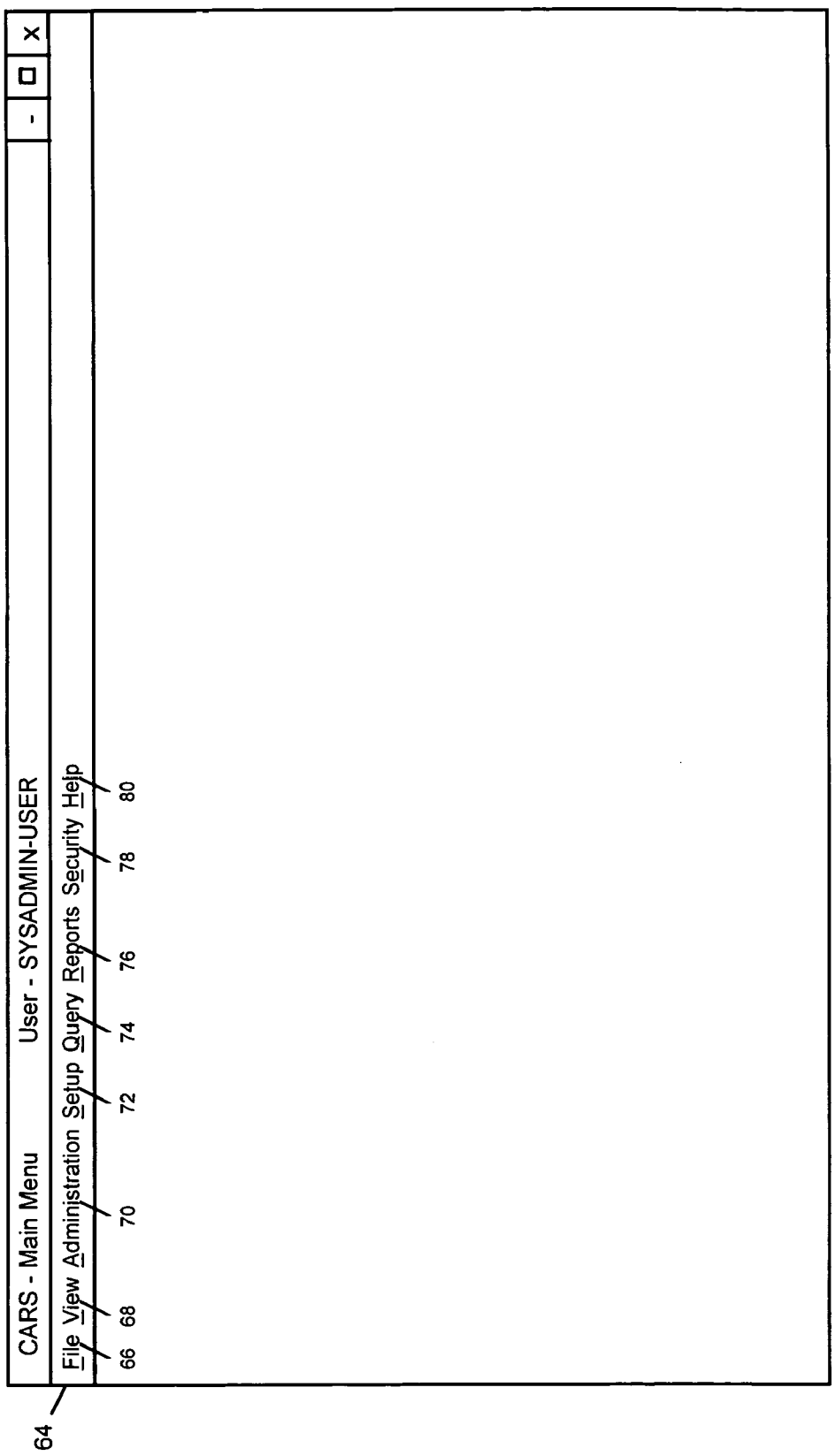
FIG. 8 is a sample Main Menu screen of the system for an embodiment of the present invention.
Figure 9:
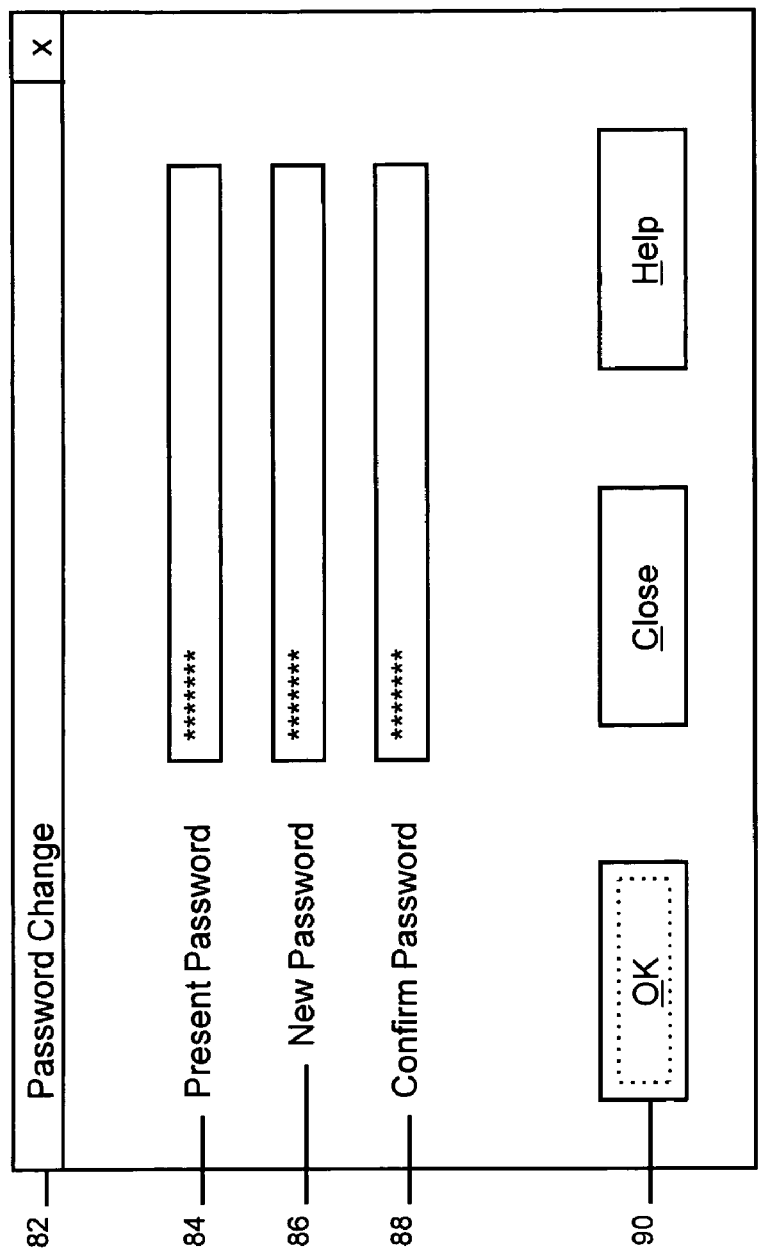
FIG. 9 is a sample Change Password screen for an embodiment of the present invention.

FIG. 8 is a sample Main Menu screen of the system application for an embodiment of the present invention. If the user enters the user Id and password correctly, the Main Menu screen 64 with menu options, such as File 66, View 68, Administration 70, Setup 72, Query 74, Reports 76, Security 78, and Help 80, for which the user has access privileges assigned to him or her is displayed for the user. FIG. 9 is a sample Password Change screen for an embodiment of the present invention. In case the user wishes to change his or her password, the user clicks the Security menu 78 from the Main Menu 64 and selects the Change Password option, and the Change Password screen 82 is displayed for the user. The user enters the user's Present Password 84 and a New Password 86, re-enters the new password against Confirm Password 88, and clicks OK 90 to save the new password. The user's new password will be effective from the user's next login.

A System Setup aspect of an embodiment of the present involves a number of initial setup functions that are performed by the system administrator including, for example, User Groups, User Group Mapping, Users, and System Parameters. On installation of the application for an embodiment of the present invention, a user group and user are created by the installation process. The system administrator of the system can login using a user Id and password previously created. Thereafter, a sequence of operations is performed by the system administrator to complete the setup. For example, the system administrator can go to Administration→User Group and create one or more user groups for customer services. In the User Groups list screen, the system administrator selects a user group, and clicks a Functions button to provide access to menu options through the User Group-System Function Mapping screen. The system administrator can go to Administration→User and create one or more users for the user group(s) created. The customer service users can then access the customized automated reconciliation system application to setup the details to ready the system for use by a user. The system administrator can then perform the additional steps of creating one or more user groups for fund managers, providing access to menu options to the user group(s), and create users for these user group(s). The application can then be accessed by the fund managers given their user Id and password.

FIG. 10 is a sample User Group List screen 92 and FIG. 11 is a sample User Group Details screen 94 for an embodiment of the present invention. In order to invoke a User Groups option from the Administration menu 70, the system administrator clicks User Groups. The purpose of this option is to allow the system administrator to maintain user groups. The entire operation is divided into two screens, namely the User Group List screen 92 and the User Group Details screen 94. The system administrator can view the entire list of user groups, in the User Group List screen 92 in a tabular form. The details of a particular user group can be seen in the User Group Details screen 94. The access to various system functions can be provided for a user group through the User Group Mapping screen. There are no pre-requisites to add/modify a user group, but to delete a user group, it is a pre-requisite that no user must belong to the user group which is to be deleted. The user group System Administrator 96 is a default user group created to run the system application for an embodiment of the present invention, and this user group cannot be deleted.

Referring to FIG. 10, the User Group Summary screen 92 lists the available user groups. This screen can be used to add new user groups and to modify, view and delete existing user groups. To add a new user group, the system administrator selects a record from the list displayed on the scene and clicks Add 98. This launches the UserGroup Details screen 94 shown in FIG. 11 with the details of the selected record, on which the key fields are blank. The system administrator enters the required details and clicks OK 100. Alternatively, the system administrator selects a blank record from the list displayed on the User Group Summary screen 92 by clicking Clear 102 and clicking Add 98. This launches the UserGroup Details screen 94 with all entry fields blank. The system administrator enters the required details and clicks OK 100. To modify a user group, the system administrator selects a record from the list and clicks Modify 104. This launches the User Group Details screen 94 with the details of the selected record. The key fields are not editable. The system administrator can then modify the required details and click OK 100. In order to delete a user group, the system administrator selects the desired user group from the list shown on the User Group Summary screen 92 and clicks Delete 106, and the User Group Details screen 94 is launched. The system administrator clicks on the OK button 100, and a message box Delete Details? is displayed. The system administrator clicks Yes to confirm the deletion or clicks No if he or she has changed his or her mind. It is not possible to delete the user group System Administrator 96.

Referring further to FIGS. 10 and 11, to view details of a user group, the system administrator double clicks the desired record or selects the desired user group from the list and clicks View 108/presses Enter. In order to provide access to system functions for a user group, the system administrator clicks the desired record to select the user group, and clicks Function 110 to go to a User GroupMapping screen. When the system administrator clicks OK 100, the screen closes after saving message details. In the Delete mode 106, the system administrator clicks Yes to confirm the deletion; otherwise the system administrator clicks No. When the system administrator clicks Close 112 after making modifications, he or she has three choices, namely, to click Yes to exit after saving, to click No to exit without saving, and to click Cancel to maintain the status quo.

Figure 12:
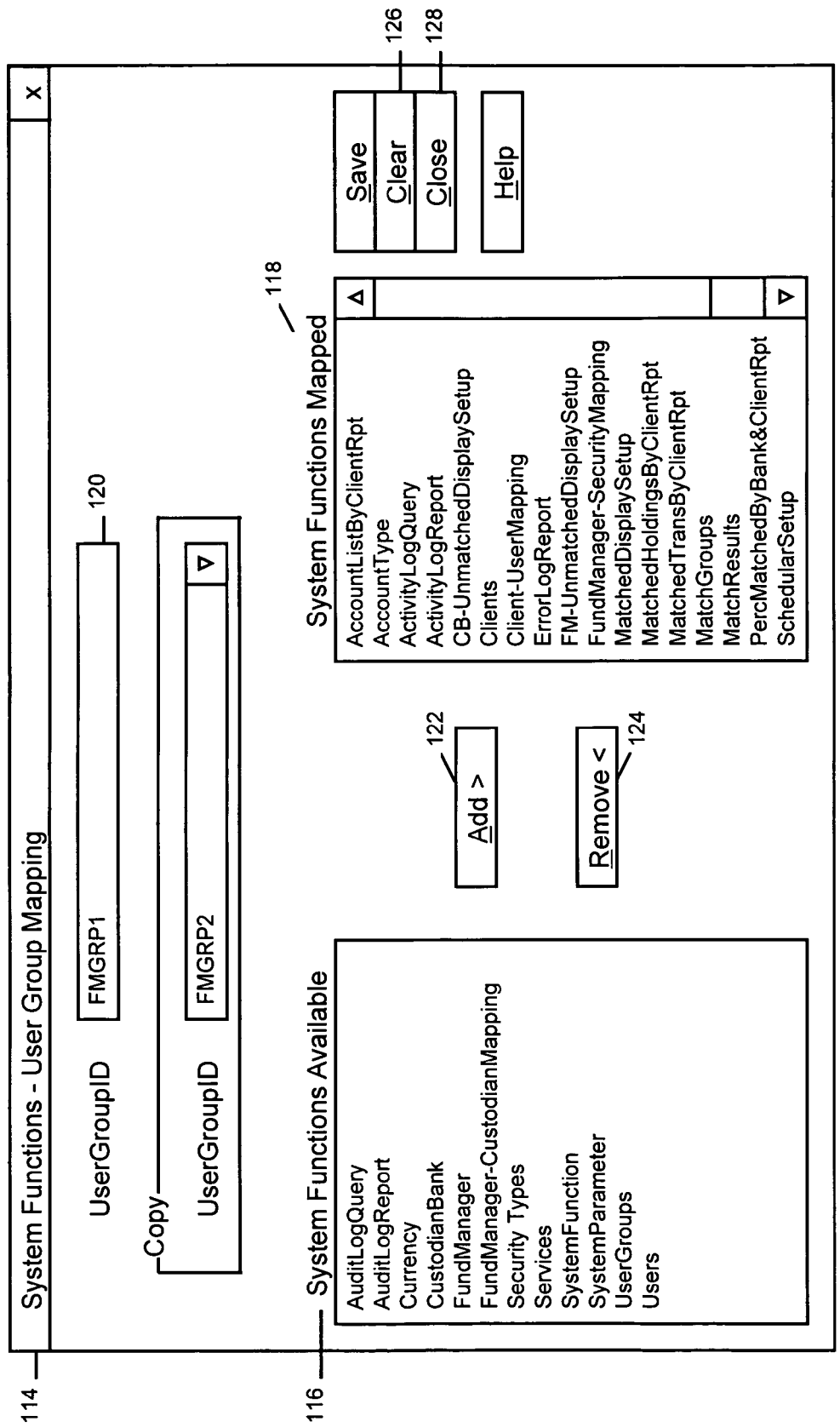

FIG. 12 is a sample User Group Mapping screen for an embodiment of the present invention. To invoke this option the system administrator selects the Administration option 70 from the Main Menu screen 64 of FIG. 8 and from the Administration menu clicks User Groups. The system administrator then selects a user group and clicks Functions. This option allows the system administrator to set the privileges for various system functions menu options that can be accessed by users belonging to a particular user group. The system administrator can set up these privileges in the User Group Mapping screen 114. As a pre-requisite, the entries for system functions and user groups desired for mapping must be completed before the mapping can take place. The User Group Mapping screen 114 lists the System Functions Available in the list box 116 on the left side of the screen and the System Functions Mapped in the list box 118 on the right side of the screen. The system administrator can add or remove the system functions from the user group privileges.

Referring to FIG. 12, to get the current privileges for a user group, the system administrator selects the UserGroupId from a pull down list 120. In order to add a system function in the selected user group privileges, the system administrator selects one or more records from the System Functions Available list box 116 and clicks Add 122. The records shift to the System Functions Mapped list box 118, and the systems administrator clicks OK. In order to remove a system function from the selected user group privileges, the system administrator selects one or more records from the System Functions Available list box 116 and clicks Remove 124. The records shift to the System Functions Mapped list box 118, and the system administrator clicks OK.

Referring further to FIG. 12, to copy user group privileges from another user group, the system administrator selects the user group Id for which he or she wants to set privileges, selects the user group Id from which he or she wants to copy the privileges, and the list boxes are populated with the privileges of the selected user group Id. The system administrator can add or remove privileges to them if required and clicks OK to save the changes. When the system administrator clicks OK, the changes are saved. The system administrator can change the selection of user group Id and set privileges for it. When the system administrator clicks Clear 126 after making modifications, he or she is offered a choice to click Yes to save the changes and the entry fields are cleared or a choice to click No to clear the entry fields without saving any changes or to click Cancel to maintain the status quo. When the system administrator clicks Close 128 after making modifications, he or she is offered a choice to click Yes to exit after saving or to click No to exit without saving or to click Cancel to maintain the status quo.

FIG. 13 is a sample Users screen and FIG. 14 is a sample User Details screen for an embodiment of the present invention. In order to invoke this option, the system administrator selects Administration 70 from the Main Menu screen 64 and from an Administration menu clicks Users. This option allows the system administrator to maintain users. The entire operation is divided into the Users list screen 130 and a User Details screen 132. The system administrator can view the entire list of users in the Users list screen 130 in a tabular form. The details of a particular user can be seen in the User Details screen 132. Pre-requisites to add/modify a user are that it is necessary to first create the user group to which the new user is to be allocated, and if the user is a fund manager, then the entry for that fund manager must be made before a new user is created.

Referring to FIG. 13, the Users screen 130 lists all users. In order to delete a user, the user must not be present in any account details. The Users screen 130 lists the available users. The system administrator can add new users, and can modify, view and delete existing users. To search for users, the system administrator enters the first few characters of the user Id and/or the user group Id of the users for which he or she is looking and clicks Search 134. The search facility is case sensitive. The list displays only those records whose first few characters match the characters entered. The system administrator clicks Clear 136 to revert to the entire list.

Referring FIGS. 13 and 14, to add a new user, the system administrator selects a record from the list and clicks Add 138. This launches the User Details screen 132 with the details of the selected record on which the key fields are blank. The system administrator enters the required details and clicks OK 140 or selects a blank record from the list by clicking Clear 136 and clicks Add 138. This launches the User Details screen 132 with all entry fields blank. The system administrator enters the required details and clicks OK 140. To modify a user, the system administrator selects a record from the list and clicks Modify 142. This launches the User Details screen 132 with the details of the selected record on which the key fields are not editable. The system administrator then modifies the required details and clicks OK 140.

Referring further to FIGS. 13 and 14, to delete a user, the system administrator selects the desired user from the list and clicks Delete 144, and the User Details screen 132 is launched. The system administrator clicks on the OK 140 button, and a message box Delete Details? is displayed. The system administrator clicks Yes to confirm the deletion or clicks No if he or she has changed his or her mind. It is not possible to delete the user system administrator, which is the default user created during installation of the application for an embodiment of the present invention. To view details of a user, the system administrator double clicks the desired record or selects the desired user from the list and clicks View 146/Presses Enter. When the system administrator clicks OK, the User Details screen 132 closes after saving the user details. In the delete mode, the system administrator clicks Yes to confirm the deletion; otherwise, he or she clicks No. When the system administrator clicks Close 148 after making modifications, he or she is offered a choice to click Yes to exit after saving or to click No to exit without saving or to click Cancel to maintain the status quo.

Figure 15:
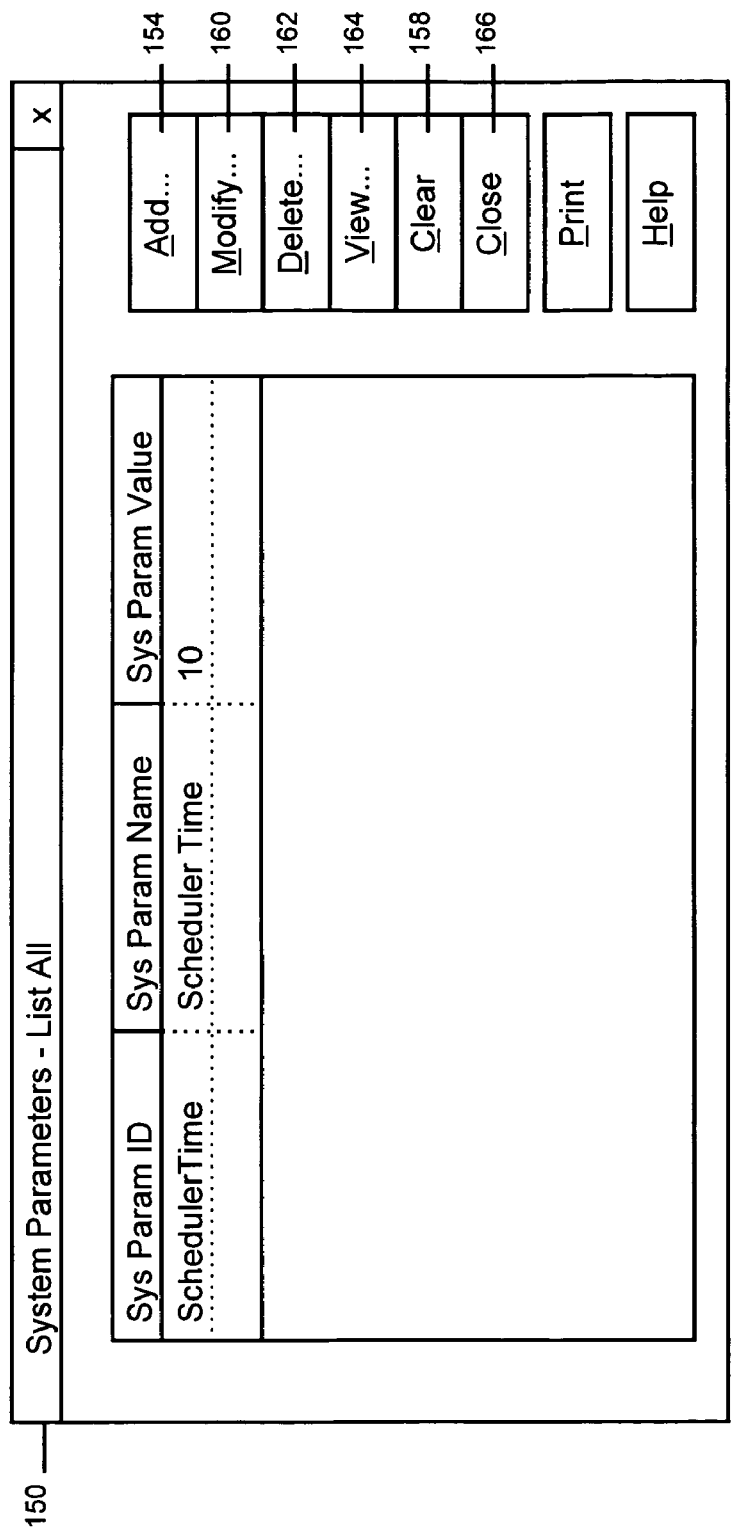
FIGS. 15 and 16 are sample System Parameters screens for an embodiment of the present invention.
Figure 16:
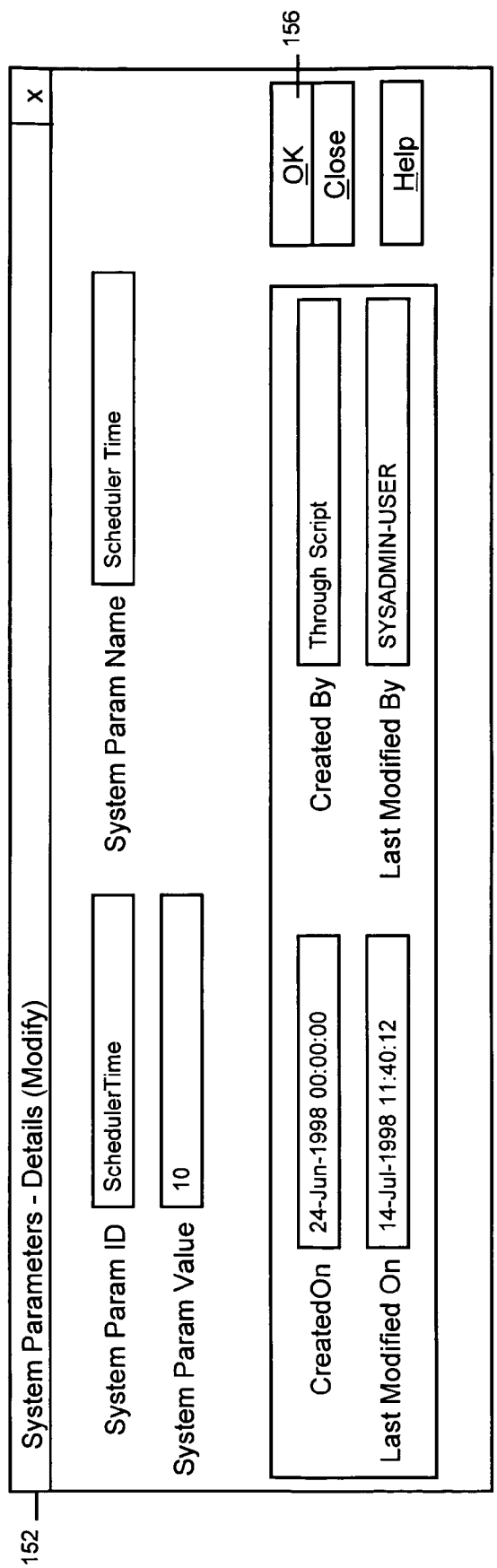

FIG. 15 is a sample System Parameters List screen and FIG. 16 is a sample System Parameters Details screen for an embodiment of the present invention. To invoke this option from the Administration menu, the system administrator clicks System Parameter. The purpose of this option is to allow the system administrator to maintain various system parameters. The operation is divided into the System Parameters List screen 150 and a System Parameters Details screen 152. The system administrator can view the entire list of system parameters in the System Parameters List screen 150 in a tabular form. The details of a particular system parameter can be seen in the System Parameters Details screen 152. There are no pre-requisites for adding or deleting a new system parameter.

Referring to FIGS. 15 and 16, the System Parameters List screen 150 lists the available system parameters. The system administrator can add a new system parameter, or modify, view or delete existing system parameters. To add a new system parameter, the system administrator selects a record from the list and clicks Add 154, which launches the System Parameters Details screen 152 with the details of the selected record on which the key fields are blank. The system administrator enters the required details and clicks OK 156 or selects a blank record from the list by clicking Clear 158 and clicks Add 154. This launches the System Parameters Details screen 152 with all entry fields blank. The system administrator enters the required details and clicks OK 156. To modify an existing system parameter, the system administrator selects a record from the list and clicks Modify 160. This launches the System Parameters Details screen 152 with the details of the selected record on which the key fields are not editable. The system administrator modifies the required details and clicks OK 156.

Referring further to FIGS. 15 and 16, to delete a system parameter, the system administrator selects the desired system parameter from the list and clicks Delete 162, and the System Parameters Details screen 152 is launched. The system administrator clicks on the OK button 156, and a message box Delete Details? is displayed. The system administrator clicks Yes to confirm the deletion or clicks No if he or she has changed his or her mind. In order to view details of an existing system parameter, the system administrator double clicks the desired record or selects the desired system parameter from the list and clicks View 164/presses Enter. When the system administrator clicks OK 156, the screen closes after saving system parameter details. In the delete mode, the system administrator clicks Yes to confirm the deletion; otherwise he or she clicks No. When the system administrator clicks Close 166 after making modifications, he or she is offered a choice to click Yes to exit after saving or to click No to exit without saving or to click Cancel to maintain the status quo.

A Customer Service Setup aspect of an embodiment of the present invention involves setup functions performed by customer service, such as Currency Maintenance, Security Types Maintenance, Services Maintenance, Fund Managers, Fund Manager Services, Fund Manager Import File Mapping, Custodian Banks, Custodian Contacts, Custodian Services, Custodian Import File Mapping, and Scheduler Setup. FIG. 17 is a sample Currency List screen and FIG. 18 is a sample Currency Details screen for an embodiment of the present invention. To invoke this option from the Administration menu, the user clicks Currency. This option allows the user to maintain currencies. The entire operation is divided the Currency List screen 168 and the Currency Details screen 170. The user can view the entire list of currencies in the Currency List screen 168 in a tabular form. The details of a particular currency can be seen in the Currency Details screen 170. There are no pre-requisites for adding a new currency, but if a particular currency is set as the base currency for a fund manager or a custodian, then that currency cannot be deleted. The Currency List screen 168 lists the available currencies. A user can add new currencies or modify, view and delete existing currencies.

Referring to FIGS. 17 and 18, to search on currency, the user enters one or more characters in the Currency Id field 172 and/or Currency Name field 174 and clicks Search 176. The search facility is case sensitive. This will display the currency records that satisfy the entry. The user clicks Clear 178 to revert to the entire list. To add a new currency, the user selects a record from the list and clicks Add 180. This launches the Currency Details screen 170 with the details of the selected record, the key fields of which are blank. The user enters the required details and clicks OK 182 or selects a blank record from the list by clicking Clear 178 and clicks Add 180. This launches the Currency Details screen 170 with all entry fields blank, and the user enters the required details and clicks OK 182.

Referring further to FIGS. 17 and 18, to modify an existing currency, the user selects a record from the list and clicks Modify 184. This launches the Currency Details screen 170 with the details of the selected record on which the key fields are not editable. The user modifies the required details and clicks OK 182. To delete a currency, the user selects the desired currency from the list and clicks Delete 186, and the Currency Details screen 170 is launched. The user clicks on the OK button 182, and a message box Delete Details? is displayed. The user clicks Yes to confirm the deletion or clicks No if he or she has changed his or her mind. To view details of an existing currency, the user clicks the desired record or selects the desired currency from the list and clicks View 188/presses Enter. When the user clicks OK 182, the screen closes after saving currency details. In the delete mode, the user clicks Yes to confirm the deletion; otherwise he or she clicks No. When the user clicks Close 190 after making modifications, the user is offer choices to click Yes to exit after saving or to click No to exit without saving or to click Cancel to maintain the status quo.

Figure 19:
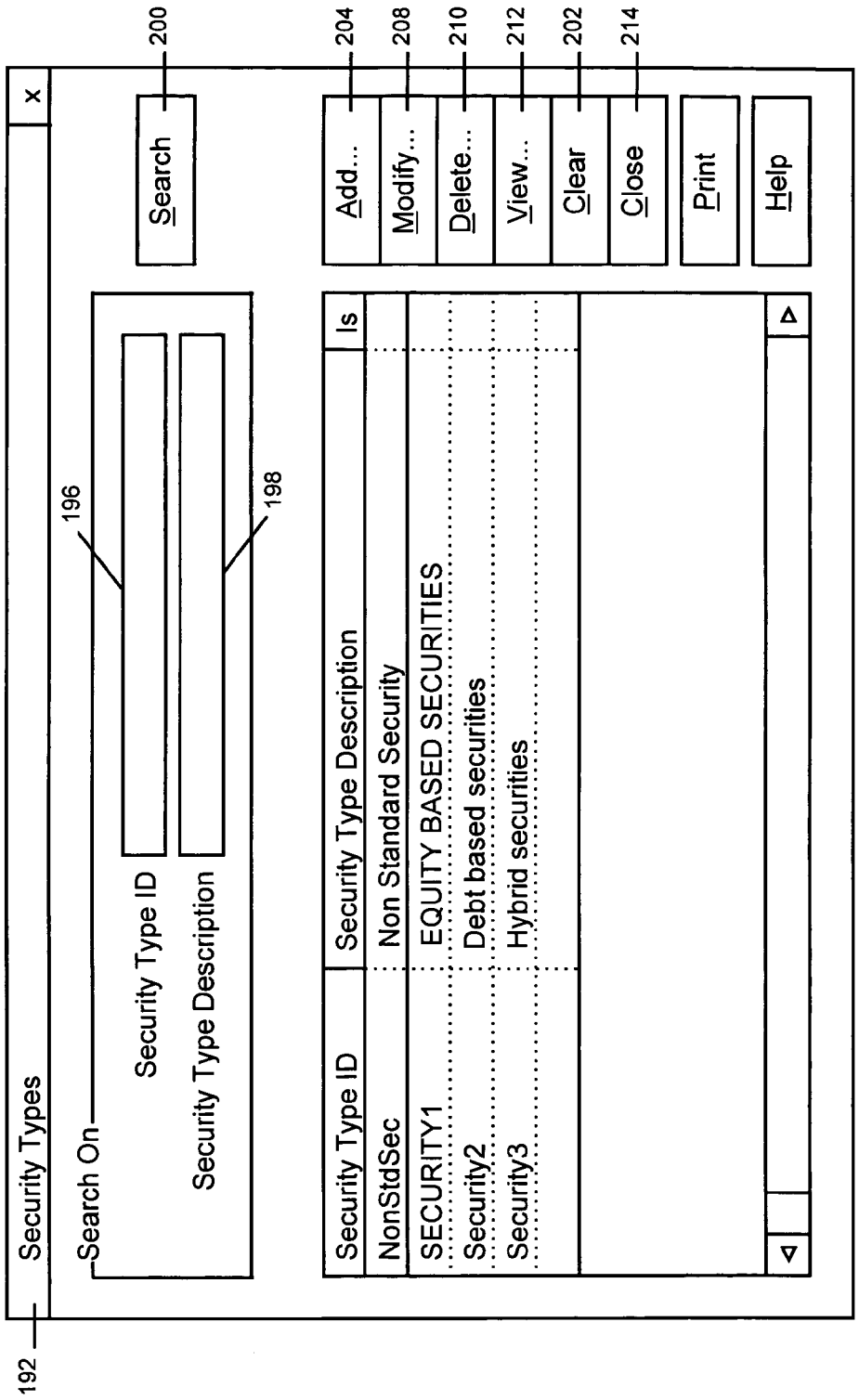

FIG. 19 is a sample Security Type List screen and FIG. 20 is a sample Security Type Details screen for an embodiment of the present invention. To invoke this option from the Administration menu, the security administrator clicks Security Type. This option allows the user to maintain various security types. The entire operation is divided into the Security Type List screen 192 and a Security Type Details screen

194. The user can view the entire list of security types in the Security Type List screen 192 in a tabular form. The details of a particular security type can be seen in the Security Type Details screen 194. There are no pre-requisites for adding a new security type, but a pre-requisite for deleting an existing security type is deletion of all the entries in the match group level maintenance for the security type to be deleted. The Security Type List screen 192 lists the available security types. The user can add a new security type or modify, view or delete an existing security type.

Referring to FIGS. 19 and 20, to search on security types, the user enters one or more leftmost characters in the Security Type Id field 196 and/or the Security Type Description field 198 and clicks Search 200. This displays the security types that match the entry. The user clicks Clear 202 to revert to the entire list. To add a new security type, the user selects a record from the list and clicks Add 204. This launches the Security Type Details screen 194 with the details of the selected record on which the key fields are blank. The user enters the required details and clicks OK 206 or selects a blank record from the list by clicking Clear 202 and clicks Add 204. This launches the Security Type Details screen 194 with all entry fields blank. The user enters the required details and clicks OK 206.

Referring to FIGS. 19 and 20, to modify an existing security type the user selects a record from the list and clicks Modify 208. This launches the Security Type Details screen 194 with the details of the selected record on which the key fields are not editable. The user modifies the required details and clicks OK 206. To delete a security type, the user selects the desired security type from the list and clicks Delete 210, and the Security Type Details screen 194 is launched. The user clicks on the OK button 206, and a message box Delete Details? is displayed. The user clicks Yes to confirm the deletion or clicks No if he or she has changed his or her mind.

Referring further to FIGS. 19 and 20, to view details of an existing security type, the user double clicks the desired record or selects the desired security type from the list and clicks View 212/presses Enter. When the user clicks OK 206, the screen closes after saving security type details. In the delete mode, the user clicks Yes to confirm the deletion; otherwise he or she clicks No. When the user clicks Close 214 after making modifications, he or she is offered choices to click Yes to exit after saving or to click No to exit without saving or to click Cancel to maintain the status quo.

Figure 22:
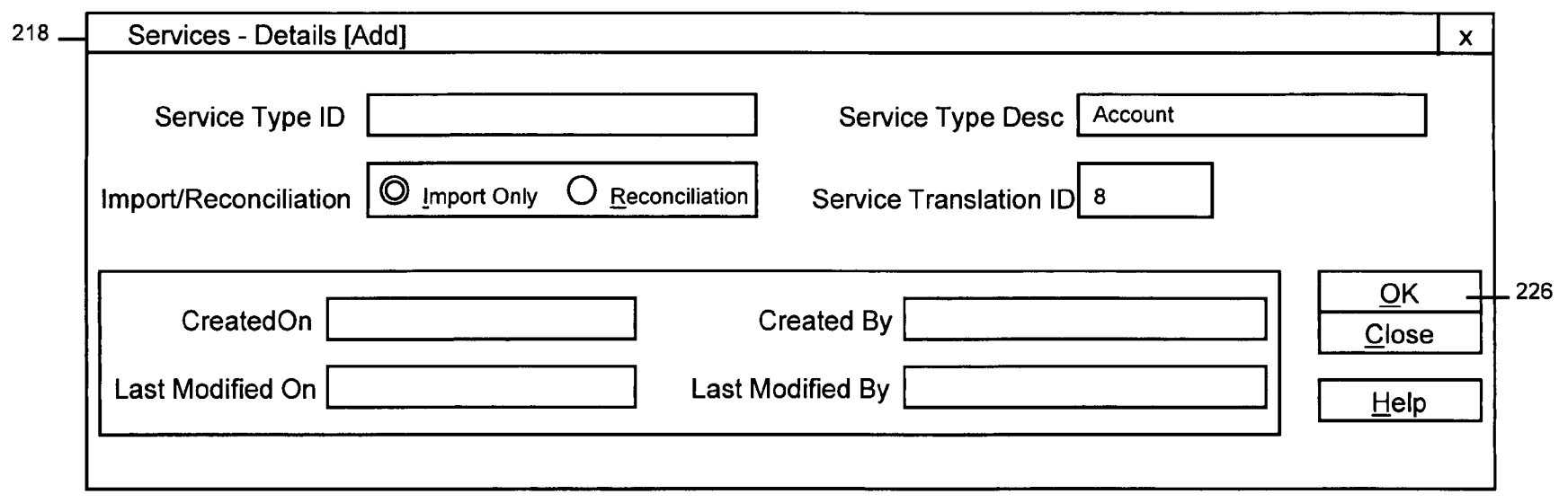

FIG. 21 is a sample Services Types List screen and FIG. 22 is a sample Service Type Details screen for an embodiment of the present invention. To invoke this option from the Administration menu, the user clicks Service. This option allows the user to maintain various service types. The entire operation is divided into the Service Types List screen 216 and a Service Type Details screen 218. The user can view the entire list of service types in the Service Types List screen 216 in a tabular form. The details of a particular service type can be seen in the Service Type Details screen 218. There are no pre-requisites to add, modify or delete a service type. The Services Types List screen 216 lists the available service types. The user can add new service types or modify, view and delete existing types.

Referring to FIGS. 21 and 22, to search for service types, the user enters the first few characters of the service type Id and/or service type description of the service type for which he or she is looking and clicks Search 220. The search facility is case sensitive. The list displays only those types whose first few characters match the characters entered. The user clicks Clear 222 to revert to the entire list. To add a new service type, the user selects a row from the list and clicks Add 224. This launches the Service Details screen 218 with the details of the selected type on which the key fields are blank. The user enters the required details and clicks OK 226 or selects a blank row from the list by clicking Clear 222 and clicks Add 224. This launches the Service Details screen 218 with all entry fields blank. The user enters the required details and clicks OK 226.

Figure 23:
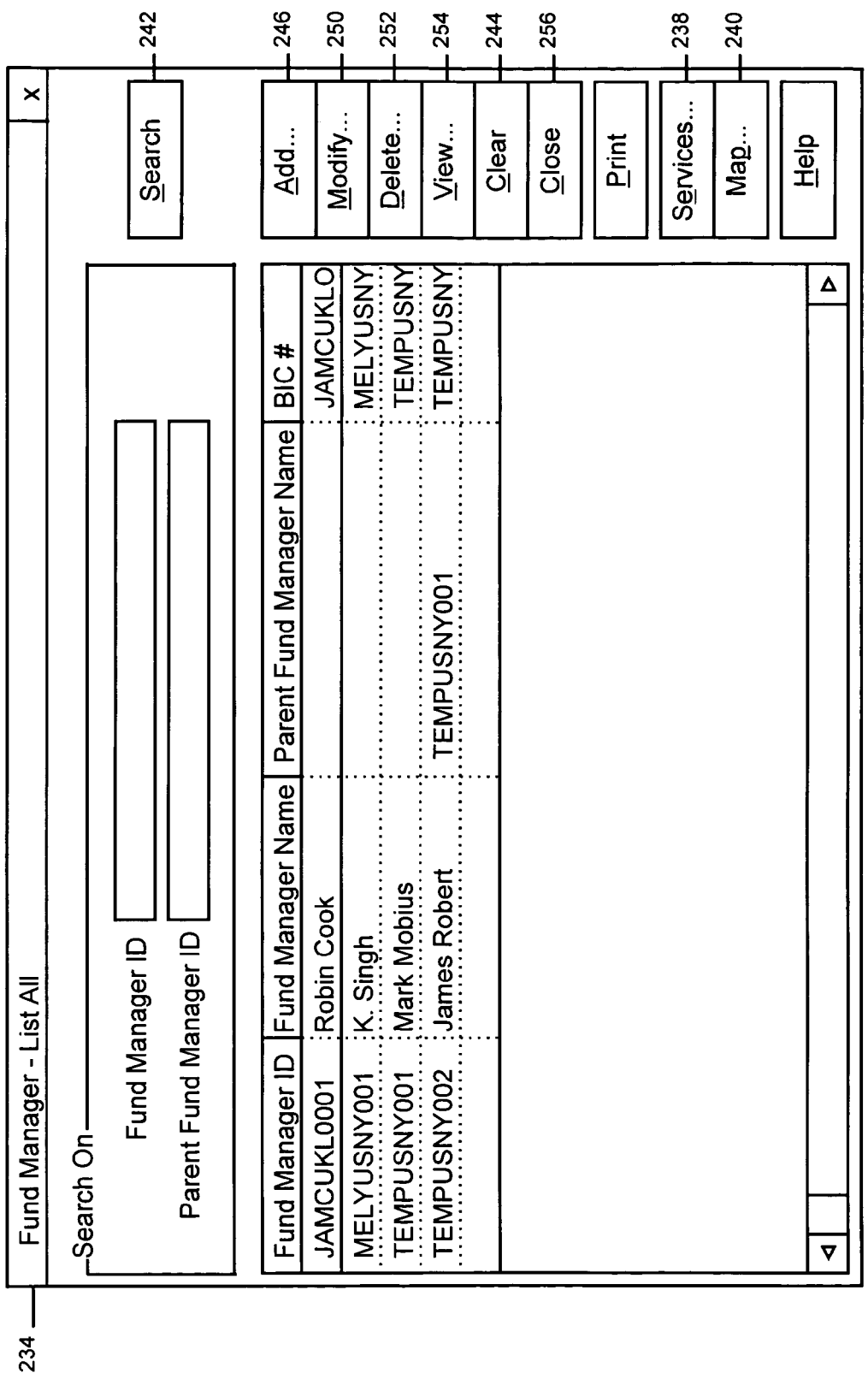

Referring further to FIGS. 21 and 22, to modify a service type, the user selects a row from the list and clicks Modify 228. This launches the Service Details screen 218 with the details of the selected type on which the key fields are not editable. The user modifies the required details and clicks OK 226. To delete a service type, the user selects the desired type from the list and clicks Delete 230, and the Service Details screen 218 is launched. The user clicks on the OK button 226, and a message box Delete Details? is displayed. The user clicks Yes to confirm the deletion or clicks No if he or she has changed his or her mind. To view details of a service type, the user double clicks the desired row or selects the desired service type from the list and clicks View 232/presses Enter FIG. 23 is a sample Fund Managers List screen and FIG. 24 is a sample Fund Manager Details screen for an embodiment of the present invention. To invoke this option from the Administration menu, the user clicks Fund Manager Profile. This option allows the user to maintain details of fund managers. The entire operation is divided into the Fund Managers List screen 234 and a Fund Manager Details screen 236. The user can view the entire list of fund managers, in the Fund Managers List screen 234 in a tabular form. For a search criteria specified by the user for fund manager Id and/or parent fund manager Id the Fund Managers List screen 234 shows records which satisfy the search criteria. The details of a particular fund manager can be seen in the Fund Manager Details screen 236. The user can view a list of services available to a fund manager by selecting the fund manager record and clicking the Services button 238. The user can map the import file information with the database information corresponding to the service by selecting the fund manager record and clicking the Map button 240. There are no pre-requisites to view, add/modify, or delete a fund manager, or to select a service, but to map a service, the service must be defined in the services maintenance. The Fund Managers List screen 234 lists available fund managers matching the fund manager Id and parent fund manager Id in the search criteria. The user can add new fund managers, modify, view and delete existing fund managers.

Referring to FIGS. 23 and 24, to search for fund managers, the user enters the first few characters of the fund manager Id and/or parent fund manager Id of the fund manager for which the user is looking and clicks Search 242. The list will display only those fund managers whose first few characters match the characters entered. The user clicks Clear 244 to revert to the entire list of fund managers. To add a new fund manager, the user selects a row from the list and clicks Add 246. This launches the Fund Manager Details screen 236, the key fields of which are blank. If the fund manager has a parent fund manager, a Parent Fund Manager Combo box is enabled; otherwise it is disabled. The user enters the required details and clicks OK 248 or selects a blank row from the list by clicking Clear 244 and clicks Add 246. This launches the Fund Manager Details screen 236, and the user enters the required details and clicks OK 248.

Referring further to FIGS. 23 and 24, to modify a fund manager, the user selects a row from the list and clicks Modify 250. This launches the Fund Manager Details screen 236 with the details of the selected fund manager, and the user modifies the required details and clicks OK 248. To delete a fund manager, the user selects the desired fund manager from the list and clicks Delete 252. The Fund Manager Details screen 236 is launched, and the user clicks on the OK button 248. A message box Delete Details? is displayed, and the user clicks Yes to confirm the deletion or clicks No if he or she has changed his or her mind. To view details of a fund manager, the user double-clicks the desired row or selects the desired fund manager from the list and clicks View 254/presses Enter. To specify services for a fund manager, the user clicks the fund manager from the list and clicks the Services button 238, and a Fund Manager Service-List screen is shown. To map the fund manager's services, the user clicks the fund manager from the list, clicks the Map button, and a Fund Manager Map-List All screen is shown. When the user clicks OK 248, the screen closes after saving fund manager details. In the delete mode, the user clicks Yes to confirm the deletion; otherwise he or she clicks No. When the user clicks Close 256 after making modifications, he or she is given choices to click Yes to exit after saving, to click No to exit without saving, or to click Cancel to maintain the status quo.

FIG. 25B is a sample Fund Manager Service-List screen and FIG. 26D is a sample Fund Manager Service Details screen for an embodiment of the present invention. To invoke this option from the Administration menu the user clicks Fund Manager Profile, selects a fund manager record from the list screen 234, and clicks Services 238. This option allows the user to maintain various services for all fund managers. The entire operation is divided into the Fund Manager Service-List screen 258 and the Fund Manager Service Details screen 260. The user can view the entire list of services for a fund manager in the Fund Manager Service-List screen 258 in a tabular form. The details of services can be seen in the Fund Manager Service Details screen 260. As a pre-requisite, the services must be defined in the services maintenance before they can be mapped to fund managers. The Fund Manager Service-List screen 258 lists available services for a selected fund manager. The system administrator can add new services, modify, view and delete existing services.

Referring to FIGS. 25 and 26, to add a new service, the user selects a row from the list and clicks Add 262. This launches the Fund Manager Service Details screen 260 on which the key fields are blank except for the service type Id, file format and table name, which have to be chosen from a specified list. The user enters the required details and clicks OK 264 or selects a blank row from the list by clicking Clear 266 and clicks Add 262. This launches the Fund Manager Service Details screen 260, and the user enters the required details and clicks OK 264. To modify a service, the user selects a row from the list and clicks Modify 268. This launches the Fund Manager Service Details screen 260 with the details of the selected service, and the user modifies the required details and clicks OK 264

Figure 28:
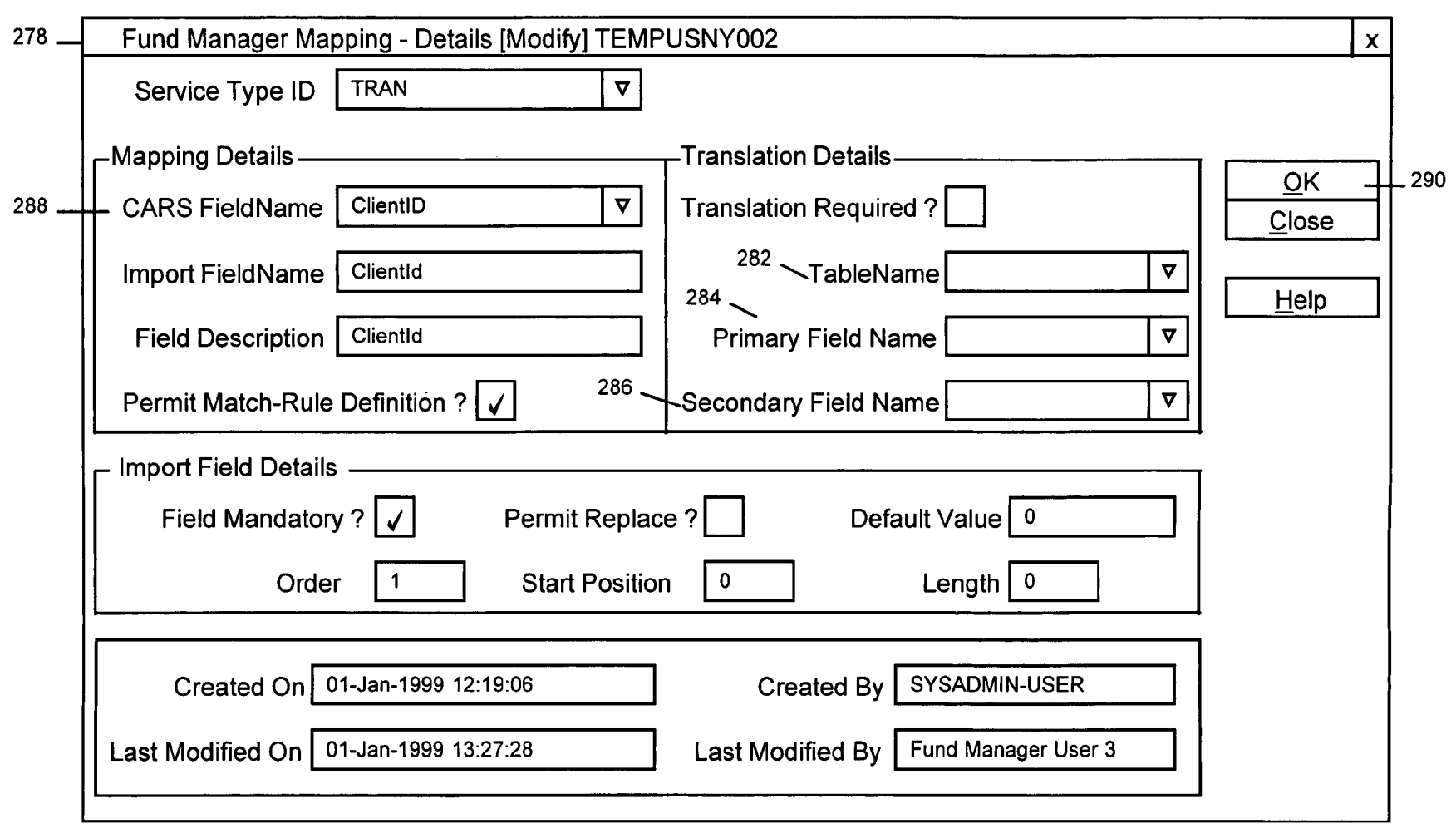

Referring further to FIGS. 25 and 26, to delete a service, the user selects the desired service from the list and clicks Delete 270. The Fund Manager Service Details screen 260 is launched, and the user clicks on the OK button 264. A message box Delete Details? is displayed, and the user clicks Yes to confirm the deletion or clicks No if he or she has changed his or her mind. To view details of a service, the user double clicks the desired row or selects the desired service from the list and clicks View 272/presses Enter. When the user clicks OK 264, the screen closes after saving service details. In the delete mode, the user clicks Yes to confirm the deletion; otherwise he or she clicks No. When the user clicks Close 274 after making modifications, he or she is offered choices to click Yes to exit after saving, to click No to exit without saving, and to click Cancel to maintain the status quo FIG. 27 is a sample Fund Manager Map-List screen and FIG. 28 is a sample Fund Manager Map Details screen for an embodiment of the present invention. To invoke this option from the Administration menu, the user clicks Fund Manager Profile, Selects a fund manager record, and clicks Map. This option allows the user to maintain information about import files for service information. The entire operation is divided into the Fund Manager Map-List All screen 276 and the Fund Manager Map Details screen 278. The user can view the entire list of fund manager map information for a fund manager Id in the Fund Manager Map-List All screen 276 in a tabular form. The details of services for a particular service can be seen in the Fund Manager Map Details screen 278. As a pre-requisite, details of services for fund manager(s) must be entered through fund manager services maintenance. The Fund Manager Map-List All screen 276 lists available map information records for the system administrator's fund manager Id. The user can add new map information or modify, view and delete existing information.

Referring further to FIGS. 27 and 28, to add a new map information, the user selects a row from the list and clicks Add 280. This launches the Fund Manager Map Details screen 278, the key fields of which are blank except for the Table Name 282, Primary Field Name 284, Secondary Field Name 286 and CARS Field Name 288, which have to be chosen from a specified list. The user enters the required details and clicks OK 290 or selects a blank row from the list by clicking Clear 292 and clicks Add 280, which launches the Fund Manager Map Details screen 278. The list boxes will contain values allocated to the user, and he or she enters the required details and clicks OK 290. To modify a map information, the user selects a row from the list and clicks Modify 294. This launches the Fund Manager Map Details screen 278 with the details of the selected map information. The user modifies the required details and clicks OK 290.

Referring again to FIGS. 27 and 28, to delete a map information, the user selects the desired map information from the list and clicks Delete 296 and the Fund Manager Map Details screen 278 is launched. The user clicks on the OK button 290, and a message box Delete Details? is displayed. The user clicks Yes to confirm the deletion or clicks No if he or she has changed his or her mind. To view details of a map information, the user double clicks the desired row or selects the desired map information from the list and clicks View 298/presses Enter. When the user clicks OK 290, the screen closes after saving map information details. In the delete mode, the system administrator clicks Yes to confirm the deletion; otherwise he or she clicks No. When the user clicks Close 300 after making modifications, he or she is offered choices to click Yes to exit after saving or to click No to exit without saving or to click Cancel to maintain the status quo.

FIG. 29 is a sample Custodian List screen and FIG. 30 is a sample Custodian Details screen for an embodiment of the present invention. To invoke this option from the Administration menu, the user clicks Custodian Bank. This option allows the user to maintain various custodians bank details. The entire operation is divided into the Custodian List screen 302 and the Custodian Details screen 304. The user can view the entire list of custodians in the Custodian List screen 302 in a tabular form. The details of a particular custodian can be seen in the Custodian Details screen 304. There are no pre-requisites for adding a new custodian. However, for deleting an existing custodian, it is necessary to delete all the entries in maintenance tables for the custodian to be deleted, including accounts maintenance, custodian contacts maintenance, custodian positions maintenance, custodian services maintenance, custodian transactions maintenance, match group level maintenance, and fund manager custodian mapping maintenance. The Custodian-List All screen 302 lists the available custodians. The user can add a new custodian or modify, view or delete an existing custodian.

Referring to FIGS. 29 and 30, to search on custodian, the system administrator enters one or more leftmost characters in the Custodian Id field 306 and/or Custodian Name field 308 and clicks Search 310. This displays the custodians that match the entry, and the system administrator clicks Clear 312 to revert to the entire list. To add a new custodian, the user selects a record from the list and clicks Add 314. This launches the Custodian Details screen 304 with the details of the selected record on which the key fields are blank. The user enters the required details and clicks OK 316 or selects a blank record from the list by clicking Clear 312 and clicks Add 314. This launches the Custodian Details screen 304 with all entry fields blank, and the user enters the required details and clicks OK 316. To modify an existing custodian, the user selects a record from the list and clicks Modify 318. This launches the Custodian Details screen 304 with the details of the selected record on which the key fields are not editable. The user modifies the required details and clicks OK 316.

Referring further to FIGS. 29 and 30, to delete a custodian, the user selects the desired custodian from the list and clicks Delete 320. The Custodian Details screen 304 is launched, and the user clicks on the OK button 316. A message box Delete Details? is displayed, and the user clicks Yes to confirm the deletion or clicks No if he or she has changed his or her mind. To view details of an existing custodian, the user double clicks the desired record or selects the desired custodian from the list and clicks View 322/presses Enter. To go to a Custodian Contacts screen, a Custodian-Map screen, or a Custodian-Services screen for a particular custodian, the user selects a custodian from the list and clicks on the Contacts 324, Map 326, or Services 328 button. This launches the desired screen for that particular custodian. When the user clicks OK 316, the screen closes after saving custodian details. In the delete mode, the user clicks Yes to confirm the deletion; otherwise he or she clicks No. When the user clicks Close 330 after making modifications, he or she is offered choices to click Yes to exit after saving, to click No to exit without saving, or to click Cancel to maintain status quo.

Figure 31:
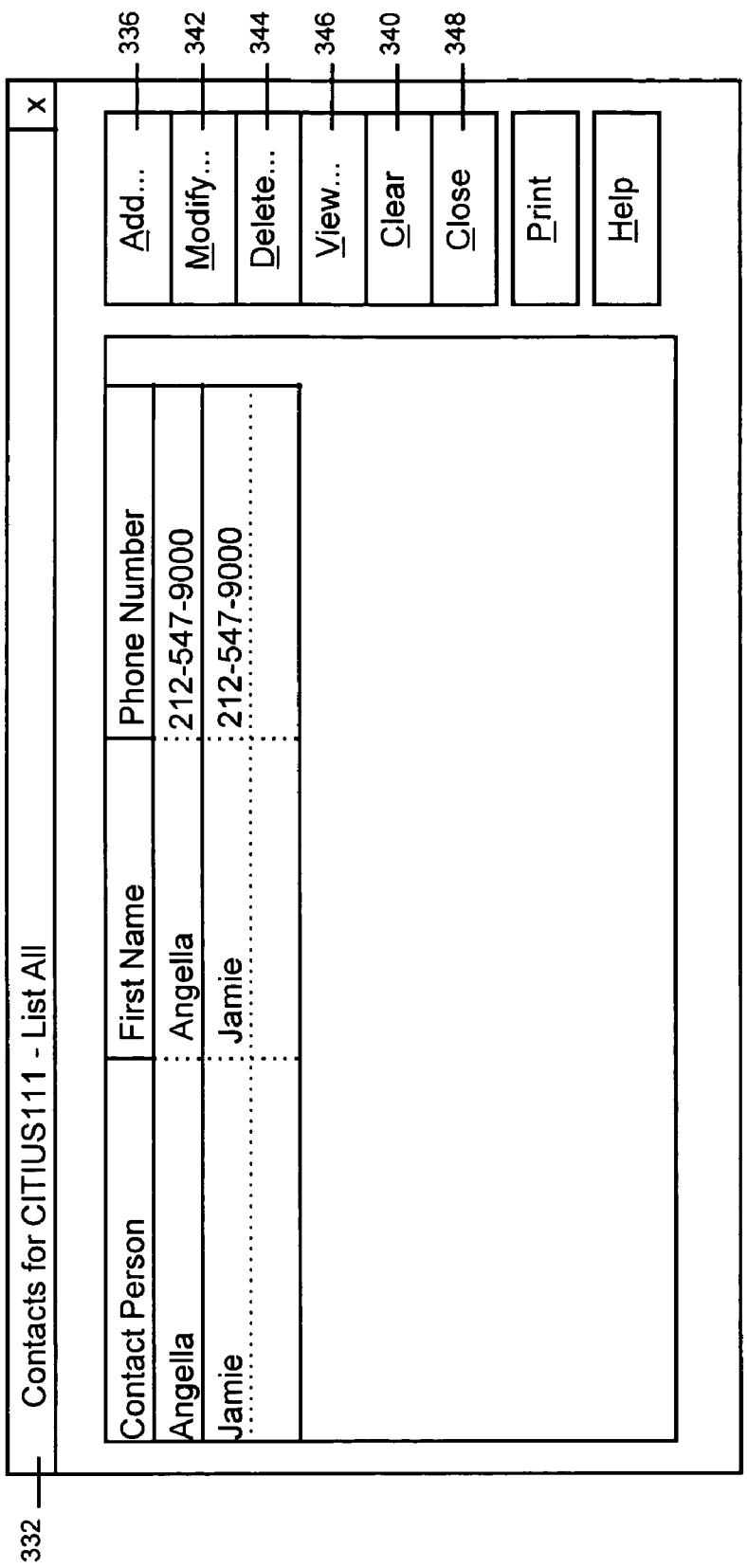

FIG. 31 is a sample Contacts List screen and FIG. 32 is a sample Contacts Details screen for an embodiment of the present invention. To invoke this option from the Administration menu the user clicks Custodian Bank, selects a custodian bank record, and clicks Contacts 324. This option allows the user to maintain various contacts for a particular custodian. The entire operation is divided into the Contacts List screen 332 and the Contacts Details screen 334. The user can view the entire list of contacts in the Contacts List screen 332 in a tabular form. The details of a particular contact can be seen in the Contacts Details screen 334. It is a pre-requisite for adding a new contact that a custodian profile be created before creating the new contact, because the contact is created for a particular custodian. There are no pre-requisites for deleting an existing contact. The Contacts-List All screen 332 lists the available contact. The user can add new contacts or modify, view or delete existing contacts.

Referring to FIGS. 332 and 334, to add a new contact, the user selects a record from the list and clicks Add 336. This launches the Contacts Details screen 334 with the details of the selected record on which the key fields are blank. The user enters the required details and clicks OK 338 or selects a blank record from the list by clicking Clear 340 and clicks Add 336. This launches the Contacts Details screen 334 with all entry fields blank, and the user enters the required details and clicks OK 338. To modify an existing contact, the user selects a record from the list and clicks Modify 342. This launches the Contacts Details screen 334 with the details of the selected record, the key fields of which are not editable. The user modifies the required details and clicks OK 338.

Referring further to FIGS. 31 and 32, to delete a contact, the user selects the desired contact from the list and clicks Delete 344. The Contacts Details screen 334 is launched, and the user clicks on the OK button 338. A message box Delete Details? is displayed, and the user clicks Yes to confirm the deletion or clicks No if he or she has changed his or her mind. To view details of an existing contact, the user double clicks the desired record or selects the desired contact from the list and clicks View 346/presses Enter. When the user clicks OK 338, the screen closes after saving contact details. In the delete mode, the user clicks Yes to confirm the deletion; otherwise he or she clicks No. When the user clicks Close 348 after making modifications, he or she is offered choices to click Yes to exit after saving, to click No to exit without saving, or to click Cancel to maintain the status quo FIG. 33 is a sample Custodian Services List screen and FIG. 34 is sample Custodian Services Details screen for an embodiment of the present invention. To invoke this option from the Administration menu, the user clicks Custodian Bank, selects a custodian bank record, and clicks Services 328. This option allows the user to maintain various services for a custodian. The entire operation is divided into the Custodian Services List screen 350 and the Custodian Services Details screen 352. The user can view the entire list of custodian services in the Custodian Services List screen 350 in a tabular form. The details of a particular service can be seen in the Custodian Services Details screen 352. As a pre-requisite for adding a new service, in order to specify the services for a particular custodian, the related custodian record must have been entered through custodian maintenance. As a pre-requisite for deleting an existing service, before deleting any service, any import map set for the custodian for that service Id must be deleted. The Custodian Services-List screen 350 lists the available services for a particular custodian. The user can add new services and modify, view and delete existing services.

Referring to FIGS. 33 and 34, to add a new service, the user selects a record from the list and clicks Add 354. This launches the Custodian Services Details screen 352 with the details of the selected record, the key fields of which are blank. The user enters the required details and clicks OK 356 or selects a blank record from the list by clicking Clear 358 and clicks Add 354. This launches the Custodian Services Details screen 352 with all entry fields blank, and the user enters the required details and clicks OK 356. To modify an existing service, the user selects a record from the list and clicks Modify 360. This launches the Custodian Services Details screen 352 with the details of the selected record, on which the key fields are not editable. The user modifies the required details and clicks OK 356.

Figure 35:
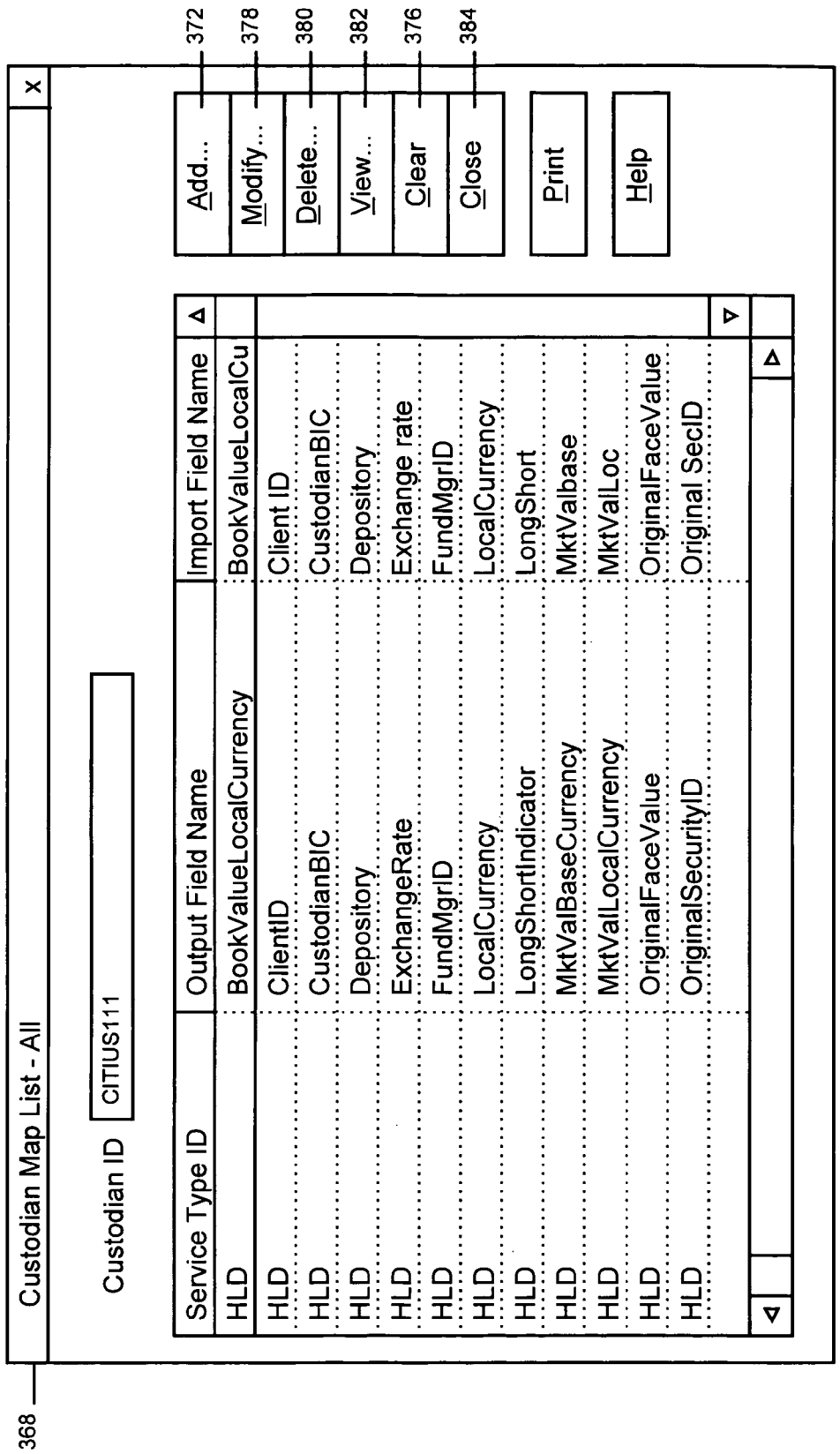

Referring further to FIGS. 33 and 34, to delete a service, the user selects the desired service from the list and clicks Delete 362. The Custodian Services Details screen 352 is launched, and the user clicks on the OK button 356. A message box Delete Details? is displayed, and the user clicks Yes to confirm the deletion or clicks No if he or she has changed his or her mind. To view details of an existing service, the user double clicks the desired record or selects the desired service from the list and clicks View 364/presses Enter. When the user clicks OK 356, the screen closes after saving details of a custodian service. In the delete mode, the user clicks Yes to confirm the deletion; otherwise he or she clicks No. When the user clicks Close 366 after making modifications, he or she is offered choices to click Yes to exit after saving, to click No to exit without saving, or to click Cancel to maintain the status quo FIG. 35 is a sample Custodian Mapping List screen and FIG. 36 is a sample Custodian Mapping Details screen for an embodiment of the present invention. To invoke this option from the Administration menu, the user clicks Custodian Bank, selects a custodian bank record, and clicks Map 326. This option allows the user to maintain custodian file import mapping details. The entire operation is divided into the Custodian Mapping List screen 368 and the Custodian Mapping Details screen 370. The user can view the entire list of custodian import mappings in the Custodian Mapping List screen 368 in a tabular form. The details of a particular custodian import mapping can be seen in the Custodian Mapping Details screen 370. As a pre-requisite to add or modify a custodian import map, the combination of custodian Id and the service type Id for which the mapping is required must be entered through the custodian services maintenance. In custodian services the service import table name and the import file format must be defined for the selected service type Id. There are no pre-requisites to delete a custodian import map.

Referring to FIGS. 35 and 36, to add a new custodian import mapping, the user selects a record from the list and clicks Add 372. This launches the Custodian Mapping Details screen 370 with the details of the selected record, on which the key fields are blank. The user enters the required details and clicks OK 374 or selects a blank record from the list by clicking Clear 376 and clicks Add 372. This launches the Custodian Mapping Details screen 370 with all entry fields blank, and the user enters the required details and clicks OK 374. To modify a custodian import mapping, the user selects a record from the list and clicks Modify 378. This launches the Custodian Mappings Details screen 370 with the details of the selected record on which the key fields are not editable. The user modifies the required details and clicks OK 374.

Referring further to FIGS. 35 and 36, to delete a custodian import mapping, the user selects the desired custodian import mapping from the list and clicks Delete 380. The Custodian Mapping Details screen 370 is launched, and the user clicks on the OK button 374. A message box Delete Details? is displayed, and the user clicks Yes to confirm the deletion or clicks No if he or she has changed his or her mind. To view details of an existing custodian import mapping, the user double clicks the desired record or selects the desired custodian import mapping from the list and clicks View 382/presses Enter. When the user clicks OK 374, the screen closes after saving custodian import mapping details. In the delete mode, the user clicks Yes to confirm the deletion; otherwise he or she clicks No. When the user clicks Close 384 after making modifications, he or she is offered choices to click Yes to exit after saving, to click No to exit without saving, or to click Cancel to maintain the status quo.

Figure 37:
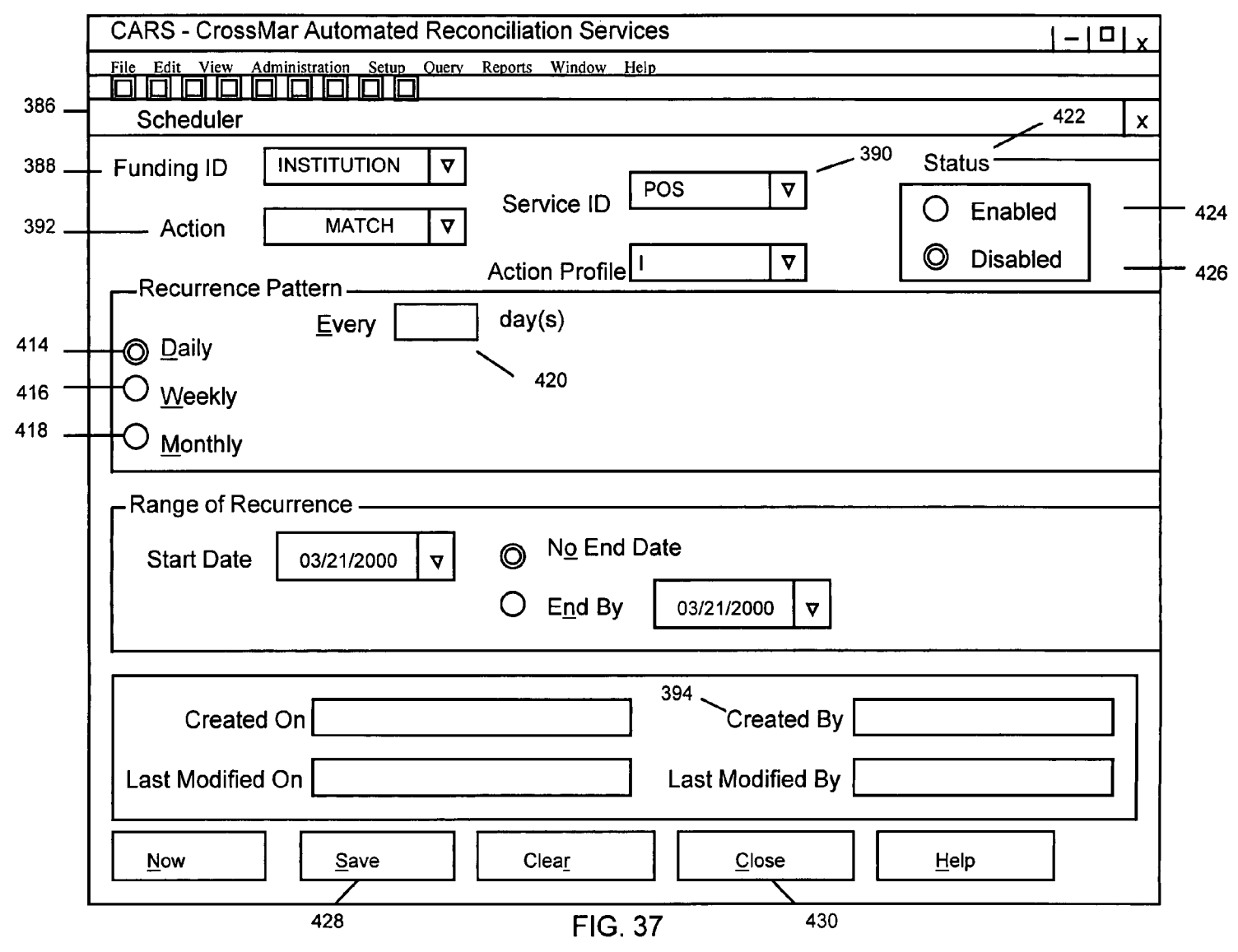
Figure 38:
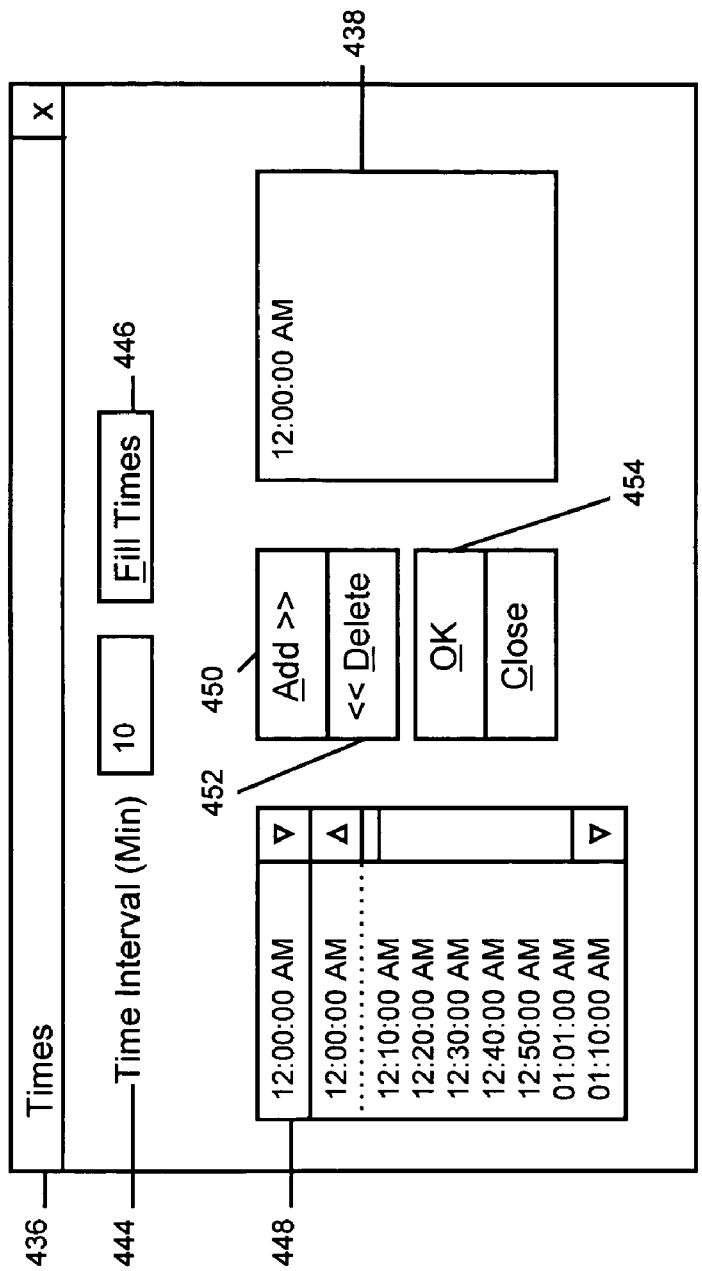

FIG. 37 is a sample Scheduler Setup screen and FIG. 38 is a sample Times screen for an embodiment of the present invention. To invoke this option from the Setup menu, the user clicks Scheduler. This setup enables the user to view or set scheduler options for import, match, import and match, and archive. As pre-requisites, services should be set up for fund managers before scheduler setup can be done. Also, import-setup, match-group-levels and match-group-elements creation should be completed before any activity of importing, archiving, or matching starts. The Scheduler Setup screen 386 has three dropdown lists for selection. For a user belonging to a fund manager, the fund manager Id is displayed in a Fund Manager Id dropdown list 388. For a customer services user, all fund manager Ids are displayed, of which one can be selected. A Service Type ID dropdown list 390 is for selecting a service type Id, and an Action dropdown list 392 is for selecting an action from the available Action list 392, such as import, match, import and match, or archive. The current scheduler setup for a particular combination of fund manager Id, service type Id and action are displayed on the screen. If no options have been set for a particular combination, default options are displayed and a Created By field 394 displays New Record. The screen is refreshed each time the combination changes.

Referring to FIGS. 37 and 38, the user selects the Mode 396 as one of Automatic 398, Scheduled 400 or Manual 402. For Action 392 as match or import and match, and services like transactions and/or holdings, which are relevant for the matching process, the user selects the Match Option 404 as one of New data only 406, Unmatched data only 408, or All data 410. Service Level selections 412 include Daily 414, Weekly 416, Monthly 418, or Specific 420. A scheduler setup is effective if the Status 422 is Enabled 424. If it is Disabled 426, the scheduler setup is ineffective. When the user clicks Save 428, currently displayed options are saved for that particular combination of fund manager Id, service type Id and action. When the user clicks Close 430, if no changes have been made, the Scheduler Setup form 386 closes. If any selections have been changed, such as fund manager Id, service type Id, or action, the user is offered choices to click Yes to save changes, to click No to proceed without saving changes, or to click Cancel to maintain the status quo. When the user clicks Now 432, the selected action is invoked when the Now button 432 is clicked. The Now button 432 is enabled only when the Mode 396 is Manual 402 for a particular action. When the user clicks the Times button 434, the Times form 436 is launched. The Times button 434 is enabled only when the Mode 396 is Scheduled 400. When the form 436 is loaded, the currently set times (or 12:00 am as default, if no times are set) are displayed in the listbox 438 on the right side of the screen.

Referring further to FIGS. 37 and 38, the Times form 436 allows various times to be set for an action for the Scheduled mode 400. When the Times form 436 is loaded, the currently set times (or 12:00 am as default, if not times are set) are displayed in the listbox 438 on the right side of the screen. To set up schedule times, the user fills the number of minutes he or she wants as the time interval in the Time Interval textbox 444 and clicks on Fill Times 446. The combo box 448 on the left side of the screen is filled with the times starting from 12:00 am and with the interval as indicated in the textbox 444. The default time interval is 30 minutes. The user selects the time he or she wants and clicks on Add 450 to add times to the list box 438 on the right. To delete any times, the user selects the time from the list box 438 on the right and clicks on Delete 452 and clicks on OK 454 to save the schedules. When the user clicks on OK 454, the displayed times are marked for saving, the Times form 436 is closed, and the Scheduler Setup form 386 is displayed. When the user clicks Close 430, if no modifications have been made, the Scheduler Setup screen 386 is closed. If modifications have been made, the user is given choices to click Yes to exit after marking changes for saving or to click No to exit without saving or to click Cancel to maintain the status quo.

Figure 39:
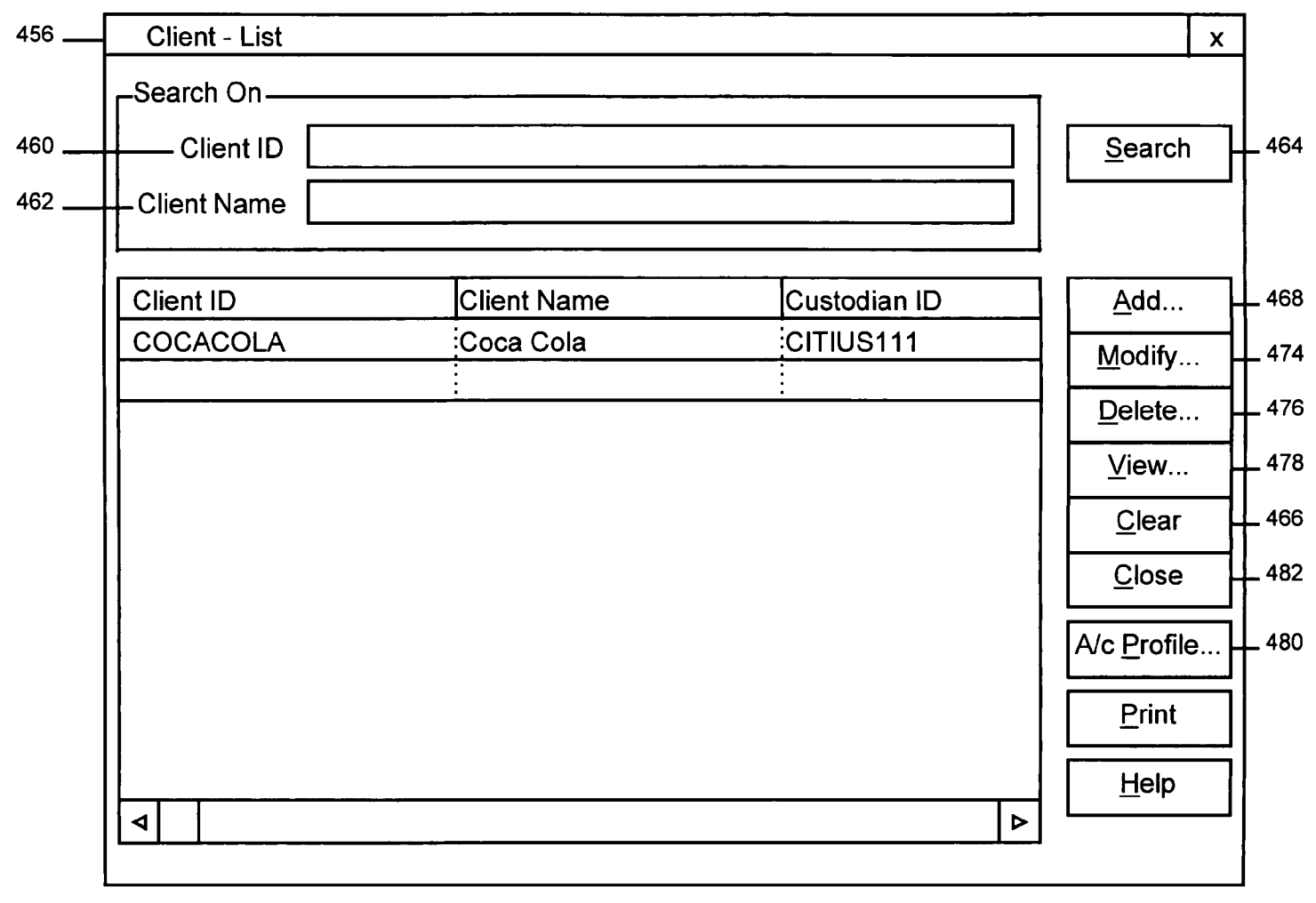

A Fund Manager Setup aspect of an embodiment of the present invention involves menu options that are accessed by each fund manager to setup data before import and reconciliation of data can be done including, for example, Clients, Accounts, User-Client Mapping, Account Type, Match Groups, Match Group Elements, Match Group Levels, Fund Manager-Security Mapping, Manager Unmatched Display Setup, Bank Unmatched Display Setup, and Matched Display Setup. FIG. 39 is a sample Clients List screen and FIG. 40 is a sample Client Details screen for an embodiment of the present invention. To invoke this option from the Administration menu the user clicks Client and Account. This option allows the user to maintain various clients specific to his or her fund manager Id and accounts corresponding to the client Id. The entire operation is divided into the Clients List screen 456 and the Client Details screen 458. The user can view the entire list of clients in the Clients List screen 456 in a tabular form that matches his or her fund manager Id and the search criteria corresponding to the client name and client Id given by the user. The details of a particular client can be seen in the Client Details screen 458. As a pre-requisites to view a client, the user can create clients that correspond to his or her fund manager Id only. As a pre-requisite to add/modify a client, the user can create clients that correspond to his or her fund manager Id only. As a pre-requisite to delete a client, the user can create clients that correspond to his or her fund manager Id only. The Clients List screen 456 lists available clients corresponding to the user's fund manager Id and matching the client Id and client name in the search criteria. The user can add new clients or modify, view and delete existing clients only if they correspond to his or her fund manager Id. The user can view the profiles of those accounts that belong to his or her client Ids.

Referring to FIGS. 39 and 40, to search for clients, the user enters the first few characters of the Client Id 460 and/or Client Name 462 of the client he or she is looking for and clicks Search 464. The list will display only those clients whose first few characters match the characters entered and corresponding to the user's fund manager Id, depending on whether he or she is a manager or not. The user clicks Clear 466 to revert to the entire list of clients that correspond to his or her fund manager Id. To add a new client, the user can add a client that corresponds to his or her fund manager Id. The user selects a row from the list and clicks Add 468. This launches the Client Details screen 458 the key fields of which are blank. The user enters the required details and clicks OK 470 or selects a blank row from the list by clicking Clear 466 and clicks Add 468. This launches the Client Details screen 458 with all entry fields blank except the Custodian Id field 472. The list boxes will contain values allocated to the user, and he or she enters the required details and clicks OK 470. The user can modify all clients that correspond to his or her fund manager Id. To modify a client, the user selects a row from the list and clicks Modify 474. This launches the Client Details screen 458 with the details of the selected client on which only the client name is editable. The user modifies the required details and clicks OK 470.

Referring further to FIGS. 39 and 40, to delete a client, the user can delete only those clients that correspond to his or her fund manager Id. The user selects the desired client from the list and clicks Delete 476, and the Client Details screen 458 is launched. The user clicks on the OK button 470 and a message box Delete Details? is displayed. The user clicks Yes to confirm the deletion or clicks No if he or she has changed his or her mind. To view details of a client, the user double clicks the desired row or selects the desired client from the list and clicks View 478/presses Enter. To maintain accounts of a client, the user selects a client and clicks A/c Profile 480. When the user clicks OK 470, the screen closes after saving client details. In the delete mode, the user clicks Yes to confirm the deletion; otherwise he or she clicks No. When the user clicks Close 482 after making modifications, he or she is offered choices to click Yes to exit after saving or to click No to exit without saving or to click Cancel to maintain the status quo.

Figure 41:
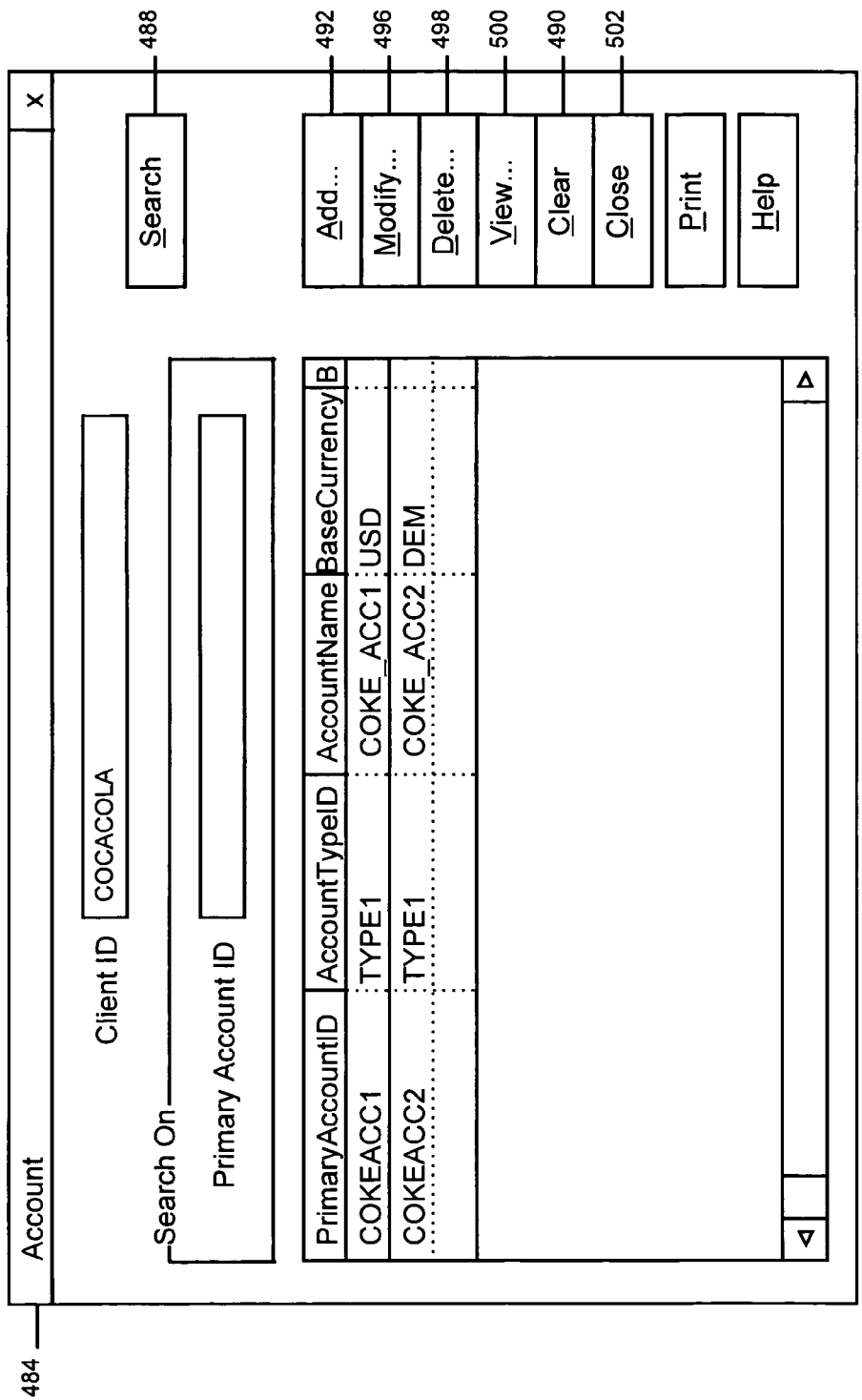

FIG. 41 is a sample Accounts List screen and FIG. 42 is a sample Account Details screen for an embodiment of the present invention. To invoke this option from the Administration menu, the user clicks Client and Account, selects a client, and clicks A/c Profile. This option allows the user to maintain various accounts. The entire operation is divided into the Accounts List screen 484 and the Account Details screen 486. The user can view the entire list of accounts in Accounts List screen 484 in a tabular form only if the user is also a user manager. If not, the user is allowed to view only those accounts allocated to him or her. The details of a particular account can be seen in the Account Details screen 486. To create an account, custodian Ids, client Ids, account type Ids and user Ids corresponding to a particular fund manager must have been defined. To add or delete an account, the user must be a manager. If the user is not a manager, he or she can delete only those accounts allocated to him or her. The Accounts List screen 484 lists available accounts depending on whether the user is a manager or not. If the user is a manager, he or she can add new accounts or modify, view and delete existing accounts. If the user is not a manager, he or she can only view and modify those accounts that have been allocated to him or her.

Referring further to FIGS. 41 and 42, to search for accounts, the user enters the first few characters of the secondary account Id and/or primary account Id of the account he or she is looking for and clicks Search 488. The user can enter the secondary account Id only after entering the primary account Ids. Secondary Account ID can accept positive numbers not exceeding four. The list displays only those accounts whose first few characters match the characters entered depending on whether the user is a manager or not. The user clicks Clear 490 to revert to the entire list for which he or she has permissions. The user must be a manager to add an account. The user selects a row from the list and clicks Add 492. This launches the Account Details screen 486 with the details of the selected account and with the key fields blank. The user enters the required details and clicks OK 494 or selects a blank row from the list by clicking Clear 490 and clicks Add 492. This launches the Account Details screen 486 with all entry fields blank and with the list boxes containing values allocated to the user. The user enters the required details and clicks OK 494.

Referring further to FIGS. 41 and 42, if the user is a manager he or she can modify all accounts. If not, however, the user is permitted to modify only those accounts for which he or she has the permissions. The user selects a row from the list and clicks Modify 496. This launches the Account Details screen 486 with the details of the selected account on which the key fields are not editable. The user modifies the required details and clicks OK 494. To delete an account, the user must be a manager. To delete the account, the user selects the desired account from the list and clicks Delete 498. The Account Details screen 486 is launched, and the user clicks on the OK button 494. A message box Delete Details? is displayed. The user clicks Yes to confirm the deletion or clicks No if he or she has changed his or her mind. To view details of an account, the user double clicks the desired row or selects the desired account from the list and clicks View 500/presses Enter. When the user clicks OK 494, the screen closes after saving account details. In the delete mode, the user clicks Yes to confirm the deletion; otherwise he or she clicks No. When the user clicks Close 502 after making modifications, he or she is offered choices to click Yes to exit after saving or to click No to exit without saving or to click Cancel to maintain the status quo.

Figure 43:
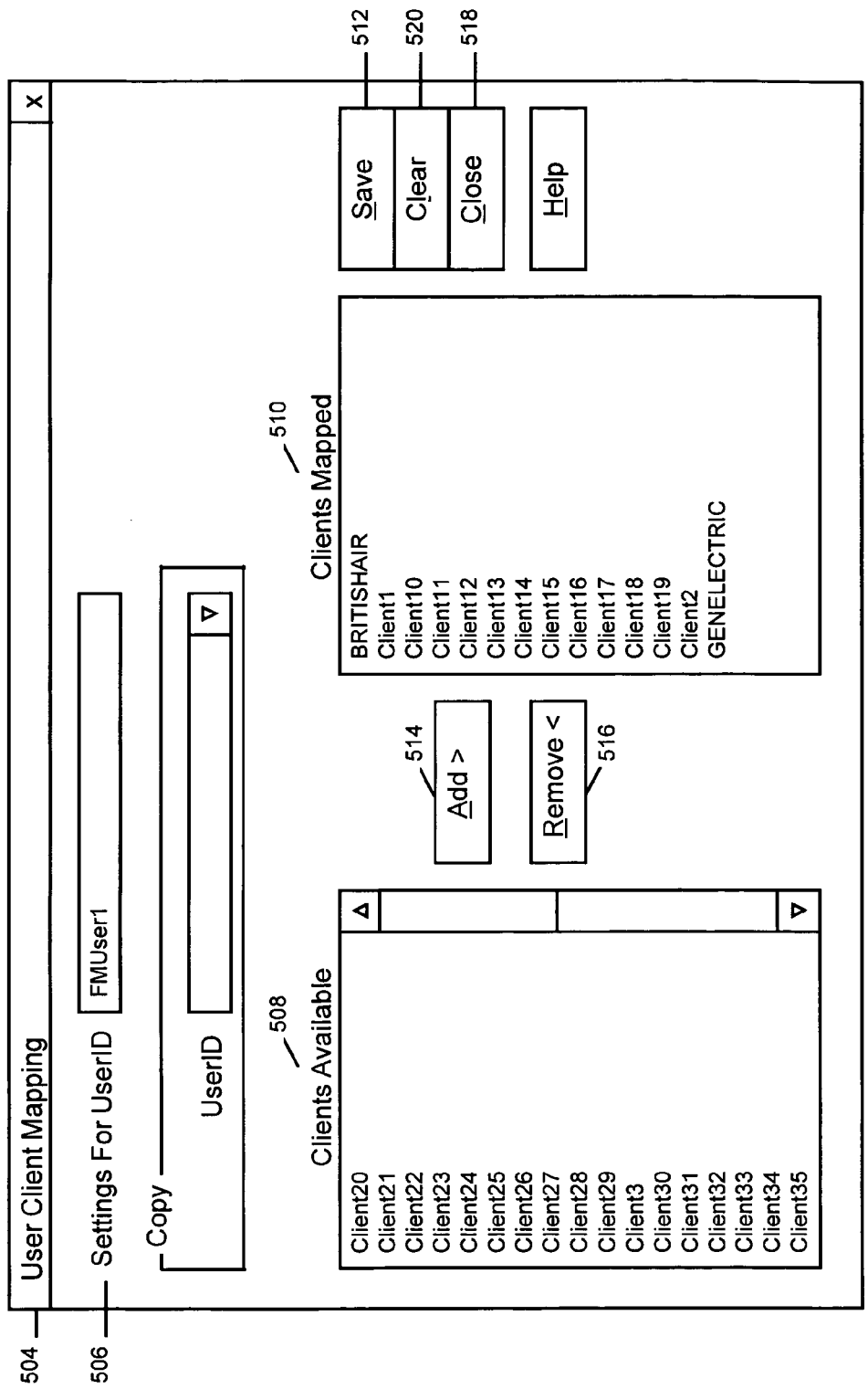
FIG. 43 is a sample User Client screens for an embodiment of the present invention.

FIG. 43 is a sample Client Mapping screen for an embodiment of the present invention. To invoke this option from Administration menu the user clicks User Client Mapping. User Client Mapping 504 allows a user to assign clients to users. The user can map a client to a particular user. One or more clients can be assigned to a user. One client can be assigned to more than one user. As pre-requisites, the fund manager must be defined through the fund manager maintenance, the custodian bank Id must be defined through the custodian maintenance, the client Id must be defined through the client maintenance, and the user Id must be defined through the user maintenance. To map client to user, the user selects the user Id to which the clients are to be mapped from Settings for User ID 506. If the user wants to copy clients mapped to another user, he or she selects the user Id whose client mappings are to be copied. The clients available and not mapped will be shown in the Client Available list 508, and the clients mapped will be shown in the Client Mapped list 510. The user adds or removes required client mapping and clicks Save 512 to save the details.

Referring to FIG. 43, the Add button 514 is enabled only when one or more records from the Client Available 508 are selected. On the click of the Add button 514, the selected records are moved from the Client Available list 508 to the corresponding Client Mapped list 510. A record can be selected by clicking on the record in the Client Mapped list 510. More than one record can be selected at a time by pressing Shift key and clicking simultaneously. The Remove button 516 is enabled only when one or more records from the Client Mapped list 510 are selected. On the click of this button the selected records are moved from a Client Selected list to the corresponding Client Available list 508. A record can be selected by clicking on the record in the Client Available list 508. More than one record can be selected at a time by pressing Shift key and clicking simultaneously. Clicking the Save button saves client user map details. Clicking the Close button 518 closes the screen, and if any changes have been made to the data, the user is prompted to save the data before closing the screen. The Clear button 520 clears all the data from the screen and allows the user to select another user Id.

Figure 44:
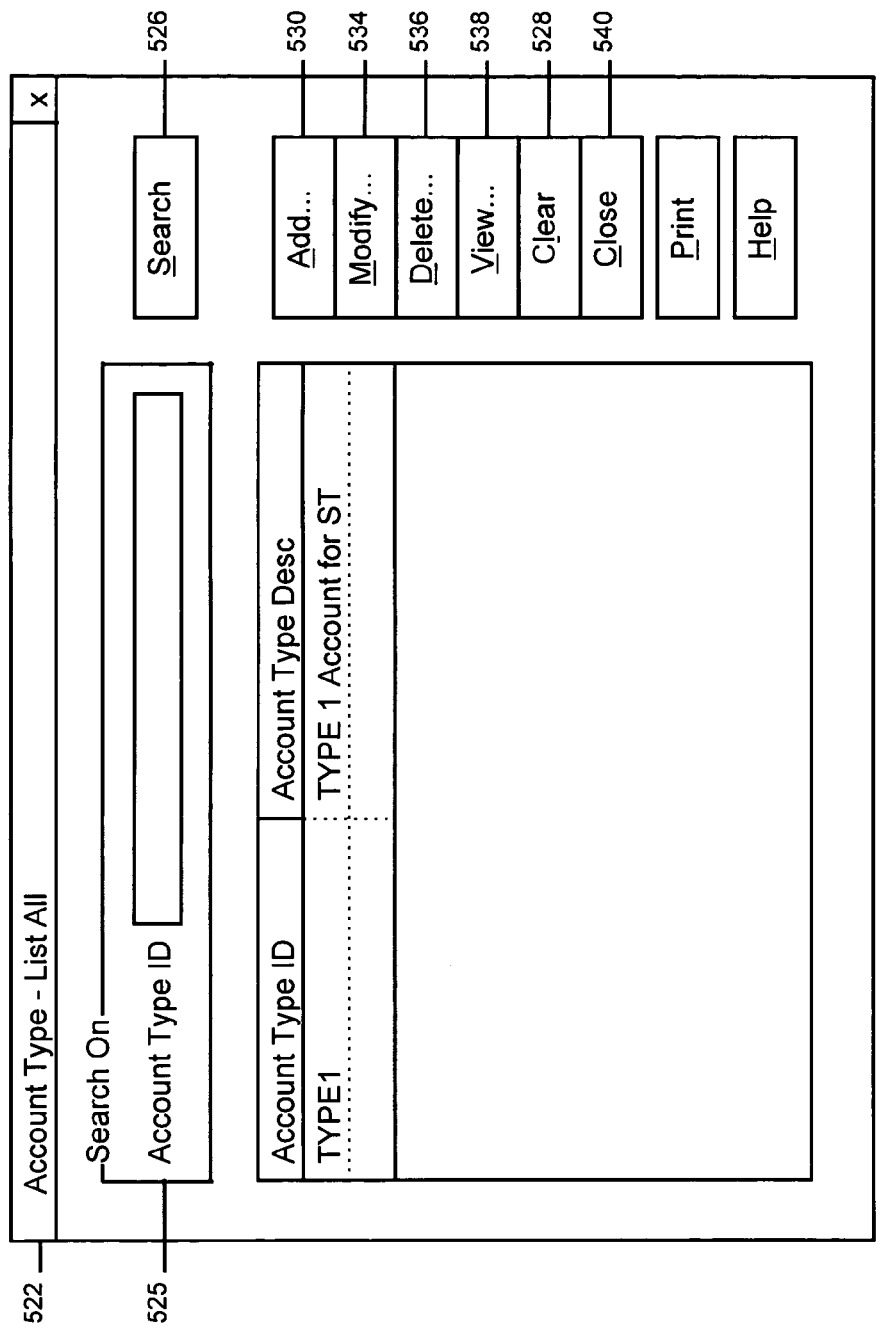

FIG. 44 is a sample Account Type List screen and FIG. 45 is a sample Account Type Details screen for an embodiment of the present invention. To invoke this option from Administration menu, the user clicks Account Type. This option allows the user to maintain various account types. The entire operation is divided into the Account Type List screen 522 and the Account Type Details screen 524. The user can view the entire list of account types in the Account Type List screen 522 in a tabular form. The details of a particular account type can be seen in the Account Type Details screen 524. There are no pre-requisites for adding a new account type, but for deleting an existing account type, it is necessary to delete all the entries in the account maintenance and match results view for the account type to be deleted. The Account Type List screen 522 lists the available account types. The user can add a new account type or modify, view or delete an existing account type.

Referring to FIGS. 44 and 45, to search on account types, the user enters one or more leftmost characters in the Account Type Id field 525 and clicks Search 526. This displays the account types that match the entry, and the user clicks Clear 528 to revert to the entire list. To add a new account type, the user selects a record from the list and clicks Add 530. This launches the Account Type Details screen 524 with the details of the selected record on which the key fields are blank. The user enters the required details and clicks OK 532 or selects a blank record from the list by clicking Clear 528 and clicks Add 530. This launches the Account Type Details screen 524 with all entry fields blank, and the user enters the required details and clicks OK 532. To modify an existing account type, the user selects a record from the list and clicks Modify 534. This launches the Account Type Details screen 524 with the details of the selected record on which the key fields are not editable. The user modifies the required details and clicks OK 532.

Referring further to FIGS. 44 and 45, to delete a account type, the user selects the desired account type from the list and clicks Delete 536, and the Account Type Details screen 524 is launched. The user clicks on the OK button 532, and a message box Delete Details? is displayed. The user clicks Yes to confirm the deletion or clicks No if he or she has changed his or her mind. To view details of an existing account type, the user double clicks the desired record or selects the desired account type from the list and clicks View 538/presses Enter. When the user clicks OK 532, the screen closes after saving account type details. In the delete mode, the user clicks Yes to confirm the deletion; otherwise he or she clicks No. When the user clicks Close 540 after making modifications, he or she is offered choices to click Yes to exit after saving or to click No to exit without saving or to click Cancel to maintain the status quo.

Figure 46:
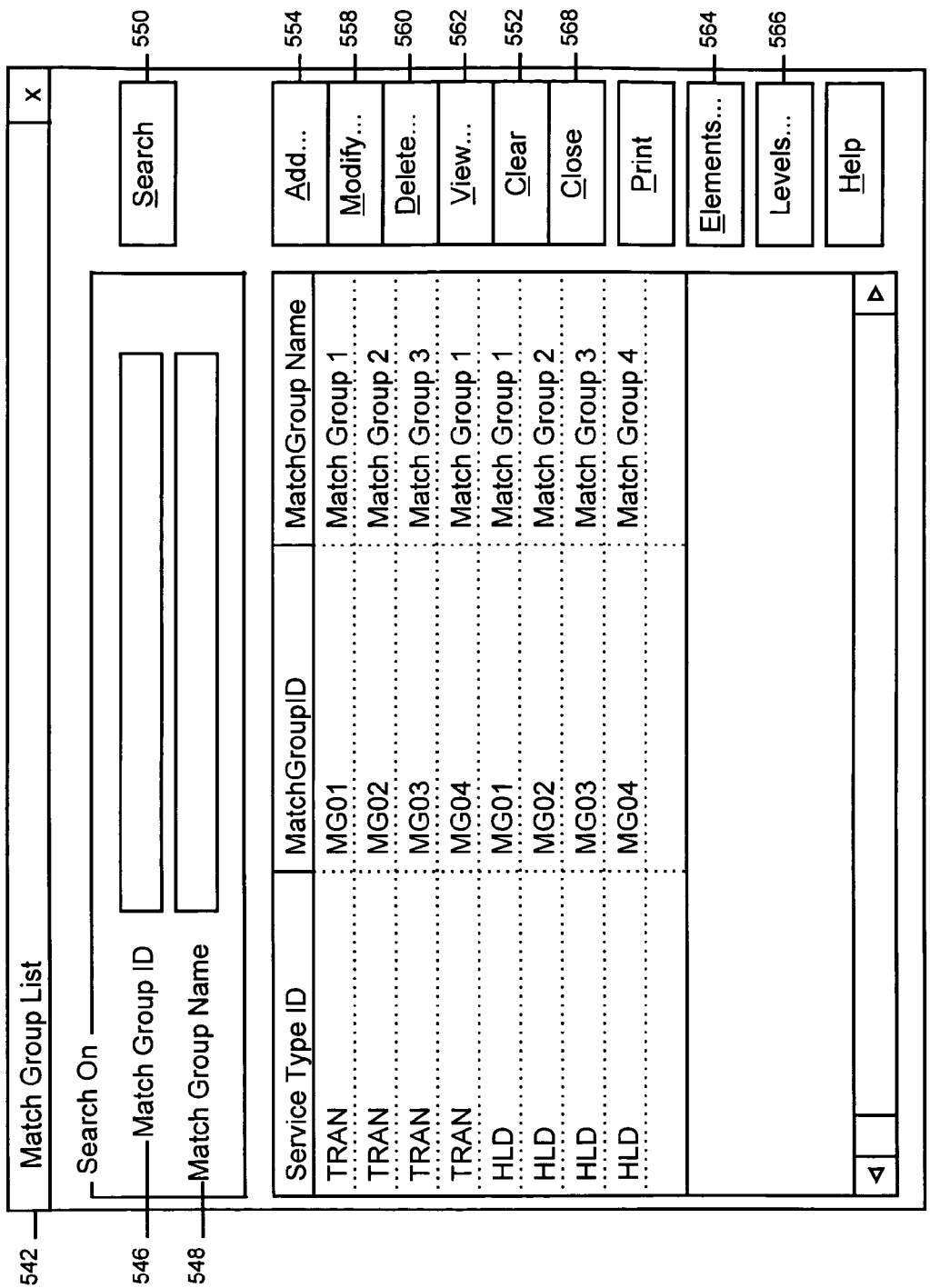

FIG. 46 is a sample Match Group List screen and FIG. 47 is a sample Match Group Details screen for an embodiment of the present invention. To invoke this option from the Administration menu, the user clicks Match Groups. This option will allows the user to maintain various match groups. The entire operation is divided into the Match Group List screen 542 and the Match Group Details screen 544. The user can view the entire list of match groups in Match Group List screen 542 in a tabular form. The details of a particular match group can be seen in the Match Group Details screen 544. As pre-requisites, the fund manager must be defined through the fund manager maintenance, and the service type Id must be defined through the service maintenance. The Match Group List screen 542 lists the available match groups. The user can add new match groups or modify, view and delete existing match groups. The user can define the match group elements and match group levels for a match group.

Referring to FIGS. 46 and 47, to search on match groups, the user enters one or more characters in the Match Group ID field 546 or Match Group Name field 548 and clicks Search 550. This displays the match group that satisfies the entry, and the user clicks Clear 552 to revert to the entire list. To add a new match group, the user selects a record from the list and clicks Add 554. This launches the Match Group Details screen 544 with the details of the selected record and the key fields blank. The user enters the required details and clicks OK 556 or selects a blank record from the list by clicking Clear 552 and clicks Add 554. This launches the Match Group Details screen 544 with all entry fields blank. The user enters the required details and clicks OK 556. To modify an existing match group, the user selects a record from the list and clicks Modify 558. This will launches the Match Group Details screen 544 with the details of the selected record on which the key fields are not editable. The user modifies the required details and clicks OK 556.

Referring further to FIGS. 46 and 47, to delete a match group, the user selects the desired match group from the list and clicks Delete 560, and the Match Group Details screen 544 is launched. The user clicks on the OK button 556, and a message box Delete Details? is displayed. The user clicks Yes to confirm the deletion or clicks No if he or she has changed his or her mind. To view details of an existing match group, the user double clicks the desired record or selects the desired match group from the list and clicks View 562/presses Enter.

Referring again to FIGS. 46 and 47, the user can specify match group elements details, such as match field for fund manager, match field for custodian bank and the like, for a particular match group. To maintain match group elements, the user selects the desired match group from the list and clicks Elements 564. The user can also specify match group level details, such as match group level number, security type Id and the like, for a particular match group. To maintain match group levels, the user selects the desired match group from the list and clicks Levels 566. When the user clicks OK 556 on the Match Group Details screen 544, the screen closes after saving match group details. In the delete mode, the user clicks Yes to confirm the deletion; otherwise he or she clicks No. When the user clicks Close 568 after making modifications, he or she is offered choices to click Yes to exit after saving or to click No to exit without saving or to click Cancel to maintain the status quo.

FIG. 48 is a sample Match Group Element List screen and FIG. 49 is a sample Match Group Element Details screen for an embodiment of the present invention. To invoke this option from the Administration menu, the user clicks Match Groups. The user selects a match group and clicks Elements 564. This option allows the user to maintain various match group elements. The entire operation is divided into the Match Group Element List screen 570 and the Match Group Element Details screen 572. The user can view the entire list of match group elements in the Match Group Element List screen 570 in a tabular form. The details of a particular match group element can be seen in the Match Group Element Details screen 572. As pre-requisites, The fund manager has to be defined through the fund manager maintenance, the custodian bank Id has to be defined through the custodian maintenance, the service type Id has to be defined through the service maintenance, and the match group Id has to be defined through the match group maintenance. The Match Group Element List screen 570 lists the available match group elements. The user can add new match group elements or modify, view and delete existing match group elements.

Referring to FIGS. 48 and 49, to add a new match group element, the user selects a record from the list and clicks Add 574. This launches the Match Group Element Details screen 572 with the details of the selected record on which the key fields are blank. The user enters the required details and clicks OK 576 or selects a blank record from the list by clicking Clear 578 and clicks Add 574. This launches the Match Group Element Details screen 572 with all entry fields blank. The user enters the required details and clicks OK 576. To modify an existing match group element, the user selects a record from the list and clicks Modify 580. This launches the Match Group Element Details screen 572 with the details of the selected record on which the key fields are not editable. The user modifies the required details and clicks OK 576.

Referring further to FIGS. 48 and 49, to delete a match group element, the user selects the desired match group element from the list and clicks Delete 582. The Match Group Element Details screen 572 will be launched, and the user clicks on the OK button 576. A message box Delete Details? is displayed, and the user clicks Yes to confirm the deletion or clicks No if he or she has changed his or her mind. To view details of an existing match group element, the user double clicks the desired record or selects the desired match group element from the list and clicks View 584/presses Enter. When the user clicks OK 576 on the Match Group Element Details screen 572, the screen closes after saving match group element details. In the delete mode, the user clicks Yes to confirm the deletion; otherwise he or she clicks No. When the user clicks Close 586 after making modifications, he or she is offered choices to click Yes to exit after saving or to click No to exit without saving or to click Cancel to maintain the status quo.

Figure 50:
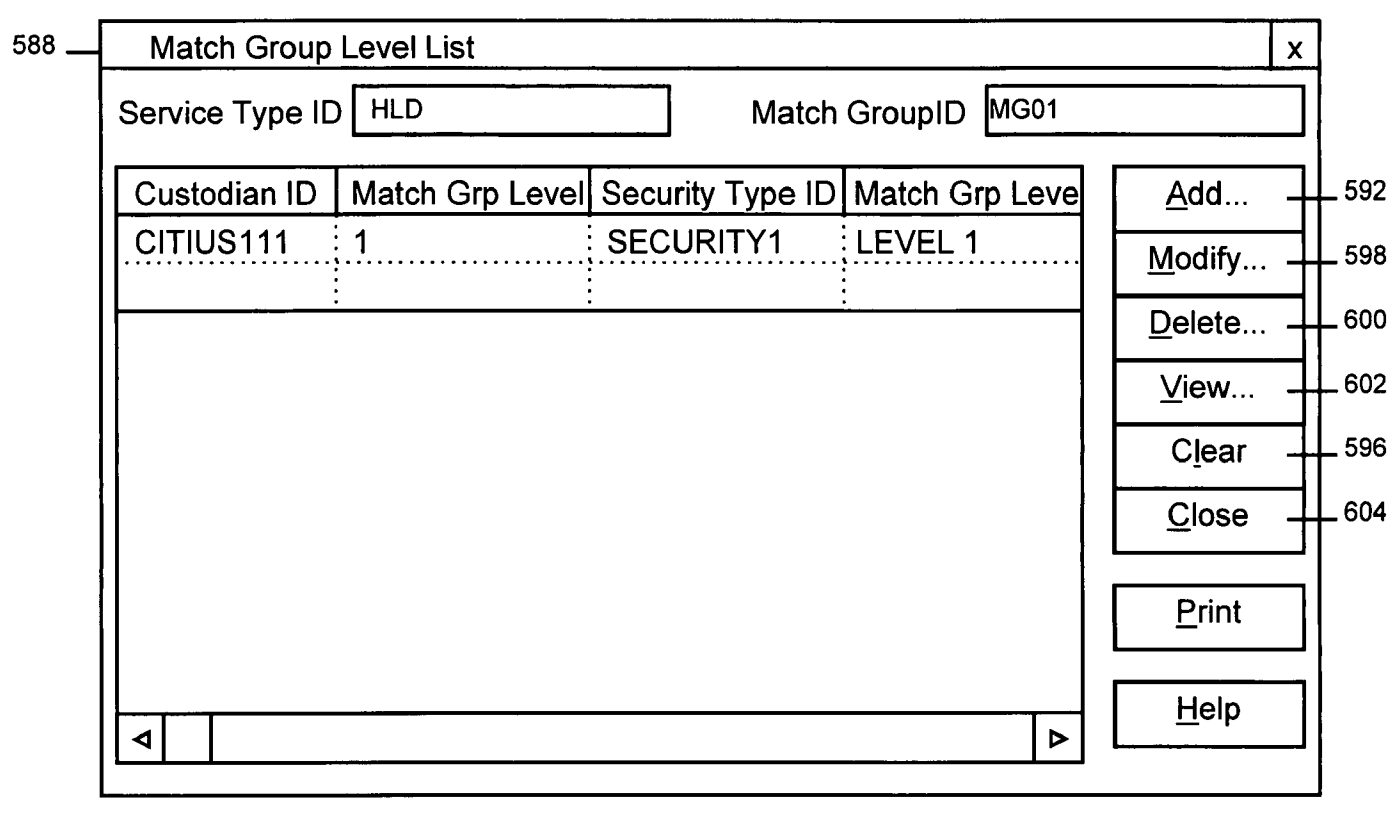

FIG. 50 is a sample Match Group Level List screen and FIG. 51 is a sample Match Group Level Details screen for an embodiment of the present invention. To invoke this option from the Administration menu, the user clicks Match Groups, selects a match group, and clicks Levels. This option allows the user to maintain various match group levels. The entire operation is divided into the Match Group Level List screen 588 and the Match Group Level Details screen 590. The user can view the entire list of match group levels in the Match Group Level List screen 588 in a tabular form. The details of a particular match group level can be seen in the Match Group Level Details screen 590. As pre-requisites, the fund manager must be defined through the fund manager maintenance, the custodian bank Id must be defined through the custodian maintenance, the fund manager-custodian bank combination must be defined through the fund manager custodian maintenance, the service type Id must be defined through the service maintenance, and the fund manager service type combination must be defined through the fund manager services maintenance. As further pre-requisites, the custodian service type combination must be defined through the custodian services maintenance, the security type Id must be defined through the security type maintenance, the match group Id must be defined through the match group maintenance, and the match group elements must be defined through the match group elements maintenance. The Match Group Level List screen 588 lists the available match group levels. The user can add new match group levels or modify, view and delete existing match group levels.

Referring to FIGS. 50 and 51, to add a new match group level, the user selects a record from the list and clicks Add 592. This launches the Match Group Level Details screen 590 with the details of the selected record on which the key fields are blank. The user enters the required details and clicks OK 594 or selects a blank record from the list by clicking Clear 596 and clicks Add 592. This launches the Match Group Level Details screen 590 with all entry fields blank, and the user enters the required details and clicks OK 594. To modify an existing match group level, the user selects a record from the list and clicks Modify 598. This launches the Match Group Level Details screen 590 with the details of the selected record on which the key fields are not editable. The user modifies the required details and clicks OK 594.

Referring further to FIGS. 50 and 51, to delete a match group level, the user selects the desired match group level from the list and clicks Delete 600. The Match Group Level Details screen 590 is launched, and the user clicks on the OK button 594. A message box Delete Details? is displayed, and the user clicks Yes to confirm the deletion or clicks No if he or she has changed his or her mind. To view details of an existing match group level, the user double clicks the desired record or selects the desired match group level from the list and clicks View 602/presses Enter. When the user clicks OK 594, the Match Group Level Details screen 590 closes after saving match group level details. In the delete mode, the user clicks Yes to confirm the deletion; otherwise he or she clicks No. When the user clicks Close 604 after making modifications, he or she is offered choices to click Yes to exit after saving or to click No to exit without saving or to click Cancel to maintain the status quo.

FIG. 52 is a sample Fund Manager Security Mapping List screen and FIG. 53 is a sample Fund Manager Security Mapping Details screen for an embodiment of the present invention. To invoke this option from the Administration menu, the user clicks Fund Manager Security Mapping. Fund manager security mapping allows a user to maintain the records of the security mappings. The entire operation is divided into the Fund Manager Security Mapping List screen 604 and the Fund Manager Security Mapping Details screen 606. The user can view the entire list of security mappings in a tabular form through the Fund Manager Security Mapping List screen 604. The details of a particular fund manager security mapping can be seen in the Fund Manager Security Mapping Details screen 606. As pre-requisites, the fund manager must be defined through the fund manager maintenance, the custodian bank Id must be defined through the custodian maintenance, and the fund manager custodian mapping maintenance should have an entry for the specific fund manager and custodian for whom the security mapping is to be defined. The Fund Manager Security Mapping List screen 604 lists the available fund manager security mapping. The user can add new or modify, view and delete existing fund manager security mapping.

Referring to FIGS. 52 and 53, to add a new fund manager security mapping, the user selects a record from the list and clicks Add 608. This launches the Fund Manager Security Mapping Details screen 606 with the details of the selected record and the key fields blank. The user enters the required details and clicks OK 610 or selects a blank record from the list by clicking Clear 612 and clicks Add 608. This launches the Fund Manager Security Map Details screen 606 with all entry fields blank. The user enters the required details and clicks OK 610. To modify an existing fund manager security map, the user selects a record from the list and clicks Modify 614. This launches Fund Manager Security Mapping Details screen 606 with the details of the selected record on which the key fields are not editable. The user modifies the required details and clicks OK 610.

Referring further to FIGS. 52 and 53, to delete a fund manager security map, the user selects the desired fund manager security map from the list and clicks Delete 616. The Fund Manager Security Map Details screen 606 is launched, and the user clicks on the OK button 610. A message box Delete Details? is displayed, and the user clicks Yes to confirm the deletion or clicks No if he or she has changed his or her mind. To view details of an existing fund manager security map, the user double clicks the desired record or selects the desired fund manager security map from the list and clicks View 618/presses Enter. When the user clicks OK 610 on the Fund Manager Security Mapping Details screen 606, the screen closes after saving fund manager security map details. In the delete mode, the user clicks Yes to confirm the deletion; otherwise he or she clicks No. When the user clicks Close 620 after making modifications, he or she is offered choices to click Yes to exit after saving or to click No to exit without saving or to click Cancel to maintain the status quo.

Figure 54:
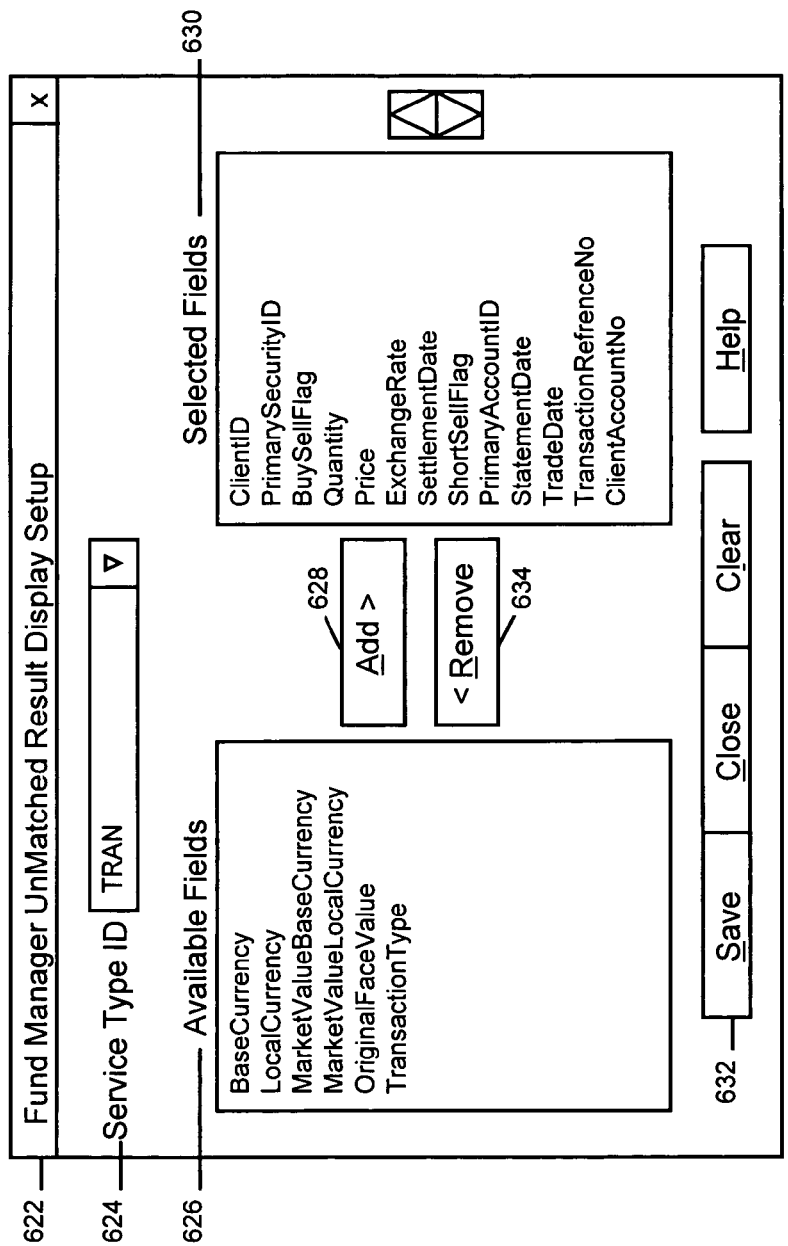
FIG. 54 is a sample Fund Manager Unmatched Result Display Setup screen for an embodiment of the present invention.

FIG. 54 is a sample Manager Unmatched Display Setup screen for an embodiment of the present invention. To invoke this option from the Setup menu, the user clicks Manager Unmatched Display. This option allows the user to select the fields to be displayed in the UnMatched Result View for Fund Manager. The order of display of these fields can also be specified through the Fund Manager UnMatched Display Setup screen 622 in a tabular form. As pre-requisites, the fund manager must be defined through the fund manager maintenance, the service type Id must be defined through the service maintenance, the output field names must be defined through the fund manager import map maintenance. The Manager UnMatched Display Setup screen 622 lists the available fields. The user can select or deselect and also order the selected fields.

Referring to FIG. 54, to select a service type Id, the user selects a service type Id from the Service Type ID combo box 624. This displays the available/selected fields for the selected service type Id. To select a field, the user selects a record from the Available Fields list 626 and clicks Add 628. This shifts the selected field to the Selected Fields List 630, and the user clicks Save 632. To deselect a field, the user selects a record from the Selected Fields list 630 and clicks Remove 634. This shifts the selected field to the Available Fields list 626, and the user clicks Save 632.

An embodiment of the present invention also includes a Custodian Unmatched Display Setup screen. To invoke this option from the Setup menu, the user clicks Bank Unmatched Display. This option allows the user to set up the fields he or she wants to view in the Custodian Unmatched Display screen. The user can set up the display characteristics in the Custodian Unmatched Display Setup screen. As pre-requisites, the custodian import mapping for the custodian Id and service type Id combination must be completed before the fields for display can be set up. Only those fields that have been mapped can be set up for display. The Custodian Unmatched Display Setup screen lists the available fields in a left listbox. A right listbox lists the selected fields for display. The user can add or remove the fields for display. The user can also define the order in which the fields are displayed. To get the current display setup for a custodian Id and service type Id, the user selects the desired custodian Id and then selects the service type Id for which the display setup is required. To add a new field for display, the user selects one or more records from a Fields Available listbox and clicks Add. The records shift to a Fields Selected listbox, and the user clicks OK.

To remove a field from display, the user selects one or more records from the Selected Fields listbox and clicks Remove. The records shift to the Fields Available listbox, and the user clicks OK. To set the field display order for the selected fields, the user selects the record from the Fields Selected listbox whose order needs to be changed, clicks an Up or Down arrow of a Spin Control to bring it to the required position, and clicks OK. When the user clicks OK, the changes are saved. The user can change the selection of custodian Id and service type Id and set up the display for a new combination of custodian Id and service type Id. When the user clicks Clear after making modifications, he or she is offered choices to click Yes to save the changes, and the entry fields are cleared or to click No to clear the entry fields without saving any changes or to click Cancel to maintain the status quo. When the user clicks Close after making modifications, he or she is offered choices to click Yes to exit after saving or to click No to exit without saving or to click Cancel to maintain the status quo.

An embodiment of the present invention also includes a Matched Display Setup screen. To invoke this option from the Setup menu, the user clicks Matched Display. This option allows the user to set up the fields he or she wants to view in a Matched Results screen. The user can set up the display characteristics in the Matched Display Setup screen. As prerequisites, the fund manager-service type Id combination must be set up before the fields for display for a service, such as holdings or transactions can be set up. The user selects a service type Id for which he or she wants to set up the display of matched records. For every field that the user selects from the fund manager side, a corresponding field must also be selected from the custodian bank side. The available fields for fund manager and the custodian bank are displayed in a left list box. A right list box lists the selected fields for display. The user can add or remove the fields for display. The user can also define the order in which he or she wants the fields to be displayed. To get the current display setup for a service type Id, the user selects the service type Id for which the display setup is to be required.

Referring to the Match Display Setup screen for an embodiment of the present invention, to add a new field for display, the user selects one record each for the fund manager and the custodian bank side from the Fields Available list box and clicks Add. The selected records shift to the Fields Selected listbox. The fields selected from the fund manager and custodian bank side must be of the same datatype, such as a string for a string, a number for a number, or a date for a date. If the fields selected are not of the same datatype, an error message is displayed saying that unrelated fields cannot be selected. The user must select account type Id before he or she can save the record, and the user clicks Save to save the setting. To remove a field from display, the user selects one record from the Selected Fields listbox and clicks Remove. The records shift to the Fields Available list box, and the user clicks Save to save the setting.

Referring again to the Match Display Setup screen, to set the field display order for the selected fields, the user selects the record from the Fields Selected listbox whose order needs to be changed, clicks the Up or Down arrow of the Spin Control to bring it to the required position, and clicks Save to save the setting. When the user clicks Save, the changes are saved. The user can change the selection of service type Id and set up the display for a new service type. When the user clicks Clear after making modifications, he or she is offered choices to click Yes to save the changes and the entry fields are cleared or to click No to clear the entry fields without saving any changes or to click Cancel to maintain the status quo. When the user clicks Close after making modifications, he or she is offered choices to click Yes to exit after saving or to click No to exit without saving or to click Cancel to maintain the status quo.

A Processing aspect of an embodiment of the present invention involves, for example, Scheduling, Importing Data, Matching and Archiving functionality. The application for an embodiment of the present invention has a scheduler which runs continuously in the background and checks for batch processes that need to be performed according to the scheduler setup previously discussed herein with reference to FIGS. 37 and 38. The actions, such as import, match, import and match, and archival that are set up with scheduled or automatic mode through the scheduler setup are scheduled for processing at the appropriate times by the scheduler. For actions to be performed in automatic mode, the scheduler ensures that the setup actions are performed every n minutes where n is the schedule time system parameter. This system parameter can be changed through the System Parameter option in the Administration menu by the user. For actions to be performed in the scheduled mode, the scheduler ensures that the setup actions are performed according to the scheduled times setup through the scheduler setup.

The Import Data process for an embodiment of the present invention looks for appropriate data files for fund manager and custodian bank in the import directory defined in the fund manager import mapping and custodian bank import mapping respectively. If a file is available, it is imported. After the file is successfully imported, the file is transferred to the archive directory as defined in the import mapping information. The application for an embodiment of the present invention provides for import of data, for example, by automatic mode, scheduled mode, and/or manual mode. If the mode in scheduler setup is automatic for import, the scheduler invokes the import process automatically for the fund manager and service type combinations, such as transactions or holdings. If the mode in scheduler setup is scheduled for import, the scheduler invokes the import process at the scheduled times for the fund manager and service type combination, such as transactions or holdings. If the mode in scheduler setup is manual for import, the import process has to be manually invoked for the fund manager and service type combination, such as transactions or holdings, by clicking Now.

The Matching process for an embodiment of the present invention runs a match on imported data based on the match option set in the scheduler setup for the action match or import and match. The match option can have values, such as unmatched data, new data, and all data. If the unmatched data match option is set, the match process considers only those records which have been processed but are unmatched, i.e., their match status is unmatched. In addition, if an unmatched record is approved or locked, it will not be considered by the match process. If the new data match option is set, the match process considers only those records which have been newly imported. In this case, processed and unmatched records are not considered for matching. If the all data match option is set, the match process will consider all records, such as newly imported, matched or unmatched, for matching provided they are not approved or locked.

The Matching process of the application for an embodiment of the present invention provides for matching of data, for example, by an automatic mode, a scheduled mode and a manual mode. If the mode in scheduler setup is automatic for match, the scheduler invokes the match process automatically for the fund manager and transactions or holdings service type combination. If the mode in scheduler setup is scheduled for match, the scheduler invokes the match process at the scheduled times for the fund manager and transactions or holdings service type combination. If the mode in scheduler setup is manual for match, the match process has to be manually invoked for the fund manager and transactions or holdings service type combination by clicking Now.

The Archival process of the application for an embodiment of the present invention, provides archival, for example, through the automatic mode. The scheduler setup for each fund manager and one service must be set up for this. The archival process is then invoked by the scheduler for each fund manager for all services that involve reconciliation, such as transactions and holdings. Once imported, the number of days after which the records for a fund manager are archived depends on the value set for retain period in database for the fund manager in fund manager maintenance. If this value is set, for example, to 25, a record imported on 1 Jan. 2000 will be archived on 26 Jan. 2000. For manual archival, through the Match Results Summary screen (Main Menu→View→Match Results→Current Data), the user can select one or more records and click Archive. This will archive the records that form the summary record(s) selected. Through the Match Results Summary screen (Main Menu→View→Match Results→Archive Data), the user can select one or more records and click Unarchive. This unarchives the records that form the summary record(s) selected.

A Match Results aspect of an embodiment of the present invention provides procedure to view match results and perform various actions on the sets of data. The Match Results aspect involves, for example, functionality for Matched Summary Display, Matched Details Display, and Unmatched Details Display. FIG. 55 is a sample Matched Results Summary screen for an embodiment of the present invention. To invoke the Matched Summary Display option from the View menu, the user clicks Match Results→Current Data or Archive Data. The Matched Results Summary screen 636 displays the matched summary of holdings or transactions for a particular fund manager, client, and value date combination. As a pre-requisite, matching activity should process the records (holdings or transactions) at least once, i.e., records should have the value of their RecordStatus field set to "P" (Processed).

Referring to FIG. 55, on selecting the Matched Summary Display option from the menu, the Matched Results Summary Screen 636 is displayed. The user selects a date range for viewing the matched results summary. Below it a Fund Manager dropdown listbox 638 is displayed. A second dropdown listbox 640 showing a list of available Services is displayed next to the Fund Manager list box 638. If the user is parent fund manager, the Fund Manager listbox 638 is populated with a list of all fund managers under the parent fund manager. However, if the user belongs to a child fund manager, then the Fund Manager listbox 638 is disabled and the fund manager Id of the user is displayed. Valid actions on this screen include, for example, Delete 642, Lock 644, Unlock 646, Match 648, Unmatch 650, Approve 652, Unapprove 654, Archive 656, Unarchive 658, Print 660, Sort, and Exit. When the menu option chosen is Current Data, all the above actions except Unarchive 658 are available. When the menu option chosen is Archive 656, the actions available are Unarchive 658, Print 660, Sort, and Exit.

Referring further to FIG. 55, the Delete action 642 permits the user to delete selected record(s) from the matched results summary grid. The user selects a record by clicking on the first fixed column to the left of the grid. This highlights the entire summary record. On clicking the Delete button 642 a dialog box with check boxes is displayed. The user checks on either a Fund Manager and/or a Custodian check box. On clicking an OK button, the corresponding records are deleted. If the Fund Manager check box is selected then the fund manager's records are deleted. If the Custodian check box is selected, then the custodian records are selected. If both Fund Manager and Custodian check boxes are selected then the corresponding records for both the fund manager and the custodian are deleted.

Referring again to FIG. 55, the Lock action 644 permits the user to lock selected record(s) from the matched results summary grid. The user selects a record by clicking on the first fixed column to the left of the grid. This highlights the entire summary record. To select multiple records, the user holds the mouse key down on the first fixed column to the left of the grid and drags it vertically. As the user scrolls down, the corresponding summary records are highlighted. On clicking the Lock button 644, all the underlying records, both for the fund manager and the custodian, are locked. Once locked, no further changes are permitted, unless the record(s) are unlocked. However, the Delete action 642 is permitted on locked records. The Unlock action 646 permits the user to unlock selected record(s) from the matched results summary grid. The user selects a record by clicking on the first fixed column to the left of the grid. This highlights the entire summary record. To select multiple records, the user holds the mouse key down on the first fixed column to the left of the grid and drags it vertically. As the user scrolls down, the corresponding summary records are highlighted. On clicking the Unlock button 646, all the underlying records, both for the fund manager and the custodian, are unlocked.

Referring again to FIG. 55, the Manual Match action 648 permits the user to execute a forced match on selected summary record(s). The user selects a record by clicking on the first fixed column to the left of the grid. To select multiple records, the user holds the mouse key down on the first fixed column to the left of the grid and drags it vertically. As the user scrolls down, the corresponding summary records are highlighted. On clicking the Match button 648, all the underlying records, both for the fund manager and the custodian, are marked as matched. The Manual Unmatch action 646 permits the user to execute a forced unmatch on selected summary record(s). The user selects a record by clicking on the first fixed column to the left of the grid. To select multiple records, the user holds the mouse key down on the first fixed column to the left of the grid and drags it vertically. As the user scrolls down, the corresponding summary records are highlighted. On clicking the Unmatch button 650, all the underlying records, both for the fund manager and the custodian, are marked as unmatched.

Referring once again to FIG. 55, the Manual Approve 652 action permits the user to approve selected summary record(s). The user selects a record by clicking on the first fixed column to the left of the grid. To select multiple records, the user holds the mouse key down on the first fixed column to the left of the grid and drags it vertically. As the user scrolls down, the corresponding summary records will be highlighted. On clicking the Approve button 652, all the underlying records, both for the fund manager and the custodian, are marked as approved. Once approved, no further changes are permitted unless the record(s) are unapproved. The Manual Unapprove action 654 permits the user to unapprove selected summary record(s). The user selects a record by clicking on the first fixed column to the left of the grid. To select multiple records, the user holds the mouse key down on the first fixed column to the left of the grid and drags it vertically. As the user scrolls down, the corresponding summary records are highlighted. On clicking the Unapprove button 654, all the underlying records, both for the fund manager and the custodian, are marked as unapproved.

Referring once more to FIG. 55, the Manual Archive action 656 permits the user to archive selected summary record(s). Archived records are removed from the live or current tables and copied on to the corresponding archive tables. The user selects a record by clicking on the first fixed column to the left of the grid. To select multiple records, the user holds the mouse key down on the first fixed column to the left of the grid and drags it vertically. As the user scrolls down, the corresponding summary records are highlighted. On clicking the Archive button 656, all the underlying records, both for the fund manager and the custodian, are removed from the live or current tables and copied to the corresponding archive tables. The Manual Unarchive action 658 permits the user to unarchive previously archived record(s). This option is enabled only when the data is retrieved from the archived database. The user selects a record by clicking on the first fixed column to the left of the grid. To select multiple records, the user holds the mouse key down on the first fixed column to the left of the grid and drags it vertically. As the user scrolls down, the corresponding summary records are highlighted. On clicking the Unarchive button 658, all the underlying records, both for the fund manager and the custodian, are removed from the archive tables and copied to the corresponding live or current tables. The View Details action permits the user to display the values of all the fields in the original record.

Referring again to FIG. 55, the Print action 660 permits the user to print selected records from the grid. The user selects a record by clicking on the first fixed column to the left of the grid (on the gray area). To select multiple records, the user holds the mouse key down on the first fixed column to the left of the grid and drags it vertically. As the user scrolls down, the corresponding summary records will be highlighted. On clicking the Print button 660, the selected records are printed to the default printer. The Exit action permits the user to exit from the Matched Display Summary screen 636.

FIGS. 56 and 57 are sample Matched Details Display screens 662, 664 for an embodiment of the present invention. To invoke the Matched Details Display option from the View menu, the user clicks Match Results Current Data, selects a summary record, and double clicks or presses Enter. The Matched Details Display screen 662, 664 displays the matched details (holdings or transactions) for a particular fund manager, client, and value date combination. The screen is invoked from the Matched Results Summary screen 636. The user highlights and selects a summary record, and on double clicking or pressing the Enter key, all the underlying records for the summary screen 636 are displayed. As prerequisites, matched results view for the fund manager should be set up and matching activity should process the records (holdings or transactions) at least once, i.e., the records should have the value of their RecordStatus field set to "P" (Processed), Referring to FIGS. 56 and 57, on selecting a summary record, the detailed matched results for the fund manager-service combination for the date range selected in the summary screen is displayed. Valid actions on this screen include, for example, Comments 666, Unmatch 668, View Details 670, Print 672, and Exit 676. All automatically matched records have a pre-defined matched comment attached to them. The Comments action 666 permits users to manually add or edit the contents of this matched comment. In case of manually matched records, the matched comments field is blank. The user can also enter a matched comment for all such manually matched records. As soon as the matched comment is saved, all records with the same matched reference number are tagged with the same matched comment.

Referring to FIGS. 56 and 57, on performing the Unmatch action 668, records previously matched, automatically, or manually are marked as unmatched. All such unmatched records are taken up for matching when the matching process is subsequently executed. In order to unmatch a set of matched records it is mandatory to select all records with the same match reference number. Locked and/or approved records are not available for manual unmatch. The View Details action 670 permits the user to display a dump of the values of the fields in the original record. Changes to the original record are not permitted on this screen. The Print action 672 permits the user to print selected records from the grid. The Exit action 676 permits the user to exit from the Matched Results Details display screen 662, 664.

FIGS. 58 and 59 are sample Unmatched Details Display screens for an embodiment of the present invention. To invoke the Unmatched Details Display option from the View menu, the user clicks Match Results Current Data, selects a summary record, and double clicks or presses Enter. The Unmatched Details Display screen 678, 680 displays the unmatched details (holdings or transactions) for a particular fund manager, client, and value date combination. The screen is invoked from the Matched Results Summary screen 636. The user highlights and selects a summary record. On double clicking or pressing the Enter key, all the underlying records for the Summary screen 636 are displayed, and all unmatched records are displayed in a separate window. As pre-requisites, matched results view for the fund manager should be setup, unmatched results view for the fund manager and the custodian bank should be setup, and matching activity should process the records (holdings or transactions) at least once, i.e., records should have the value of their RecordStatus field set to "P" (Processed).

Referring to FIGS. 58 and 59, on selecting a summary record, two screens are displayed; namely the Detailed Matched results 662, 664 for the fund manager-service combination for the date range, and the Detailed Unmatched fund manager and custodian screen 678, 680. Valid actions on this screen include, for example, Match 682, CB Comments 684, FM Comments 686, View Details 688, Print 690, Help 692, and Exit 694. The Match option 682 is used to manually match all unmatched records that have failed to match during the automatic matching process. On performing this action the selected record(s) is marked as "matched". In order to match a set of unmatched records, it is mandatory to select records from both the fund manager's side and the custodian's side. Locked and/or approved records are not available for manual match.

Referring further to FIGS. 58 and 59, the CB Comments option 684 is used to attach manual comments to unmatched custodian bank record(s). In order to attach a comment to the custodian bank record(s), the user selects a custodian record and clicks on the CB Comments button 684. The user enters the comments in the Comments dialog box and clicks on the OK button to save the comments to the custodian record. The FM Comments option 686 is used to attach manual comments to unmatched fund manager record(s). In order to attach a comment to the fund manager record(s), the user selects a fund manager record and clicks on the FM Comments button 686. The user enters the comments in the Comments dialog box and clicks on the OK button to save the comments to the fund manager record.

Referring again to FIGS. 58 and 59, the View Details action 688 permits the user to display a dump of the values of the fields in the original record. Changes to the original record are not permitted on this screen. The Print action 690 permits the user to print selected records from the grid. On pressing the Help button 692, a help screen is displayed with a brief note on the unmatched fund manager details grid, unmatched custodian bank details, and the actions performed by the various action buttons. The Exit action 694 permits the user to exit from the Matched Results Details display screen 678, 680.

Figure 60:
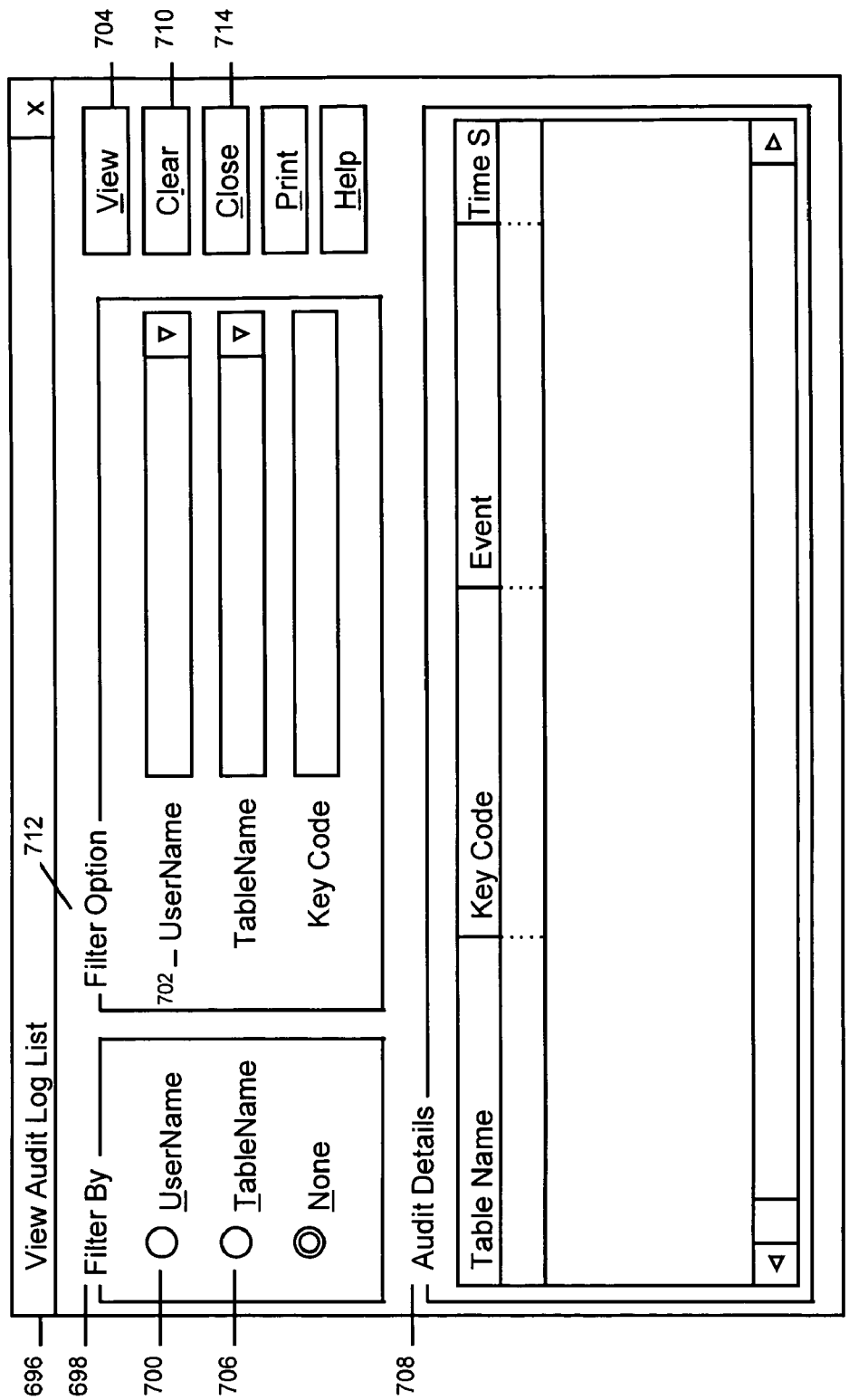

A Query aspect of an embodiment of the present invention involves, for example, Audit Log Query and Activity Log Query functionality. FIG. 60 is a sample Audit Log Query screen 696 for an embodiment of the present invention. To invoke the audit log query option from the Query menu, the user clicks Audit Log. An audit log is maintained by the system application for each change made to the master data. That is, details of any data added, deleted or modified is logged. The Audit Log Query allows the user to query the log based on options, such as user name, table name and all. The Audit Log Query screen 696 is invoked from the Audit Log sub-menu of the Query menu on the application. When the screen opens, an All option is shown selected and all the records are displayed. The user can now decide to select any one of the other Filter By options 698.

Referring to FIG. 60, selecting the Filter By User Name 700 enables the user name filter clause. The other filter clauses remain disabled. The user can then select the user name from the User Name dropdown listbox 702 for whom he or she wants to query the audit log. Clicking the View button 704 displays the output. Selecting the Filter By Table Name option 706 enables the table name and the key code filter clauses. The user name clause is rendered disabled. The user can then select the table name from the drop-down for which he or she wants to query the audit log. The user can also type in part or the whole of the key code for the table selected to constrict the search criteria for the query. Clicking the View button 704 displays the output. Clicking on a Filter By All option disables all the filter options and populates the Audit Details display 708 with all the records. The Clear button 710 enables the user to select a new Filter By option 698. Clicking the Clear button 710 clears the Audit Details display 708, deselects any prior Filter By options 698, disables the Filter option clauses 712 and waits for the user to select a Filter By option 698. The user can now select any of the Filter By options 698 and view the details. To exit from the screen, clicking the Close button 714 closes the screen.

FIG. 61 is a sample Activity Log Query screen for an embodiment of the present invention. To invoke the Activity Log Query option from the Query menu, the user clicks Activity Log. An activity log is maintained by the system application for each change made to the master data. That is, details of any activities done on the records in the database. The Activity Log Query allows the user to query the log depending on the date range, the fund manager Id and the type of activity. The Activity Log Query screen 716 is invoked from the Activity Log sub-menu of the Query menu on the application. To select a date (either Period From 718 or Period To 720), the user clicks on the arrow in the dropdown listbox 722, 724 and a calendar is shown. The user chooses the desired month and/or year, as well as a date, because unless a date is selected, the calendar does not close. The date in the Period From box 722 must not be later than the date in the Period To box 724.

Referring to FIG. 61. if the user belongs to a fund manager, the Id for the particular fund manager is displayed in the Fund Manager Id box 726. If the user is a system administrator or user, he or she can select one from the list of available fund managers displayed in the drop-down list box 726. Clicking on the Activity Types dropdown listbox 728 displays all the activity types that are entered for the various operations carried out on the database. Among all the options is an All clause which refers to all the activities. After selecting the criteria for display, clicking the View button 730 displays the details based on the criteria selected. Other functionalities include, for example, print and sort functionalities. Clicking the Print button 732 prints the entire contents of the grid in a landscape mode. Clicking on any column heading for the grid sorts the contents of the grid on that column. To exit from the screen, clicking the Close button 734 closes the screen.

Figure 62:
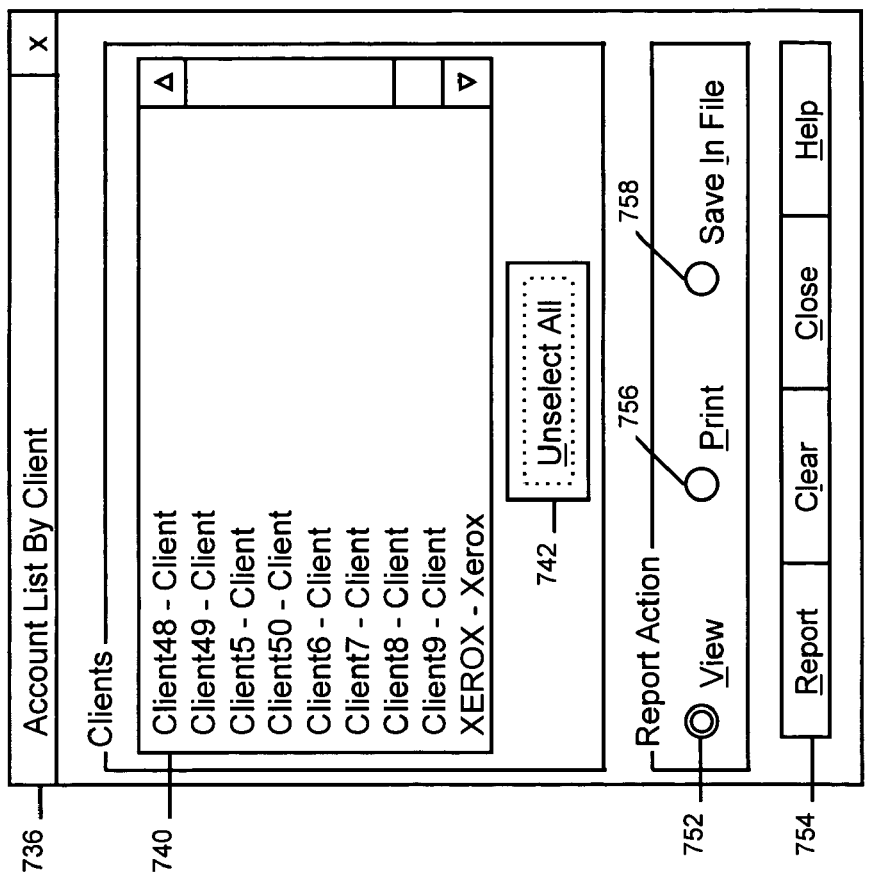

A Reports aspect of an embodiment of the present invention includes functionality for reports, such as Account List by Client, Activity Log, Audit Log, Error Log, Percentage Matched by Custodian and Client, Matched Holdings by Client, Matched Transactions by Client, Unmatched Holdings by Client, and Unmatched Transactions by Client. FIGS. 62 and 63 are sample Accounts List by Client screens for an embodiment of the present invention. To invoke the Accounts List by Client option from the Reports menu, the user clicks Account List By Client. This option allows the user to report a list of accounts in order of client Ids. The Accounts List By Client screen 736, 738 displays a list of accounts for each client specific to the user's fund manager Id. The user may choose one or more of these client Ids.

Referring to FIGS. 62 and 63, the Accounts List by Client screen 736, 738 lists available client Ids specific to the user's fund manager Id. To select one or more client Ids, the user clicks on the client Ids in the listbox 740. To select all the client Ids, the user presses a Select All button. To unselect the client Ids, the user clicks the Unselect All button 742 that appears in the place of the Select All button. For each client Id and name, the report displays the Primary Account Id 744, Account Type Id 746, Account Name 748, Custodian Id 750, Custodian Name, BIC and Base Currency Sorted by Account. The user may save to a file, view or print the report.

Referring to FIGS. 62 and 63, to view the report, the user selects at least one client Id, selects the View option 752, and clicks the Report button 754. The report shows records if they exist; otherwise a message stating that records for the specified parameters were not found is displayed. To print the report, the user selects at least one client Id, selects the Print option 756, and clicks the Report button 754. The report shows records if they exist; otherwise a message stating that records for the specified parameters were not found is displayed. To save the report, the user selects at least one client Id, selects the Save option 758, and clicks the Report button 754. The report saves records in they exist; otherwise a message stating that records for the specified parameters were not found is displayed. The user is prompted while trying to write over existing files.

Figure 64:
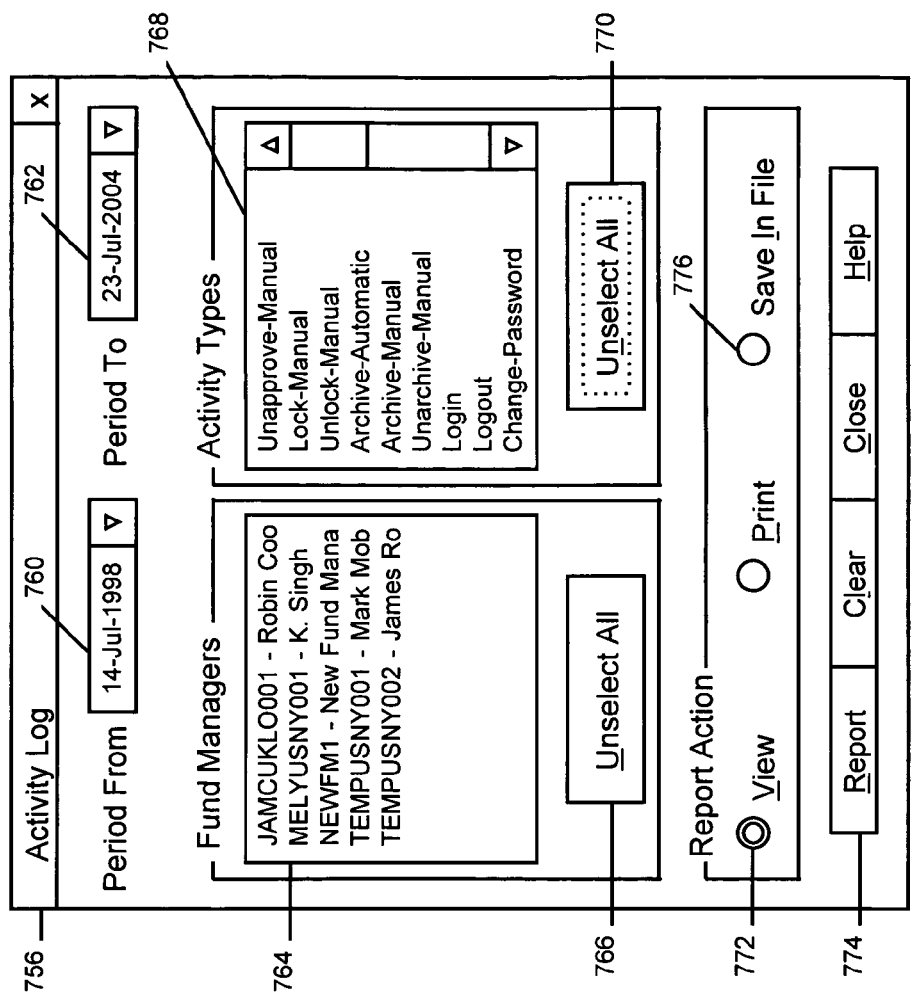
Figure 65:
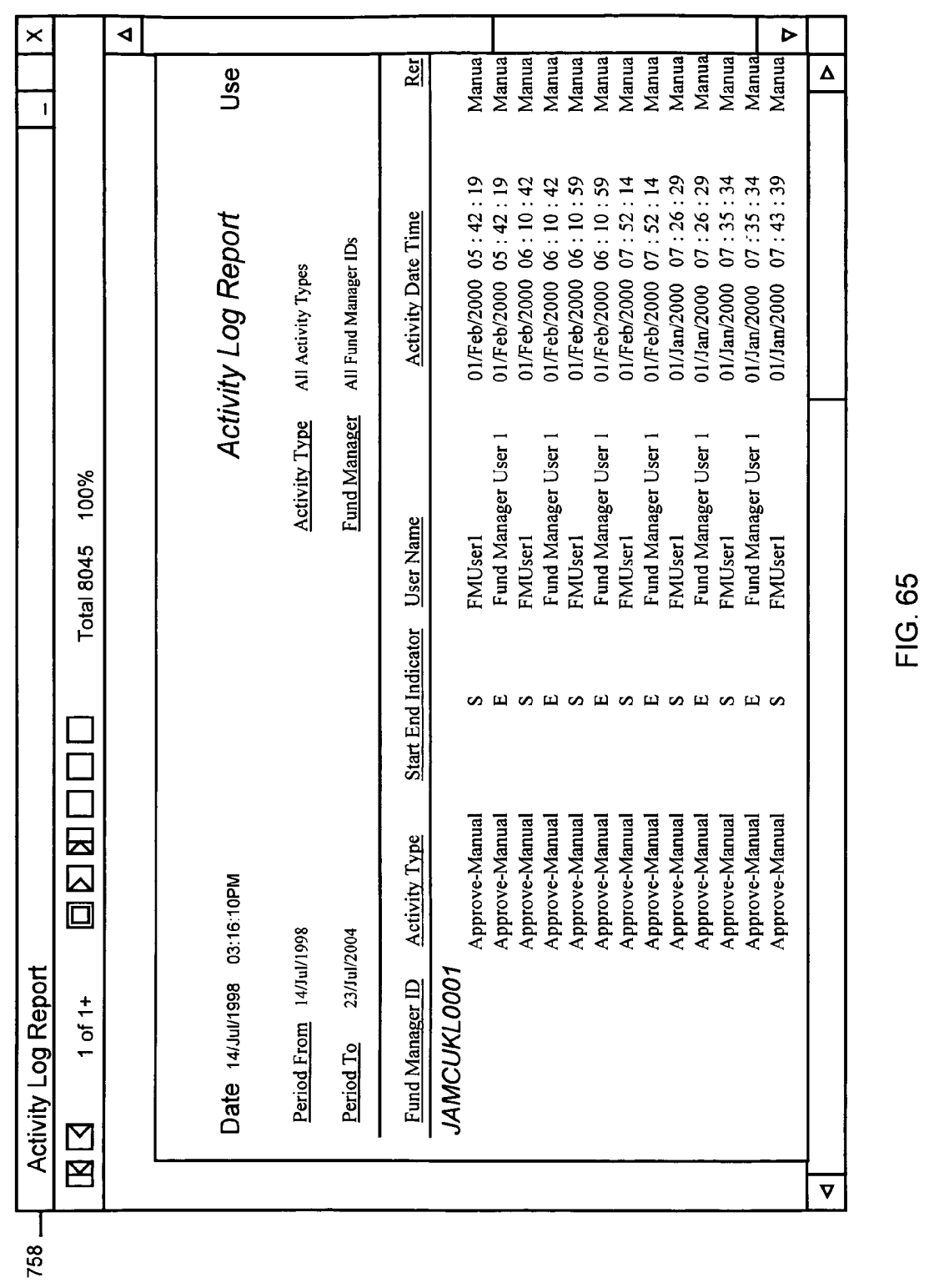

To invoke the Activity Log Report option from the Reports menu, the user clicks Activity Log. FIGS. 64 and 65 are sample Activity Log Report screens for an embodiment of the present invention. This option allows the user to report various activity logs for one or more activity type Ids and fund manager Ids for a specified date range. An activity log is maintained by the system application to track the initiation and completion and in-process status for a number of activities, such as import-automatic, import-manual, match-automatic, match-manual, unmatch-manual, delete-manual, approve-manual, unapprove-manual, lock-manual, unlock-manual, archive-automatic, archive-manual, and unarchive-manual. To select a date (either Period From 760 or Period To 762) the user clicks on an arrow in the dropdown box and a calendar is shown. The user chooses the desired month and/or year, as well as a date, because unless a date is selected, the desired date is not shown in the dropdown box. The date in the Period From box 760 must not be later than the date in the Period To box 762.

Referring to FIGS. 64 and 65, the Activity Log Report screen 756, 758 lists available fund manager Ids and their names. To select one or more fund manager Ids, the user clicks on the fund manager Ids in the list box 764. To select all of the fund manager Ids, the user presses a Select All button. To unselect the fund manager Ids, the user clicks the Unselect All button 766 that appears in the place of the Select All button. The Activity Log Report screen 756, 758 also lists all available activity types. To select one or more activity types, the user clicks on the Activity Types in the list box 768. To select all the activity types, the user presses a Select All button. To unselect the activity types, the user clicks the Unselect All button 770 that appears in the place of the Select All button. The user can save to a file, view or print the report. The report displays the list of activity logs grouped by fund manager Ids and sorted by activity type Id and activity date and time.

Referring further to FIGS. 756, 758, to view the report, the user selects at least one activity type and fund manager Id, selects the View option 772, and clicks the Report button 774. The report shows records if they exist; otherwise a message stating that records for the specified parameters were not found is displayed. To print the report, the user selects at least one activity type and fund manager Id, selects the print option, and clicks the Report button 774. The report shows records if they exist; otherwise a message stating that records for the specified parameters were not found is displayed. To save the report, the user selects at least one activity type and fund manager Id, selects the Save option 776, and clicks the Report button 774. The report saves records if they exist;

otherwise a message stating that records for the specified parameters were not found is displayed. The user is prompted while trying to write over existing files.

Figure 66:
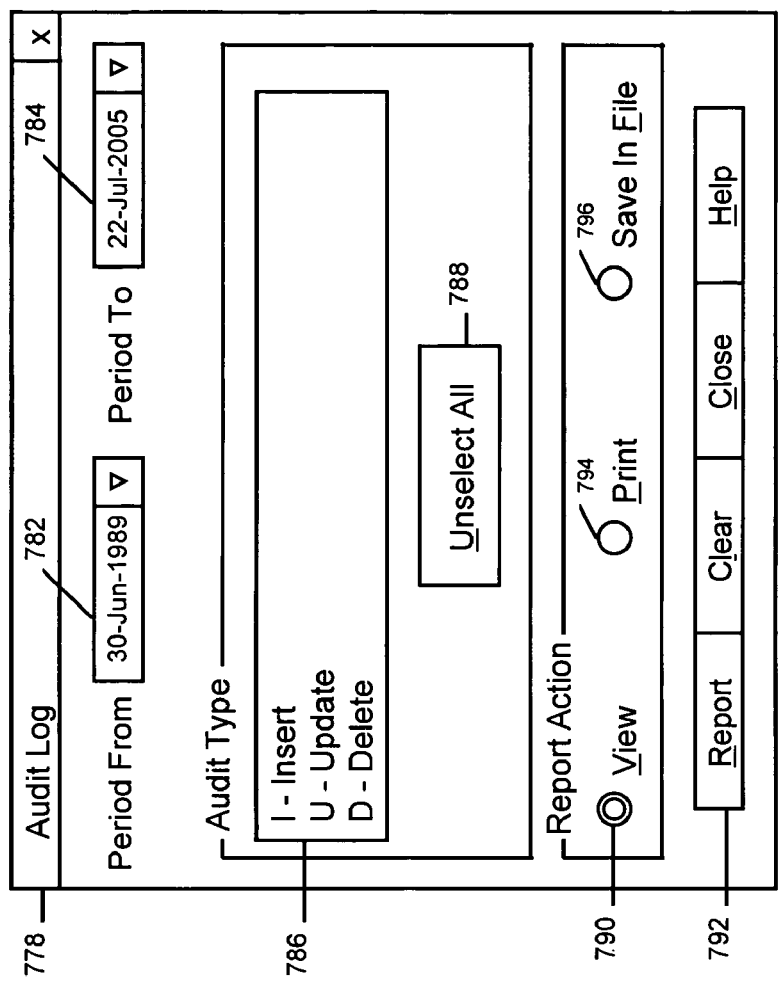

FIGS. 66 and 67 are sample Audit Log Report screens for an embodiment of the present invention. To invoke the Audit Log Report option from Reports menu, the user clicks Audit Log. This option allows the user report audit logs for a specified date range and one or more specified audit types. An audit log is maintained by the system application for each change made to the master data. That is, any data added, deleted or modified is logged. To specify a date range, the user selects a date (either Period From 782 or Period To 784) and clicks on the arrow in the drop down box 782, 784. A calendar is shown, and the user chooses the desired month and/or year, as well as a date, because unless a date is selected, the desired date is not shown in the drop down box. The date in the Period From box 782 must not be later than the date in the Period To box 784. The Audit Log Report screen 778, 780 lists all available audit types. To select one or more audit types, the user clicks on the Audit Types in the listbox 786. To select all the audit types, the user presses a Select All button. To unselect the audit types, the user clicks the Unselect All button 788 that appears in the place of the Select All button. The user may save to a file, view, or print the report. The report displays the list of audit logs sorted by audit date and time.

Referring to FIGS. 778 and 780, to view the report, the user selects a date range, selects at least one audit type, selects the View option 790, and clicks the Report button 792. The report shows records if they exist; otherwise a message stating that records for the specified parameters were not found is displayed. To print the report, the user selects a date range, selects at least one audit type, selects the Print option 794, and clicks the Report button 792. The report shows records if they exist; otherwise a message stating that records for the specified parameters were not found is displayed. To save the report, the user selects a date range, selects at least one audit type, selects the Save option 796, and clicks the Report button 792. The report saves records if they exist; otherwise a message stating that records for the specified parameters were not found is displayed. The user is prompted while trying to write over existing files.

Figure 68:
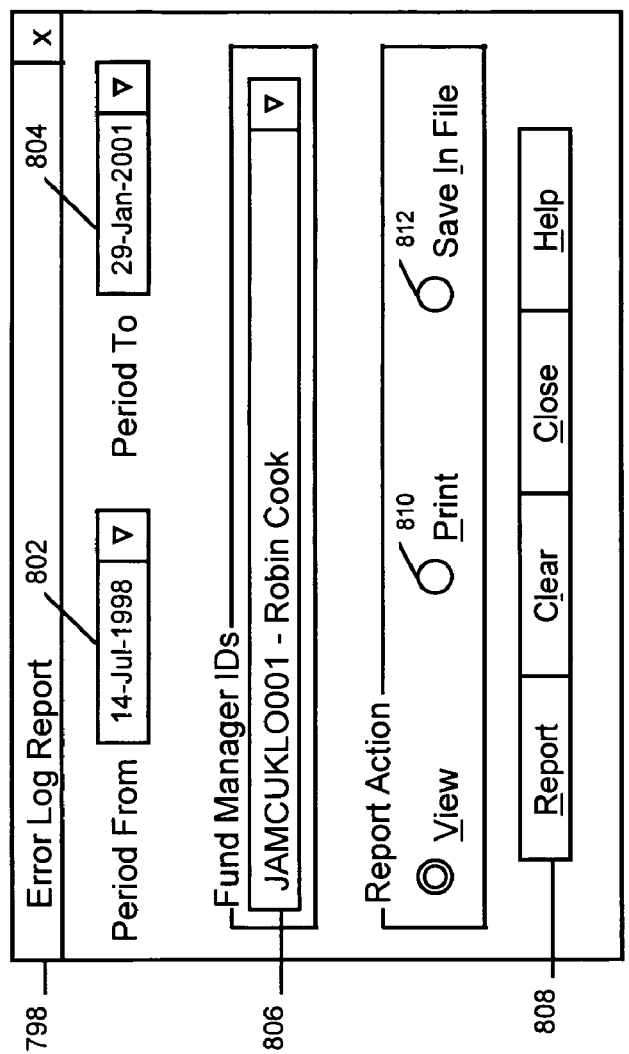

FIGS. 68 and 69 are sample Error Log Report screens for an embodiment of the present invention. The Error Log Report option allows the user to report errors that are logged by the system application for a specified fund manager and date range. The errors are logged by the application whenever errors are encountered during any of the processes, such as reconciliation, import of data, archival and the like. To specify a date range, the user selects a date (either Period From 802 or Period To 804) and clicks on the arrow in the dropdown box 802, 804. A calendar is shown, and the user chooses the desired month and/or year, as well as a date, because unless a date is selected, the desired date is not shown in the drop down box. The date in the Period From box 802 must not be later than the date in the Period To box 894. The Error Log Report screen 798, 800, retrieves a list of fund manager Ids. The user may choose only one of these fund manager Ids by clicking the arrow in the drop down box enclosed in the frame named Fund Manager Ids 806. The user may save to a file, view, or print the report. For the specified fund manager and date range, the report displays the error date, error severity, user Id and error description, sorted by error date and time.

Referring to FIGS. 68 and 69, to view the report, the user specifies a date range, selects at least one fund manager Id, selects the View option, and clicks the Report button 808. The report shows records if they exist; otherwise a message stating that records for the specified parameters were not found is displayed. To print the report, the user specifies a date range, selects at least one fund manager Id, selects the Print option 810, and clicks the Report button 808. The report shows records if they exist; otherwise a message stating that records for the specified parameters were not found is displayed. To save the report, the user specifies a date range, selects at least one fund manager Id, selects the Save option 812, and clicks the Report button 808. The report saves records if they exist; otherwise a message stating that records for the specified parameters were not found is displayed. The user is prompted while trying to write over existing files.

Figure 70:
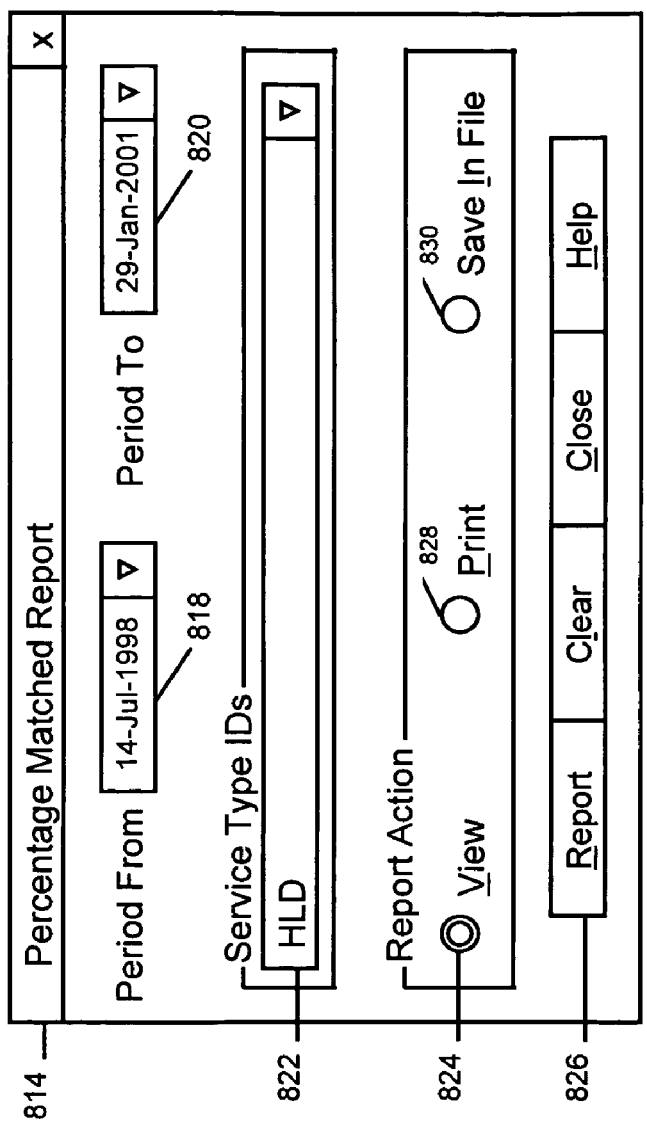

To invoke the Percentage Matched by Custodian and Client option from the Reports menu, the user clicks Percentage Matched By Custodian and Client. FIGS. 70 and 71 are sample Percentage Matched by Custodian and Client Report screens for an embodiment of the present invention. This option allows the user to report the percentage of matched records vis-à-vis the total number of records for fund manager as well as custodian bank for a specified service type, such as transactions or holdings and for a specified date range. To specify date range, the user selects a date (either Period From 818 or Period To 820) and clicks on the arrow in the dropdown box 818, 829. A calendar is shown, and the user chooses the desired month and/or year, as well as a date, because unless a date is selected, the desired date is not shown in the drop down box. The date in the Period From box 818 must not be later than the date in the Period To box 820. To select a service type, the Percentage Matched By Custodian and Client screen 70, 71 retrieves a list of service type Ids. The user may choose only one of these service type Ids by clicking the arrow in the drop down box enclosed in the frame named Service Type Ids 822. The user may save to a file, view, or print the report. The report displays a list that is sorted by client within custodian bank. For each custodian and client, the report shows the total number of records for fund manager, the percentage matched records for fund manager, the total number of records for custodian bank, and the percentage matched records for custodian bank. The fund manager average and custodian bank average of percentage matched records is shown for each custodian bank.

Referring to FIGS. 70 and 71, to view the report, the user specifies a date range, selects a service type Id, selects the View option 824, and clicks the Report button 826. The report shows records if they exist on the screen; otherwise a message stating that records for the specified parameters were not found is displayed. To print the report, the user specifies date range, selects a service type Id, selects the Print option 828, and clicks the Report button 826. The report shows records if they exist; otherwise a message stating that records for the specified parameters were not found is displayed. To save the report, the user specifies a date range, selects a service type Id, selects the Save option 830, and clicks the Report button 826. The report saves records if they exist; otherwise a message stating that records for the specified parameters were not found is displayed. The user is prompted while trying to write over existing files.

Figure 72:
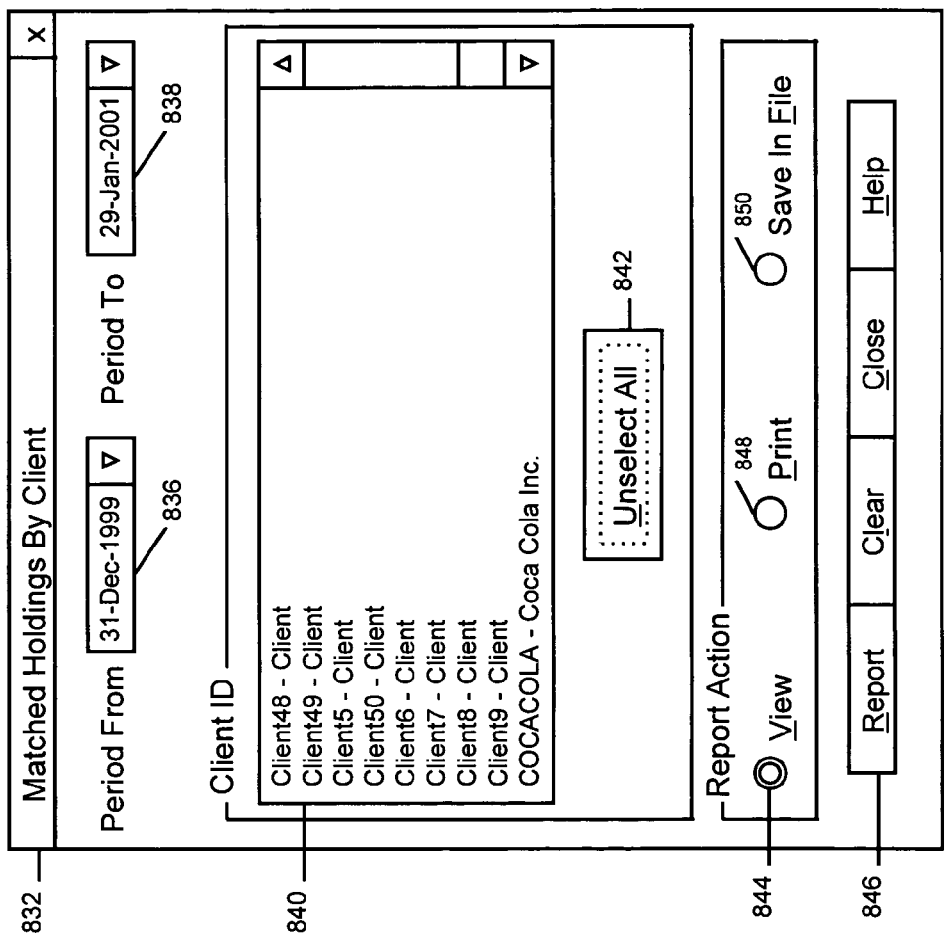

To invoke the Matched Holdings by Client Report option from the Reports menu, the user clicks Matched Holdings By Client. FIGS. 72 and 73 are sample Matched Holdings by Client Report screens for an embodiment of the present invention. This option allows you to report matched holdings for one or more client IDs for a specified date range. To specify a date range, the user selects a date (either Period From 836 or Period To 838) and clicks on the arrow in the dropdown box 836, 838. A calendar is shown, and the user chooses the desired month and/or year, as well as a date, because unless a date is selected, the desired date is not shown in the drop down box. The date in the Period From box 836 must not be later than the date in the Period To box 838. The Matched Holdings by Client Report screen 832, 834 lists available client Ids and their names. To select one or more client Ids, the user clicks on the Client Ids in the listbox 840. To select all of the client Ids, the user presses a Select All button. To unselect the client Ids, the user clicks the Unselect All button 842 that appears in the place of the Select All button. The user may save to a file, view, or print the report. The report displays the list of matched holdings grouped by client Ids and sorted by value date, account Id and security Id. The records belonging to custodian banks are shown in gray background.

Referring to FIGS. 72 and 73, to view the report, the user selects at least one client Id, selects the View option 844, and clicks the Report button 846. The report shows records if they exist; otherwise a message stating that records for the specified parameters were not found is displayed. To print the report, the user selects at least one client Id, selects the Print option 848, and clicks the Report button 846. The report shows records if they exist; otherwise a message stating that records for the specified parameters were not found is displayed. To save the report, the user selects at least one client Id, selects the Save option 850, and clicks the Report button 846. The report saves records if they exist; otherwise a message stating that records for the specified parameters were not found is displayed. The user is prompted while trying to write over existing files.

Figure 74:
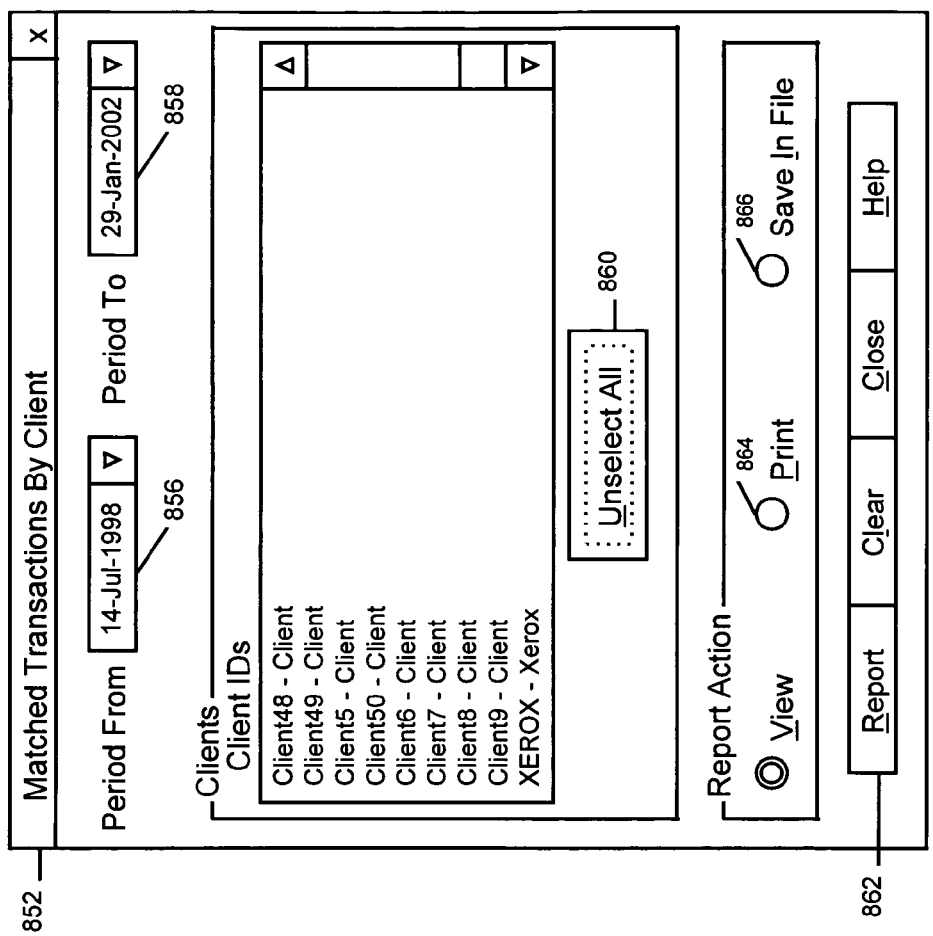

To invoke the Matched Transactions by Client Report option from the Reports menu, the user clicks Matched Transactions By Client. FIGS. 74 and 75 are sample Matched Transactions by Client Report screens for an embodiment of the present invention. This option allows the user to report matched transactions for one or more client Ids for a specified date range. To specify a date range, the user selects a date (either Period From 856 or Period To 858) and clicks on the arrow in the dropdown box 856, 858. A calendar is shown, and the user chooses the desired month and/or year, as well as a date, because unless a date is selected, the desired date is not shown in the drop down box. The date in the Period From box 856 must not be later than the date in the Period To box 858. The screen lists available client Ids and their names. To select one or more client Ids, the user clicks on the client Ids in the list box. To select all of the client Ids, the user presses a Select All button. To unselect the client Ids, the user clicks the Unselect All button 860 that appears in the place of the Select All button. The user may save to a file, view, or print the report. The report displays the list of matched transactions grouped by client Ids and sorted by statement date, transaction reference, primary account Id and primary security Id. The records belonging to custodian banks are shown in gray background.

Referring to FIGS. 74 and 75, to view the report, the user selects at least one client Id, selects the view option, and clicks the Report button 862. The report shows records if they exist; otherwise a message stating that records for the specified parameters were not found is displayed. To print the report, the user selects at least one client Id, selects the Print option 864, and clicks the Report button 862. The report shows records if they exist; otherwise a message stating that records for the specified parameters were not found is displayed. To save the report, the user selects at least one client Id, selects the Save option 866, and clicks the Report button 862. The report saves records if they exist; otherwise a message stating that records for the specified parameters were not found is displayed. The user is prompted while trying to write over existing files.

To invoke the Unmatched Holdings by Client Report option from the Reports menu, the user clicks Unmatched Holdings by Client. FIGS. 76 and 77 are sample Unmatched Holdings by Client Report screens for an embodiment of the present invention. This option allows the user to report unmatched holdings for one or more client Ids for a specified date range. To specify a date range, the user selects a date (either Period From 872 or Period To 874) and clicks on the arrow in the dropdown box 872, 874. A calendar is shown, and the user chooses the desired month and/or year, as well as a date, because unless a date is selected, the desired date is not shown in the dropdown box. The date in the Period From box 872 must not be later than the date in the Period To box 874. The screen lists available client Ids and their names. To select one or more client Ids, the user clicks on the client Ids in the list box. To select all of the client Ids, the user presses a Select All button. To unselect the client Ids, the user clicks the Unselect All button 876 that appears in the place of the Select All button. The user may save to a file, view, or print the report. The report displays the list of unmatched holdings grouped by client Ids and sorted by value date, account Id, and security Id. The user can specify for whom the report is to be generated, such as a fund manager, a custodian bank, or both. The records belonging to custodian banks are shown in gray background if the report is generated for both.

Referring to FIGS. 76 and 77, to view the report, the user selects at least one client Id, selects the View option 878, and clicks the Report button 880. The report shows records if they exist; otherwise a message stating that records for the specified parameters were not found is displayed. To print the report, the user selects at least one client Id, selects the Print option 882, and clicks the Report button 880. The report shows records if they exist; otherwise a message stating that records for the specified parameters were not found is displayed. To save the report, the user selects at least one client Id, selects the Save option 884, and clicks the Report button 880. The report saves records if they exist; otherwise a message stating that records for the specified parameters were not found is displayed. The user is prompted while trying to write over existing files.

To invoke the Unmatched Transactions by Client Report option from the Reports menu, the user clicks Unmatched Transactions by Client. FIGS. 78 and 79 are sample Unmatched Transactions by Client Report screens for an embodiment of the present invention. This option allows the user to report unmatched transactions for one or more client Ids for a specified date range. To specify a date range, the user selects a date (either Period From 900 or Period To 902) and clicks on the arrow in the dropdown box 900, 902. A calendar is shown, and the user chooses the desired month and/or year, as well as a date, because unless a date is selected, the desired date is not shown in the dropdown box. The date in the Period From box 900 must not be later than the date in the Period To box 902. The screen lists available client Ids and their names. To select one or more client Ids, the user clicks on the client Ids in the list box. To select all the client Ids, the user presses a Select All button. To unselect the client Ids, the user clicks the Unselect All button 904 that appears in the place of the Select All button. The user may save to a file, view, or print the report. The report displays the list of unmatched transactions grouped by client Ids and sorted by settlement date, transaction reference, account Id, and security Id. The user can specify for whom the report is to be generated, such as a fund manager, a custodian bank, or both. The records belonging to custodian banks are shown in gray background if the report is generated for both.

Referring to FIGS. 78 and 79, to view the report, the user selects at least one client Id and clicks the View button 906. The report shows records if they exist; otherwise a message stating that records for the specified parameters were not found is displayed. To print the report, the user selects at least one client Id, selects the Print option 908, and clicks the Report button 910. The report shows records if they exist; otherwise a message stating that records for the specified parameters were not found is displayed. To save the report, the user selects at least one client Id, selects the Save option 912, and clicks the Report button 910. The report saves records if they exist; otherwise a message stating that records for the specified parameters were not found is displayed. The user is prompted while trying to write over existing files.

System maintenance facilities for an embodiment of the present invention includes aspects, such as Data Archival, Scheduler Setup, and Backup and Purging, so as to sustain good performance. For example, the archival of transactions and holdings records of each fund manager depends on the number of days specified against Retain Period In Database in Fund Manager Profile. The number of records held in the database for transactions and holdings from fund manager and custodian depends on the value of this field. If it is, for example, 25 days, then once records for transactions and holdings are imported, they remain in the database for 25 days. In effect, data pertaining to 25 days will remain in database at any given time. This field is typically set up for only what is actually required, and after the requisite number of days, the records are automatically moved to the Archive tables. Having only the required number of records in the database help in better performance of the application, specifically the import and match processes.

With regard to Scheduler Setup for an embodiment of the present invention, the system parameter Schedule Time determines the time interval after which the scheduler initiates batch processes for import, match, import and match, and archival. This parameter is likewise typically set up as per actual requirements. If this parameter is set up to be too small, such as 5 minutes, then the system becomes overburdened with batch processes initiated every 5 minutes. Ideally, import and match processes should be set up with the scheduled mode, and these processes for different fund managers can be spaced out so as to reduce the burden on the system.

Figure 79A:
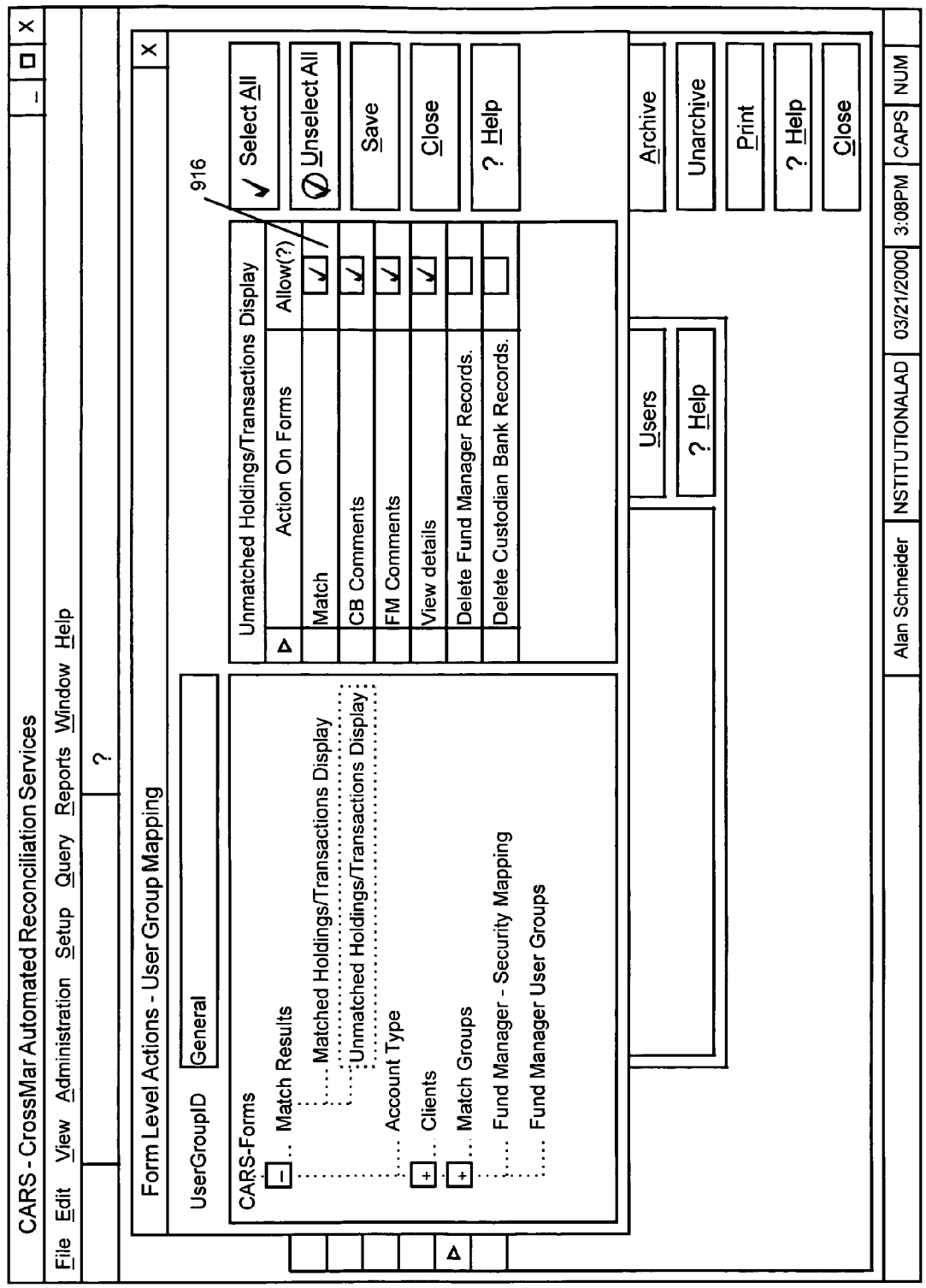
FIG. 79a is a sample Form Level Actions-User Group Mapping screen which details the ability of the embodying system to further detail access to the functions of an embodiment of the present invention at the Action level.

FIG. 79a is a sample Form Level Actions-User Group Mapping screen which details the ability of the embodying system to further detail access to the functions of an embodiment of the present invention at the Action 914 level. This allows the most specific control of the invention within the user's organization. It lets users securely and specifically define roles and responsibilities within the user base at the firm. The user grants rights to Actions with a click on a specific action check box such as Match 916.

Figure 80:
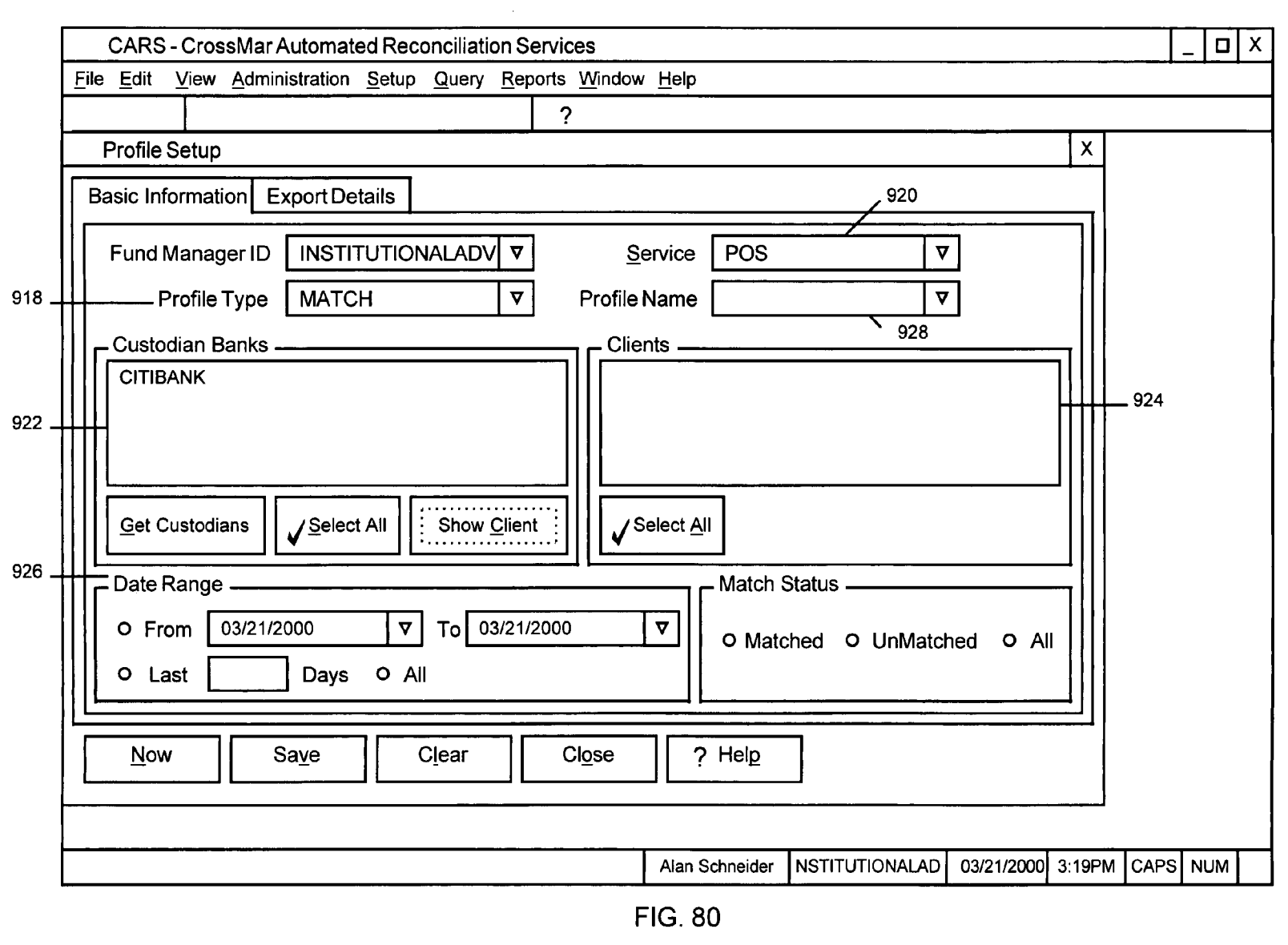

FIG. 80 is a sample Profile Setup screen for an embodiment, of the present invention. The system embodies the Profile Setup capabilities of the present invention in FIG. 80. The Profile Setup permits the user to specifically describe automated actions, Profile Type 918 (Match, Import, Export) that the user wishes executed against which Services 920 information, and for which Custodian Bank's 922 Clients 924 across an absolute or relative Date Range 926. The Profile can be stored by Profile Name 928 and reused on an ad-hoc basis or through the Systems Scheduler illustrated in FIG. 37.

Figure 80A:
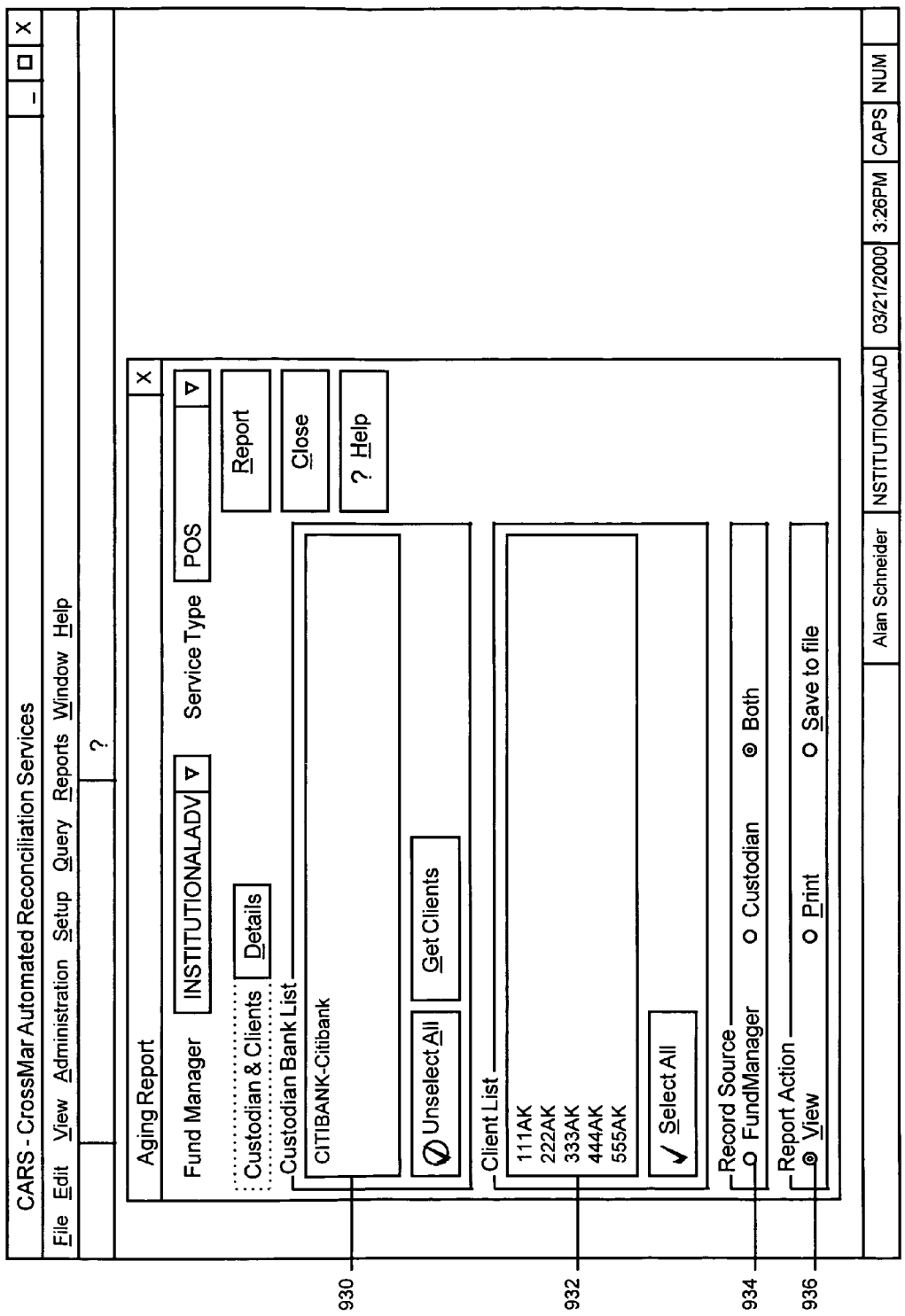
Figure 80B:
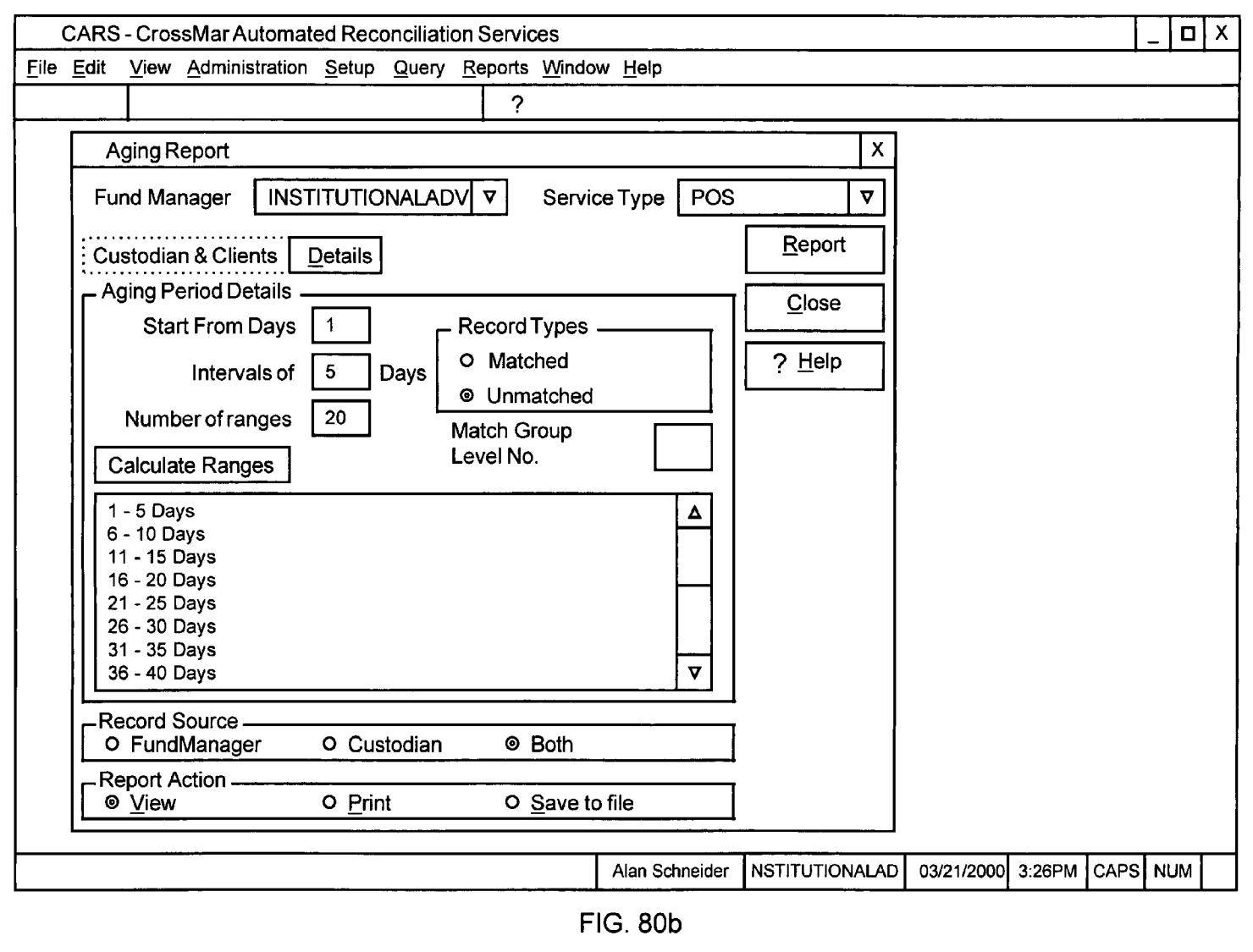

FIGS. 80a, 80b and 81 are sample Aging Report screens which represent the systems manifestation of the Aging Report for an embodiment of the present invention. FIG. 81 lets the user specify the Custodian Bank's 930 Clients 932 for whom to execute the report. Further, they can specify views of Fund Manager or Custodian Bank or Both 934 sources records to the Screen, Printer or File 936. The user can select the relative dates and ranges in which the user wishes to show the data on FIG. 80b. The resulting report is represented by FIG. 81.

Figure 82:
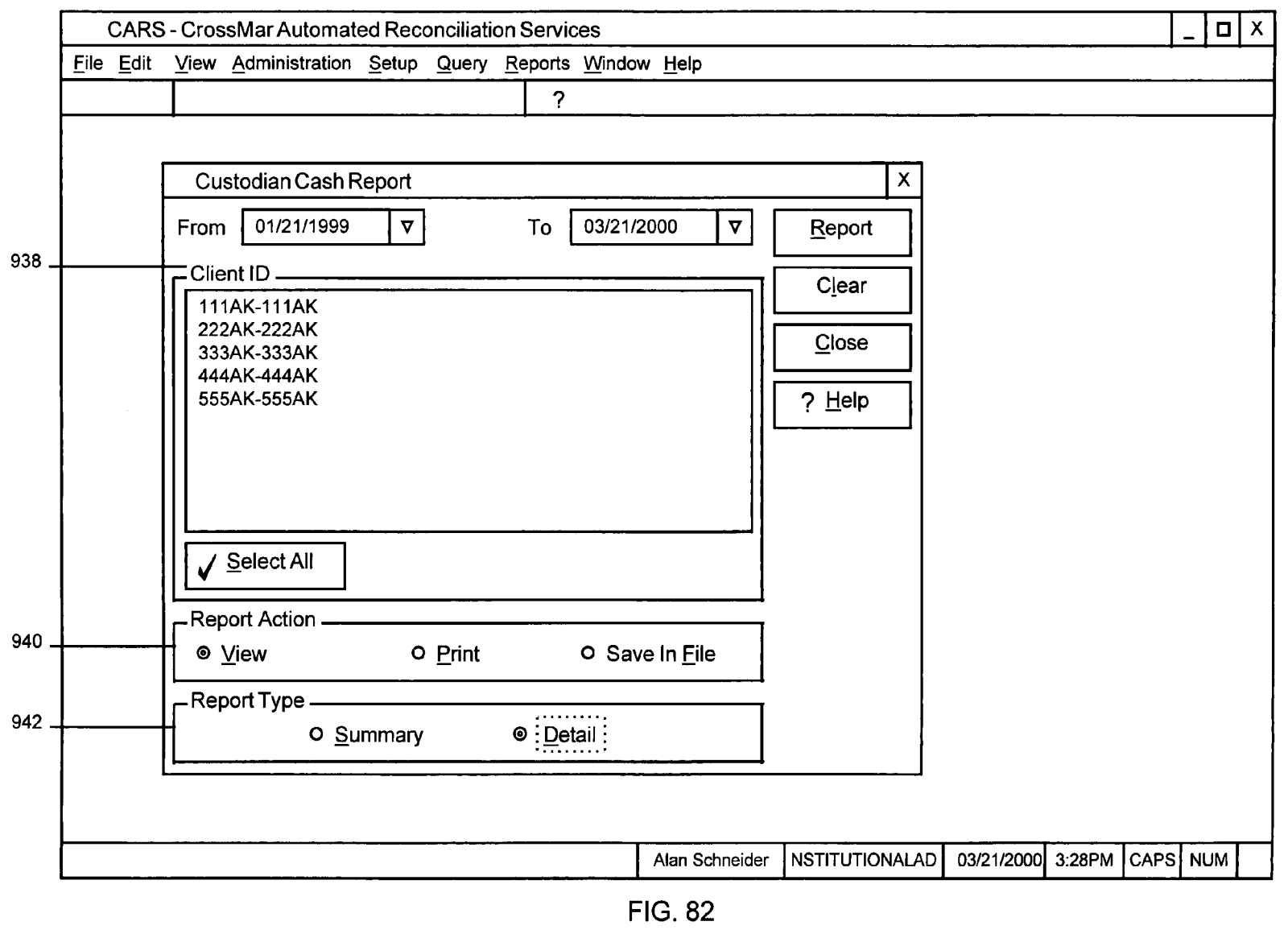

FIGS. 82 and 83 are sample Custodian Cash Report screens for an embodiment of the present invention. This feature of the invention provides a report to users of the Custodian Cash records as they are reported directly from the bank. FIG. 82 is the report request specification form. Users select the Clients 938 upon which to report, whether to report to the Screen, Printer or File 940, and then to show the summary balance records or Detail 942. FIG. 83 is an example of the Detail Report.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A method for reconciliation of fund manager and custodian account records, comprising:
receiving a first account record by a database electronically from one of an internal portfolio tracking system of a fund manager and a custody network of a custodian and receiving a second account record by the database from the other of the internal portfolio tracking system of the fund manager and the custody network of the custodian;
allowing the fund manager and the custodian to predefine matching rules for the respective account records independently of one another;
automatically comparing the account records by a computer application according to the predefined matching rules for at least one item of account data selected from a group of account data items consisting of account number, security identification, units, unit cost, total cost, unit price, and total market value to identify one of matched and unmatched first and second account records; and
if unmatched account records are identified in the comparison, generating a report of the comparison by the computer application identifying the unmatched account records accessible for display by the fund manager and the custodian, allowing a manual match of the unmatched account records on the database by either one of the fund manager and the custodian, and storing an historical record of the manual match by the computer application accessible by either one of the other of the fund manager and the custodian.

2. The method of claim 1, wherein receiving the account records further comprises receiving the first and second account records for one of a position and a transaction.

3. The method of claim 2, wherein receiving the account records for the position further comprises receiving the first and second account records for one of a securities position and a cash position.

4. The method of claim 2, wherein receiving the account records for the transaction further comprises receiving the first and second account records for one of a securities transaction and cash transaction.

5. The method of claim 1, wherein receiving the account record electronically from the custody network of the custodian further comprises receiving the account record electronically via a proprietary financial network.

6. The method of claim 1, wherein receiving the account records by the database further comprises receiving the account records by a service bureau database.

7. The method of claim 1, wherein automatically comparing the account records further comprises uploading the account records to the database.

8. The method of claim 7, wherein uploading the account records further comprises formatting the account records.

9. The method of claim 8, wherein uploading the account records further comprises parsing the account records.

10. The method of claim 9, wherein uploading the account records further comprises validating the account records.

11. The method of claim 7, wherein uploading the account records further comprises uploading the account records according to a predefined schedule.

12. The method of claim 1, wherein predefining the matching rules further comprises predefining available match groups for the fund manager and the custodian.

13. The method of claim 1, wherein predefining the matching rules further comprises predefining the matching rules for the account records for at least one of a position and a transaction.

14. The method of claim 13, wherein predefining the matching rules further comprises predefining substantially similar matching rules for the account records for the position and transaction.

15. The method of claim 13, wherein predefining the matching rules further comprises predefining different matching rules for the account records for the position and transaction.

16. The method of claim 1, wherein predefining the matching rules further comprises predefining matching criteria in terms of a tolerance in at least one of percentage terms and nominal terms.

17. The method of claim 1, wherein predefining the matching rules further comprises predefining the matching rules in terms of levels of match success.

18. The method of claim 1, wherein generating the report further comprises allowing at least one of the fund manager and the custodian to download the report in a file.

19. The method of claim 1, wherein displaying the report further comprises displaying the unmatched first and second account records simultaneously for either one of the fund manager and the custodian on a consolidated screen.

20. The method of claim 1, wherein displaying the report further comprises prompting either one of the fund manager and the custodian for entry of the manual match.

21. The method of claim 1, wherein allowing the manual match further comprises identifying a reason for the manual match.

22. The method of claim 21, wherein identifying the reason further comprises storing a record of the reason for the manual match.

23. The method of claim 22, wherein storing the record further comprises allowing a retrieval of the record of the reason for the manual match.

24. A system for reconciliation of fund manager and custodian account records, comprising:
a computer database adapted for receiving a first account record electronically from one of an internal portfolio tracking system of a fund manager and a custody network of a custodian and for receiving a second account record from the other of the internal portfolio tracking system of the fund manager and the custody network of the custodian;
a computer application preprogrammed for automatically comparing the received account records according to matching rules, which the fund manager and the custodian are allowed to predefine for the respective account records independently of one another, for at least one item of account data selected from a group of account data items consisting of account number, security identification, units, unit cost, total cost, unit price, and total market value to identify one of matched and unmatched first and second account records; and
wherein if unmatched account records are identified in the comparison, the computer application is further preprogrammed for generating a report of the comparison identifying the unmatched account records accessible for display by the fund manager and the custodian, for allowing a manual match of the unmatched account records on the database by either one of the fund manager and the custodian, and for storing an historical record of the manual match accessible by either one of the other of the fund manager and the custodian.

25. The system of claim 24, wherein the computer database is further adapted for receiving the account records electronically via a proprietary financial network.

26. The system of claim 24, wherein the database further comprises a service bureau database.

27. The system of claim 24, wherein the database is further adapted for receiving an update of the account records.

28. The system of claim 27, wherein the means for uploading database is further adapted for receiving the update of the account records according to a predefined schedule.

29. The system of claim 24, comprising a terminal for displaying the report for a user.

30. The system of claim 29, wherein the computer application is further adapted for displaying the unmatched first and second account records simultaneously for the user on a consolidated display at the terminal.

31. The system of claim 24, wherein the computer application is further preprogrammed for storing a record of a reason for the manual match.

32. The system of claim 31, wherein the computer application is further preprogrammed for allowing retrieval of the record of the reason for the manual match.

* * * * *